US 12,539,994 B2

United States Patent
Royce et al.

(10) Patent No.: US 12,539,994 B2
(45) Date of Patent: Feb. 3, 2026

(54) MULTI-BAGGER CENTRIFUGAL ORGANIZER

(71) Applicant: Innovation Associates, Inc., Johnson City, NY (US)

(72) Inventors: David Royce, Johnson City, NY (US); Ryan Van Tassel, Johnson City, NY (US); Nicholas Twining, Johnson City, NY (US); Conner Sweeney, Johnson City, NY (US); Eric Shelley, Johnson City, NY (US); Kory Brandon Morrison, Johnson City, NY (US)

(73) Assignee: Innovation Associates, Inc., Johnson City, NY (US)

( * ) Notice: Subject to any disclaimer, the term of this patent is extended or adjusted under 35 U.S.C. 154(b) by 0 days.

(21) Appl. No.: 18/430,105

(22) Filed: Feb. 1, 2024

(65) Prior Publication Data

US 2024/0253837 A1    Aug. 1, 2024

Related U.S. Application Data

(60) Provisional application No. 63/532,769, filed on Aug. 15, 2023, provisional application No. 63/442,521, filed on Feb. 1, 2023.

(51) Int. Cl.
*B65B 35/26* (2006.01)
*B65B 5/10* (2006.01)
(Continued)

(52) U.S. Cl.
CPC .............. *B65B 35/26* (2013.01); *B65B 5/10* (2013.01); *B65B 43/54* (2013.01); *B65B 57/10* (2013.01)

(58) Field of Classification Search
CPC ..... B65G 47/1464; B65B 37/12; B65B 57/10; B65B 5/10; B65B 43/54; B65B 35/26
See application file for complete search history.

(56) References Cited

U.S. PATENT DOCUMENTS

| | | |
|---|---|---|
| 2,332,156 A | 10/1943 | Long |
| 3,926,425 A | 12/1975 | Allan et al. |
| (Continued) | | |

FOREIGN PATENT DOCUMENTS

| | | |
|---|---|---|
| DE | 10 2012 107088 | 5/2014 |
| JP | 2002338033 | 11/2002 |
| (Continued) | | |

OTHER PUBLICATIONS

International Search Report—PCT/US2024/014047 dated Aug. 20, 2024—6 pages.
(Continued)

*Primary Examiner* — Himchan Song
(74) *Attorney, Agent, or Firm* — K&L Gates LLP

(57) ABSTRACT

An apparatus for organizing containers in a centrifugal organizer apparatus is disclosed. The centrifugal organizer apparatus includes a centrifugal feeder, a tote dumper, and an exit ramp. The centrifugal feeder includes a conical diverter and an external wall adjacent to a circumference of the conical diverter. The centrifugal feeder is configured to rotate and create centrifugal force such that containers within the centrifugal feeder are directed to the external wall. The tote dumper includes at least one tote configured to release at least one container into the centrifugal feeder. The exit ramp is tangential to the external wall and is configured to allow the container under the centrifugal force to exit the centrifugal feeder.

20 Claims, 49 Drawing Sheets

(51) Int. Cl.
  *B65B 43/54*   (2006.01)
  *B65B 57/10*   (2006.01)

(56) References Cited

U.S. PATENT DOCUMENTS

| | | | | |
|---|---|---|---|---|
| 4,007,854 A * | 2/1977 | Ervine | ............... | B65G 47/1464 |
| | | | | 221/253 |
| 4,830,172 A * | 5/1989 | Hilton | ............... | B65G 47/1428 |
| | | | | 198/443 |
| 4,899,520 A | 2/1990 | Lerner et al. | | |
| 5,221,567 A | 6/1993 | Baker | | |
| 5,417,041 A | 5/1995 | Hansen et al. | | |
| 5,419,442 A * | 5/1995 | Wright, Jr. | ................ | B07C 5/36 |
| | | | | 209/920 |
| 5,474,493 A * | 12/1995 | Tolbert | ............... | B65G 47/1457 |
| | | | | 452/179 |
| 5,568,718 A | 10/1996 | Lerner et al. | | |
| 5,687,545 A | 11/1997 | Baker | | |
| 5,918,441 A | 7/1999 | Baker | | |
| 5,954,185 A * | 9/1999 | Eshelman | .......... | B65G 47/1464 |
| | | | | 198/395 |
| 6,145,273 A | 11/2000 | Baker | | |
| 6,155,025 A * | 12/2000 | Komiya | ................... | B65B 5/10 |
| | | | | 53/154 |
| 6,351,926 B1 | 3/2002 | Hodge et al. | | |
| 6,419,392 B1 | 7/2002 | Baker | | |
| 6,470,648 B1 | 10/2002 | Baker | | |
| 6,543,201 B2 | 4/2003 | Cronauer et al. | | |
| 6,742,317 B2 | 6/2004 | Cronauer et al. | | |
| 6,827,490 B2 | 12/2004 | Baker | | |
| 7,258,656 B2 | 8/2007 | Lerner et al. | | |
| 7,448,185 B2 | 11/2008 | Zeedyk et al. | | |
| 7,552,571 B2 | 6/2009 | Lerner et al. | | |
| 7,571,584 B2 | 8/2009 | Lerner et al. | | |
| 7,654,064 B2 | 2/2010 | Riccardi et al. | | |
| 7,757,459 B2 | 7/2010 | Wehrmann | | |
| 7,794,380 B2 | 9/2010 | Baker | | |
| 7,897,219 B2 | 3/2011 | Wehrmann | | |
| 8,069,635 B2 | 12/2011 | Riccardi et al. | | |
| 8,074,782 B2 * | 12/2011 | Charpentier | ...... | B29C 49/42093 |
| | | | | 198/408 |
| 8,141,329 B2 | 3/2012 | Zeedyk et al. | | |
| 8,307,617 B2 | 11/2012 | Riccardi et al. | | |
| 8,549,822 B2 | 10/2013 | Lerner et al. | | |
| 8,887,978 B2 | 11/2014 | Chuba | | |
| 9,617,102 B2 | 4/2017 | Chuba | | |
| 10,336,489 B2 | 7/2019 | Riccardi et al. | | |
| 10,730,260 B2 | 8/2020 | Wehrmann | | |
| 11,001,401 B2 | 5/2021 | Riccardi et al. | | |
| 11,040,793 B2 | 6/2021 | Riccardi et al. | | |
| 11,325,733 B2 | 5/2022 | Shook et al. | | |
| 2004/0162634 A1 | 8/2004 | Rice | | |
| 2005/0178082 A1 * | 8/2005 | Milot | ................ | B65G 47/1464 |
| | | | | 52/749.13 |
| 2014/0116010 A1 | 5/2014 | Baker | | |
| 2017/0327255 A1 * | 11/2017 | Kim | .................... | G07F 17/0092 |
| 2018/0305053 A1 * | 10/2018 | Schombert | .............. | B65B 35/06 |
| 2019/0143374 A1 * | 5/2019 | Zhou | ...................... | B65B 35/24 |
| | | | | 53/54 |
| 2021/0284372 A1 | 9/2021 | Riccardi et al. | | |
| 2022/0112015 A1 | 4/2022 | Berguig | | |
| 2022/0258899 A1 | 8/2022 | Shook et al. | | |

FOREIGN PATENT DOCUMENTS

| | | |
|---|---|---|
| JP | 2010126311 | 6/2010 |
| JP | 2014023787 | 2/2014 |

OTHER PUBLICATIONS

Written Opinion—PCT/US2024/014047 dated Aug. 20, 2024—13 pages.
Preliminary Report on Patentability PCT/US2024/014047 dated Dec. 19, 2024—7 pages.
Preliminary Report on Patentability PCT/US2024/014005 dated Dec. 18, 2024—5 pages.
Opinion of the International Searching Authority PCT/US2024/014005 dated Aug. 12, 2024—8 pages.
Search Report of the International Searching Authority PCT/US2024/014005 dated Aug. 12, 2024—5 pages.

* cited by examiner

MULTI-BAGGER CENTRIFUGAL ORGANIZER

PRIORITY CLAIM

This application claims priority to and the benefit of U.S. Provisional Patent Application Ser. No. 63/442,521, filed on Feb. 1, 2023, and U.S. Provisional Patent Application Ser. No. 63/532,769, filed on Aug. 15, 2023, the entire disclosures of which are hereby incorporated by reference.

BACKGROUND

Typical prescription medication fulfillment systems process hundreds to thousands of prescriptions a day. These prescription medication fulfillment systems may be used for the online fulfillment of medication prescriptions in instances where patient-specific local pharmacy preparation is not needed. Additionally, some prescription medication fulfillment systems may use conveyance systems to at least help automate operations that may instead be performed a local pharmacies, such as prescription filling and packaging.

One type of medication fulfillment consists of placing a medication container and corresponding documentation into a bag for shipment. Currently, placement of the medication container into the bag is a semi-automated process. A conveyor system routes a medication container to a packing station. An operator then manually picks up and places the medication container into a bag or other receptacle. The operator also then retrieves medication documentation from a printer, folds the documentation, and places the documentation into the bag. The operator then seals the bag and places a printed label on the bag for shipping. The operator then places the bag into a tote that is routed to a shipping department.

The above process is relatively time intensive and operator intensive. For a facility that processes thousands of orders a day, at least eight to ten operators are needed to manually package single medication containers into bags. While some parts of the process are automated, such as the medication container routing, documentation printing, bag preparation, and label printing, other parts of the process including the aggregation and bagging of the order are labor intensive.

In addition, it is critical that the fulfillment process be accurate. If a patient receives incorrect medication, the results could be disastrous or even deadly for the patient. Even medication of the same compound can be made in different dosage levels which can cause negative effects in a patient that ingests the wrong dosage. For this reason, extra care is put into medication fulfillment.

A need accordingly exists for a single, modular pharmacy automation machine that automatically packages medication containers.

Additionally, a need exists for an accurate and efficient machine to assist with medication fulfillment.

SUMMARY

Example systems, methods, and apparatus are disclosed herein for bagging single medication containers and corresponding documentation.

In light of the disclosure herein and without limiting the disclosure in any way, in an aspect of the present disclosure, which may be combined with any other aspect listed herein unless specified otherwise, a centrifugal organizer apparatus for a bagger system comprises a centrifugal feeder including a conical diverter and an external wall adjacent to a circumference of the conical diverter, at least one tote dumper configured to receive and hold at least one tote and configured to release at least one container into the centrifugal feeder, and an exit ramp tangential to the external wall configured to allow the at least one container under the centrifugal force to exit the centrifugal feeder via the aperture. The conical diverter is configured to rotate and create centrifugal force such that containers within the centrifugal feeder are directed to the external wall, at least a portion of the external wall including an aperture sized to enable containers to pass through. The at least one tote dumper has a holding position and a dropping position. While in the holding position, the at least one tote dumper is configured to receive and hold at least one container in the at least one tote. While in the dropping position, the at least one tote dumper is configured to release the at least one container from the at least one tote.

In another aspect of the present disclosure, which may be combined with the any other aspect in combination with any other aspect listed herein unless specified otherwise, the centrifugal feeder further includes a platform perpendicular to the external wall.

In another aspect of the present disclosure, which may be combined with the any other aspect in combination with any other aspect listed herein unless specified otherwise, the conical diverter is tilted such that the conical diverter has a high end and a low end.

In another aspect of the present disclosure, which may be combined with the any other aspect in combination with any other aspect listed herein unless specified otherwise, the exit ramp has a height equal to that of a height of the high end of the conical diverter.

In another aspect of the present disclosure, which may be combined with the any other aspect in combination with any other aspect listed herein unless specified otherwise, the external wall further includes a base ledge perpendicular to the external wall, and the base ledge has a height equal to that of a height of the high end of the conical diverter.

In another aspect of the present disclosure, which may be combined with the any other aspect in combination with any other aspect listed herein unless specified otherwise, the at least one tote dumper is located above the conical diverter.

In another aspect of the present disclosure, which may be combined with the any other aspect in combination with any other aspect listed herein unless specified otherwise, the at least one tote receives the at least one container from a container routing mechanism.

In another aspect of the present disclosure, which may be combined with the any other aspect in combination with any other aspect listed herein unless specified otherwise, the container routing mechanism is a mechanical arm.

In another aspect of the present disclosure, which may be combined with the any other aspect in combination with any other aspect listed herein unless specified otherwise, the at least one tote is routed to the at least one tote dumper by a transport mechanism.

In another aspect of the present disclosure, which may be combined with the any other aspect in combination with any other aspect listed herein unless specified otherwise, the tote dumper comprises a supporting member including at least one hole; a dowel coupled to a motor, the dowel threaded through the at least one hole of the supporting member; the motor configured to rotate the dowel; and at least one arm member configured to hold the at least one tote.

In another aspect of the present disclosure, which may be combined with the any other aspect in combination with any other aspect listed herein unless specified otherwise, the at least one arm member supports the at least one tote such that the container held within the at least one tote does not fall out of the at least one tote when the tote dumper is in the holding position. The motor is configured to rotate the dowel about a horizontal axis such that the container held within the at least one tote falls out of the at least one tote into the centrifugal feeder when the tote dumper is moved to the dropping position.

In another aspect of the present disclosure, which may be combined with the any other aspect in combination with any other aspect listed herein unless specified otherwise, the transport mechanism is a conveyor belt.

In another aspect of the present disclosure, which may be combined with the any other aspect in combination with any other aspect listed herein unless specified otherwise, the transport mechanism includes at least one pneumatic cylinder configured to create a barrier that halts the at least one tote traveling along the transport mechanism.

In another aspect of the present disclosure, which may be combined with the any other aspect in combination with any other aspect listed herein unless specified otherwise, the transport mechanism is a tote elevator.

In another aspect of the present disclosure, which may be combined with the any other aspect in combination with any other aspect listed herein unless specified otherwise, the tote elevator comprises a frame including at least one guide configured to receive the at least one tote and at least one actuator coupled to the frame configured to release guide pins upon the at least one guide receiving the at least one tote.

In another aspect of the present disclosure, which may be combined with the any other aspect in combination with any other aspect listed herein unless specified otherwise, the transport mechanism includes a conveyor belt and a tote elevator.

In another aspect of the present disclosure, which may be combined with the any other aspect in combination with any other aspect listed herein unless specified otherwise, the transport mechanism includes at least one pneumatic cylinder configured to create a barrier that halts the at least one tote traveling along the transport mechanism.

In another aspect of the present disclosure, which may be combined with the any other aspect in combination with any other aspect listed herein unless specified otherwise, the centrifugal organizer further comprises at least one sensor in communication with a controller configured to activate the at least one pneumatic cylinder to route the at least one tote from the transport mechanism to the tote elevator.

In another aspect of the present disclosure, which may be combined with the any other aspect in combination with any other aspect listed herein unless specified otherwise, the exit ramp is configured to direct the at least one container entering the exit ramp from the centrifugal feeder to a transport tube.

In another aspect of the present disclosure, which may be combined with the any other aspect in combination with any other aspect listed herein unless specified otherwise, the exit ramp is configured to direct the at least one container entering the exit ramp from the centrifugal feeder to a tote elevator.

In another aspect of the present disclosure, which may be combined with the any other aspect in combination with any other aspect listed herein unless specified otherwise, a linear organizer apparatus for a bagger system comprises an input transport mechanism configured to receive at least one container and a funneling transport mechanism including a left conveyor belt and a right conveyor belt each having an upper end and a lower end. The lower end of the left conveyor belt is in close proximity to the lower end of the right conveyor belt, and the left conveyor belt and the right conveyor belt form a v-shape configured to guide the at least one container to an exit.

In another aspect of the present disclosure, which may be combined with the any other aspect in combination with any other aspect listed herein unless specified otherwise, the input transport mechanism is a conveyor belt.

In another aspect of the present disclosure, which may be combined with the any other aspect in combination with any other aspect listed herein unless specified otherwise, the v-shape created by the left conveyor belt and the right conveyor belt is configured to orient the at least one container to lie parallel to the funneling transport mechanism.

In another aspect of the present disclosure, which may be combined with the any other aspect in combination with any other aspect listed herein unless specified otherwise, the linear organizer apparatus further comprises at least one bumper rod affixed above the left conveyor belt and the right conveyor belt configured to guide the at least one container towards the lower ends of the left conveyor belt and the right conveyor belt.

In another aspect of the present disclosure, which may be combined with the any other aspect in combination with any other aspect listed herein unless specified otherwise, the linear organizer apparatus further comprises at least one fin located between the lower ends of the left conveyor belt and the right conveyor belt configured to guide the at least one container along the funneling transport mechanism.

In another aspect of the present disclosure, which may be combined with the any other aspect in combination with any other aspect listed herein unless specified otherwise, the linear organizer apparatus further comprises a second funneling transport mechanism including a second left conveyor belt and a second right conveyor belt configured to receive the at least one container from the funneling transport mechanism. Each of the second left conveyor belt and second right conveyor belt has an upper end and a lower end, the lower end of the second left conveyor belt is in close proximity to the second lower end of the right conveyor belt, and the second left conveyor belt and the second right conveyor belt form a v-shape configured to guide the at least one container to the exit.

In another aspect of the present disclosure, which may be combined with the any other aspect in combination with any other aspect listed herein unless specified otherwise, the exit is configured to direct the at least one container from the funneling transport mechanism to a transport tube.

In another aspect of the present disclosure, which may be combined with the any other aspect in combination with any other aspect listed herein unless specified otherwise, the exit is configured to direct the at least one container from the funneling transport mechanism to a tote elevator.

In another aspect of the present disclosure, which may be combined with the any other aspect in combination with any other aspect listed herein unless specified otherwise, the linear organizer apparatus further comprises at least one tote dumper including at least one tote configured to release at least one container onto the input transport mechanism, the at least one tote dumper having a holding position and a dropping position.

In another aspect of the present disclosure, which may be combined with the any other aspect in combination with any other aspect listed herein unless specified otherwise, the tote dumper comprises a supporting member including at least one hole; a dowel coupled to the motor, the dowel threaded through the at least one hole of the supporting member; a motor configured to rotate the dowel; and at least one arm member configured to hold the at least one tote.

In another aspect of the present disclosure, which may be combined with the any other aspect in combination with any other aspect listed herein unless specified otherwise, in the holding position the at least one arm member supports the at least one tote such that the container held within the at least one tote does not fall out of the at least one tote, and in the dropping position the motor is configured to rotate the dowel about a horizontal axis such that the container held within the at least one tote falls out of the at least one tote.

In another aspect of the present disclosure, which may be combined with the any other aspect in combination with any other aspect listed herein unless specified otherwise, the input transport mechanism is a conveyor belt with cleats, each cleat containing the at least one container located in each at least one tote.

In another aspect of the present disclosure, which may be combined with the any other aspect in combination with any other aspect listed herein unless specified otherwise, the at least one tote is configured to receive and hold at least one container while the at least one tote dumper is in the holding position.

In another aspect of the present disclosure, which may be combined with the any other aspect in combination with any other aspect listed herein unless specified otherwise, the at least one tote is configured to release the at least one container and remain on the tote dumper while the at least one tote dumper is in the dropping position.

In another aspect of the present disclosure, which may be combined with the any other aspect in combination with any other aspect listed herein unless specified otherwise, the at least one tote receives the at least one container from a container routing mechanism.

In another aspect of the present disclosure, which may be combined with the any other aspect in combination with any other aspect listed herein unless specified otherwise, the container routing mechanism is a mechanical arm.

In another aspect of the present disclosure, which may be combined with the any other aspect in combination with any other aspect listed herein unless specified otherwise, the at least one tote is routed to the at least one tote dumper by a transport mechanism.

In another aspect of the present disclosure, which may be combined with the any other aspect in combination with any other aspect listed herein unless specified otherwise, the transport mechanism is a conveyor belt.

In another aspect of the present disclosure, which may be combined with the any other aspect in combination with any other aspect listed herein unless specified otherwise, the transport mechanism is a tote elevator.

In another aspect of the present disclosure, which may be combined with the any other aspect in combination with any other aspect listed herein unless specified otherwise, the linear organizer apparatus further comprises at least one scanner is configured to read bar codes on the at least one container. The scanner is further configured to read container information located on an outer surface of the at least one container and determine whether the container information matches container information located in a fulfillment database.

In another aspect of the present disclosure, which may be combined with the any other aspect in combination with any other aspect listed herein unless specified otherwise, a pneumatic container travel system comprises a tube configured to receive at least one container and allow the at least one container to pass through the tube, at least one air nozzle connected to a pressurized air source and configured to blow pressurized air through the tube, and at least one scanner located along a portion of the tube. The at least one scanner is configured to read a bar code on the at least one container.

In another aspect of the present disclosure, which may be combined with the any other aspect in combination with any other aspect listed herein unless specified otherwise, the tube is a transparent tube.

In another aspect of the present disclosure, which may be combined with the any other aspect in combination with any other aspect listed herein unless specified otherwise, the at least one air nozzle is coupled to more than one valve. The valves have an open position and a closed position.

In another aspect of the present disclosure, which may be combined with the any other aspect in combination with any other aspect listed herein unless specified otherwise, the pneumatic container travel system further comprises a controller configured to receive signals from a sensor measuring the flow of pressurized air. The controller is configured to transmit control instructions to open or close the valves.

In another aspect of the present disclosure, which may be combined with the any other aspect in combination with any other aspect listed herein unless specified otherwise, the sensor is an optical sensor.

In another aspect of the present disclosure, which may be combined with the any other aspect in combination with any other aspect listed herein unless specified otherwise, the sensor is a micro switch.

In another aspect of the present disclosure, which may be combined with the any other aspect in combination with any other aspect listed herein unless specified otherwise, the pneumatic container travel system further comprises a flow control fluidly coupled between the pressurized air source and the air nozzle.

In another aspect of the present disclosure, which may be combined with the any other aspect in combination with any other aspect listed herein unless specified otherwise, the flow control is configured to regulate the flow of pressurized air.

In another aspect of the present disclosure, which may be combined with the any other aspect in combination with any other aspect listed herein unless specified otherwise, the pneumatic container travel system further comprises a controller configured to receive signals from a sensor measuring the flow of pressurized air. The controller is configured to transmit control instructions to the flow control as to whether the flow of pressurized air should be increased or decrease.

In another aspect of the present disclosure, which may be combined with the any other aspect in combination with any other aspect listed herein unless specified otherwise, the sensor is an optical sensor.

In another aspect of the present disclosure, which may be combined with the any other aspect in combination with any other aspect listed herein unless specified otherwise, the sensor is a micro switch.

In another aspect of the present disclosure, which may be combined with the any other aspect in combination with any other aspect listed herein unless specified otherwise, the tube receives the at least one container from a linear organizer apparatus.

In another aspect of the present disclosure, which may be combined with the any other aspect in combination with any other aspect listed herein unless specified otherwise, the tube receives the at least one container from a centrifugal organizer apparatus.

In another aspect of the present disclosure, which may be combined with the any other aspect in combination with any other aspect listed herein unless specified otherwise, the tube receives the at least one container from an infeed loop apparatus.

In another aspect of the present disclosure, which may be combined with the any other aspect in combination with any other aspect listed herein unless specified otherwise, the scanner is further configured to read bar codes on the at least one container.

In another aspect of the present disclosure, which may be combined with the any other aspect in combination with any other aspect listed herein unless specified otherwise, the scanner is further configured to detect when the at least one container passes through the tube, read container information located on an outer surface of the at least one container, and determine whether the container information matches container information located in a fulfillment database.

In another aspect of the present disclosure, which may be combined with the any other aspect in combination with any other aspect listed herein unless specified otherwise, the pneumatic container travel system further comprises a controller configured to receive signals from the scanner when the container information does not match the container information located in the fulfillment database and cause an actuator to move the at least one tube to a reject area.

In another aspect of the present disclosure, which may be combined with the any other aspect in combination with any other aspect listed herein unless specified otherwise, the reject area includes at least one reject bin or at least one reject transport mechanism.

In another aspect of the present disclosure, which may be combined with the any other aspect in combination with any other aspect listed herein unless specified otherwise, the controller transmits the container information to a processor to determine whether the container information matches container information located in a fulfillment database.

In another aspect of the present disclosure, which may be combined with the any other aspect in combination with any other aspect listed herein unless specified otherwise, at least one scanner is affixed to the tube.

In light of the present disclosure and the above aspects, it is therefore an advantage of the present disclosure to provide a single modular machine that automatically packages multiple containers and corresponding documentation into a bag or other receptacle.

It is another advantage of the present disclosure to use multiple scanners to ensure the correct containers are placed with the correct medication documentation in a bag or other receptacle without manual operator verification.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. In addition, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

Figure 1A:
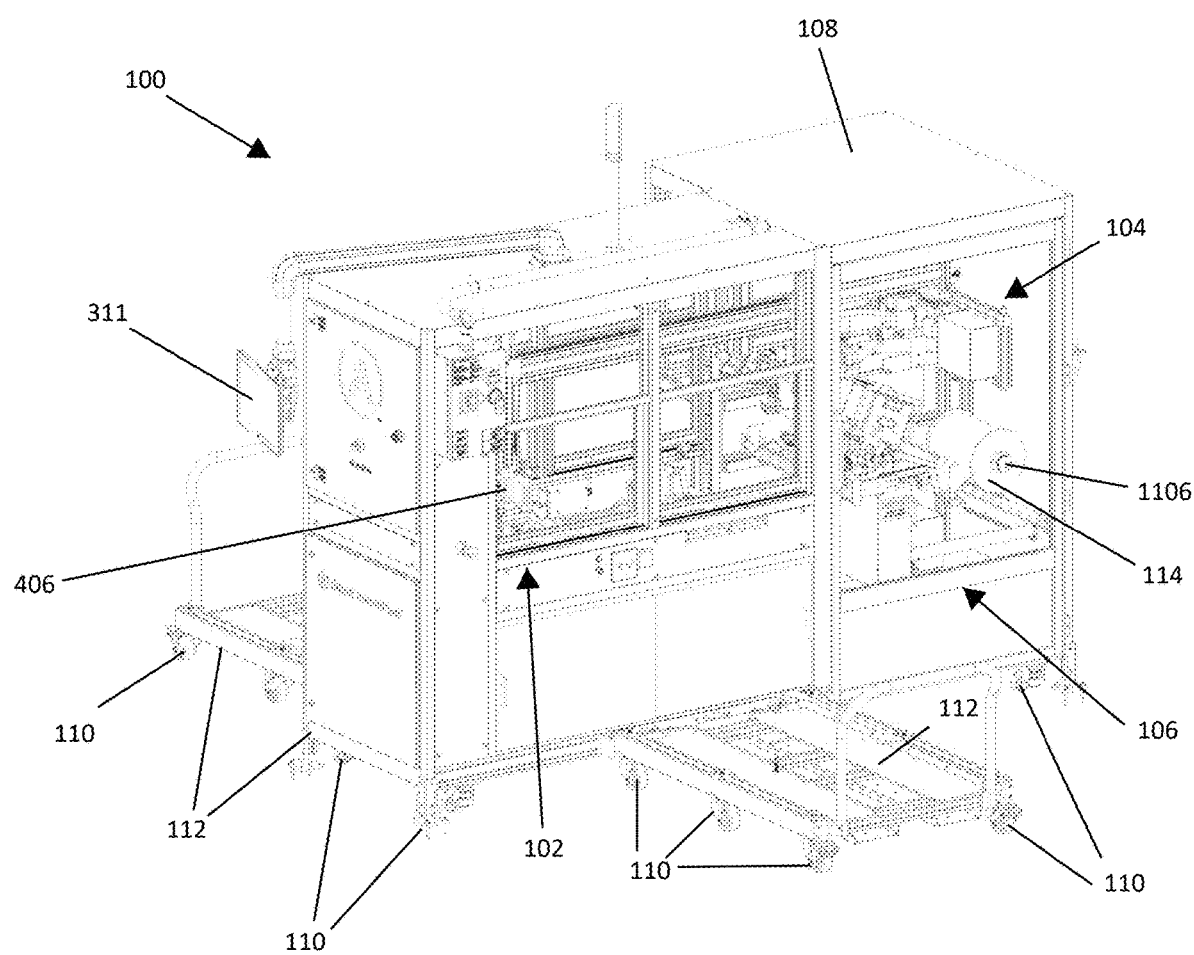
FIG. 1A shows an isometric front view of a medication bagger system, according to an example embodiment of the present disclosure.

Methods, systems, and apparatus are disclosed herein for automatically bagging containers and corresponding documentation. The automated bagging of medication containers enables thousands of medication prescriptions to be efficiently fulfilled each day. The methods, systems, and apparatus are configured to use one or more scanners to read a label on a medication container and/or printed medical documentation to ensure the mediation and documentation is bagged for a given patient, thereby reducing or eliminating potential errors.

Reference is made herein to medication documentation. As disclosed herein, medication documentation is generated by a pharmacy based on a medication order provided by a clinician (commonly referred to as a prescription). The medication documentation includes patient information and a medication order. The medication order designates a particular patient for receiving a specific dosage of a medication. In other words, the medication documentation refers to a single medication fill event for a particular patient. The medication documentation also includes a unique identifier for tracking the medication container, such as a bar code. The bar code may be any type of identifier known in the industry including one-dimensional bar codes, two-dimensional bar codes, stock keeping unit ("SKU"), radio frequency identification ("RFID"), or quick response codes ("QR codes"). In the described embodiments, the unique identifier is a bar code 11, but it will be appreciated that the use of a bar code is purely exemplary.

Patient information includes information regarding a particular patient and required medication needs. This may include, but is not limited to, information including a patient identifier, a medication identifier, a medication quantity identifier, a dosage identifier, an urgency identifier, a weight value, a medication shape identifier, a medication manufacturer indicator, a dosage form indicator, a medication color indicator, a marking indicator, a Drug Enforcement Administration ("DEA") code, a prescription expiration date, a medication expiration date, pharmacist verification information, a prescription status, medication directions, and/or the number of pages of medication documentation when printed. This patient information is stored in a fulfillment database that can be accessed and cross-referenced by a processor and/or a controller of a medication bagger system.

Reference is also made herein to medication containers. A medication container refers to a medication bottle, vial carrier, pill pack, blister card, package, or other container for housing and moving medication. The medication held within the medication container may include pills, tablets, or other solid pharmaceutical drug dosage that is consumed by a patient. A medication may also include a compounded pharmaceutical that is prepared from two or more substances.

A medication container usually includes a lid to ensure the medication stored within is secured and not able to be contaminated by exposure to outside elements. The medication container also includes a label with medication information and/or patient information. The label also includes a unique identifier for tracking the medication container, such as a bar code. In some embodiments, the medication container may include a separate identifier to enable tracking of the medication container itself within a pharmacy automation system and/or a medication bagger system.

Reference is also made herein to totes 21. Totes refer to any type of container capable of holding multiple medication containers 20 relating to one particular order. Totes can be any material suitable to guide the medication containers 20 through the medication bagger system 100. As one such example, the tote 21 may be a metal. The totes 21 also include a unique identifier for tracking a medication order that may include multiple medication containers 20 and medication documentation 10. The unique identifier may be a bar code 11 that may be any type of identifier known in the industry including one-dimensional bar codes, two-dimensional bar codes, SKUs, RFIDs, or QR codes. This unique identifier may be the same identifiers as those used on the medication documentation 10 and medication containers 20 or it may differ.

While the example methods, apparatus, and systems are disclosed herein as operating with medication documentation and medication containers, it should be appreciated that the methods, apparatus, and systems may be operable with other articles. For example, the methods, apparatus, and systems may provide for the routing of packages in a facility, products to be packaged in a facility, and/or components to be assembled into a product along an assembly line. The methods, apparatus, and systems are likewise applicable to a wide variety of products including, but not limited to, manufactured goods, perishable goods, food products, medical products, and other commercial products. It will be appreciated that the methods, apparatus, and systems may be used in other contexts as known by a person having ordinary skill in the art.

The example methods, apparatus, and systems disclosed below are more efficient than known packaging systems. The apparatuses disclosed herein, including a medication bagger system 100 and accompanying medication documentation preparation apparatus 102, infeed loop apparatus 104, centrifugal organizer apparatus 101, linear organizer apparatus 103, pneumatic container travel system 105, and packaging apparatus 106, reduce the number of procedural steps compared to the known bagging and packaging methods and may do so at faster speeds.

Figure 1B:
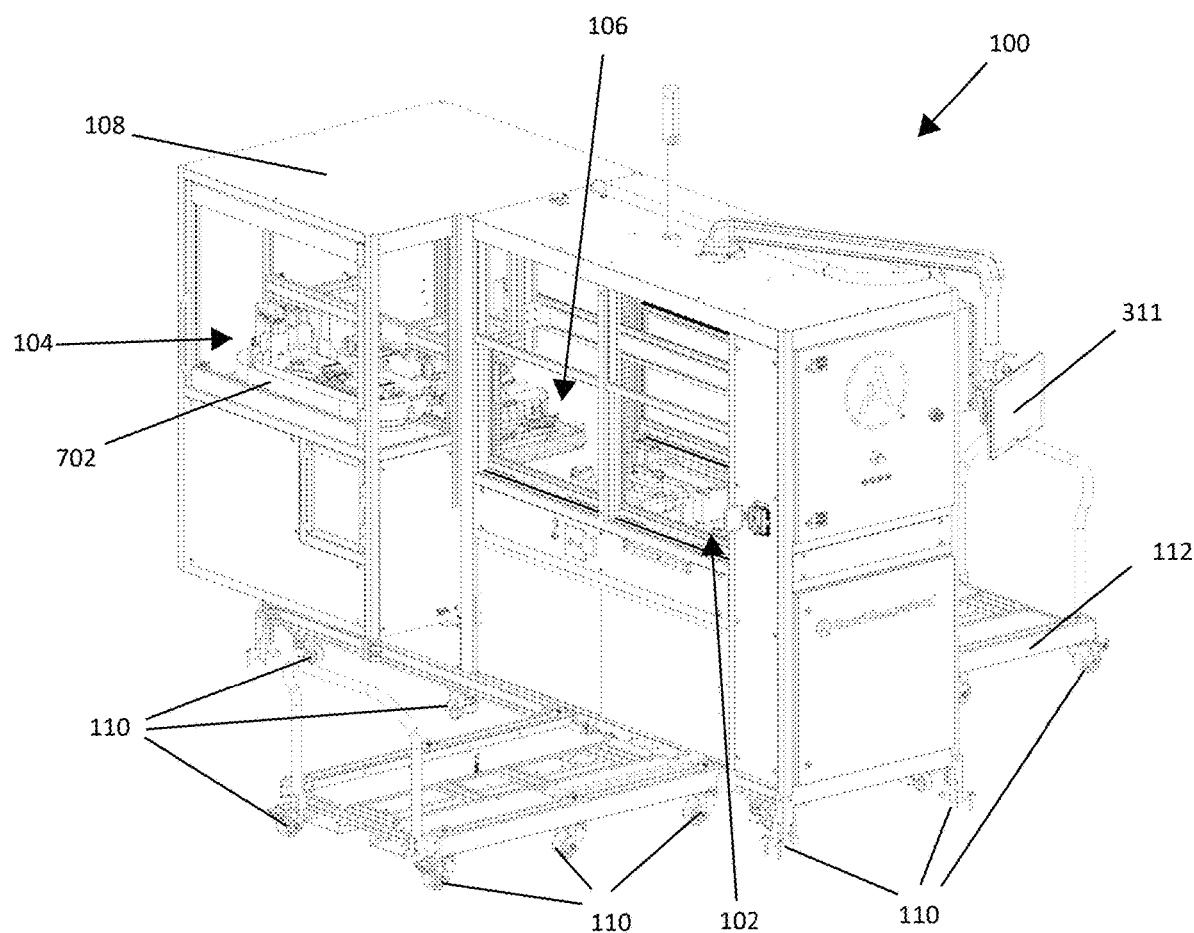
FIG. 1B shows an isometric back view of the medication bagger system, according to an example embodiment of the present disclosure.

Referring now to FIGS. 1A and 1B, the medication bagger system 100 includes a medication documentation preparation apparatus 102, an infeed loop apparatus 104, and a packaging apparatus 106. Each of the medication documentation preparation apparatus 102, the infeed loop apparatus 104, and the packaging apparatus 106 may operate contemporaneously. It should be appreciated that the medication bagger system 100 has been simplified to make the description of the present disclosure easier, and that the medication bagger system 100, which further includes the centrifugal organizer apparatus 101, the linear organizer apparatus 103, and the pneumatic container travel system 105, if implemented, would have additional structure and functionality.

Depending on the embodiment, the medication documentation preparation apparatus 102, the infeed loop apparatus 104, the packaging apparatus 106, and other components of the medication bagger system 100 may all be physically connected by framing, may be partially connected by framing, or may be physically separated. In the illustrated embodiment, a main frame 108 connects the medication documentation preparation apparatus 102, the infeed loop apparatus 104, and the packaging apparatus 106. The main frame 108 may consist of metal framing. In some embodiments, the main frame 108 can be on wheels 110 such that the medication bagger system 100 can be easily moved and re-arranged. Additionally, the main frame 108 can integrate drawer slides 112 so that the medication bagger system 100 can be adjusted and moved to reach internal systems such as the medication documentation preparation apparatus 102, the infeed loop apparatus 104, or the packaging apparatus 106.

Figure 2A:
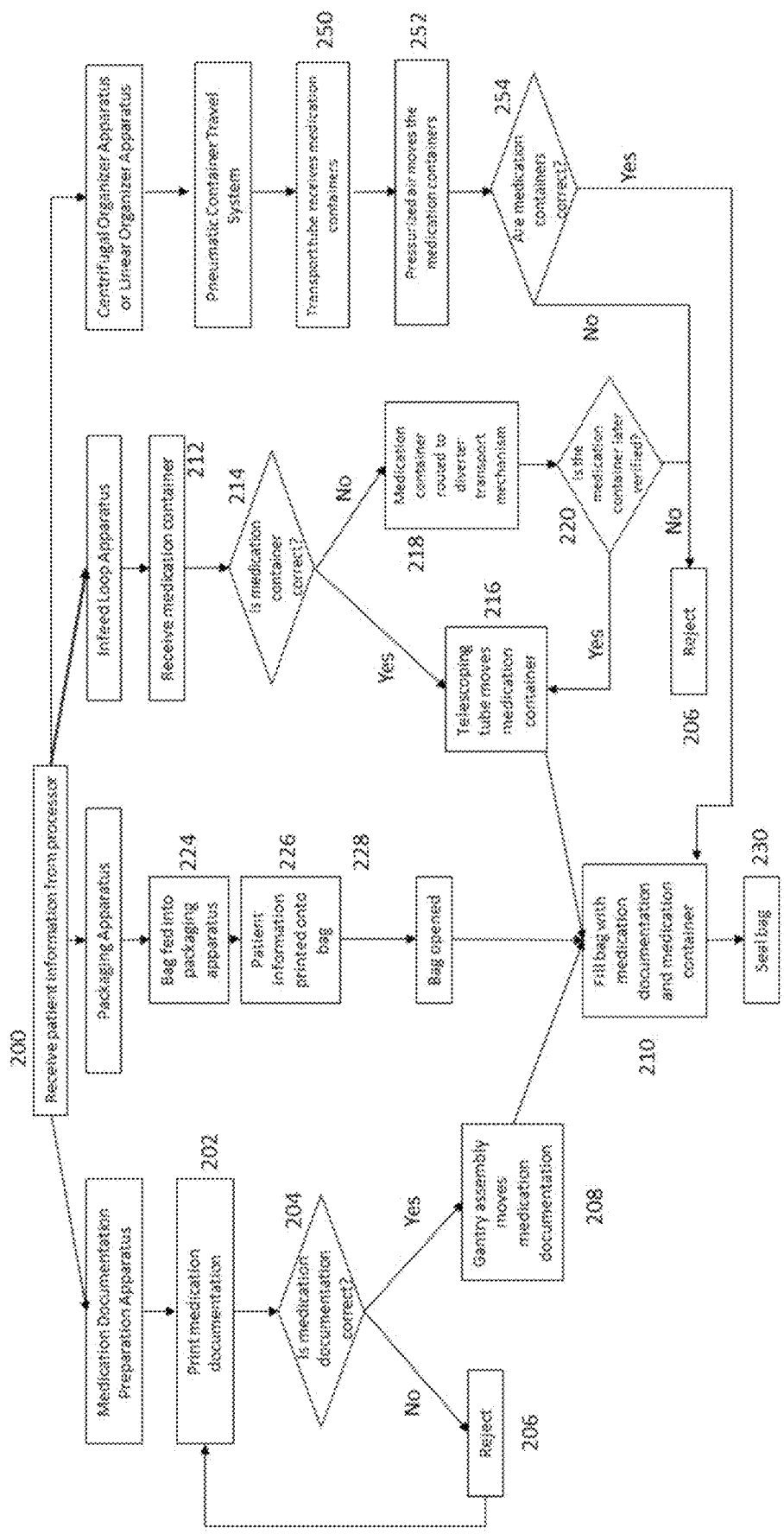
FIG. 2A is a diagram of a medication bagger system process, according to an example embodiment of the present disclosure.

The medication bagger system 100 allows receptacles, such as bags 114, to be filled and packaged with medication documentation 10 and medication containers 20 that are matched to patient information. While described in more detail below, this process is shown at a high level in FIG. 2A and tracks the operations of the medication documentation preparation apparatus 102, the infeed loop apparatus 104, the centrifugal organizer apparatus 101, the linear organizer apparatus 103, the pneumatic container travel system 105, and the packaging apparatus 106. Patient information is received by the system (block 200) and is routed to the medication documentation preparation apparatus 102, the infeed loop apparatus 104, and the packaging apparatus 106. The processes associated with each of the medication documentation preparation apparatus 102, the infeed loop apparatus 104, the centrifugal organizer apparatus 101, the linear organizer apparatus 103, the pneumatic container travel system 105, and the packaging apparatus 106 are individually shown in FIGS. 2B-2G, respectively. In the medication documentation preparation apparatus process illustrated in FIG. 2B, medication documentation 10 is printed (block 202). Once printed, the medication documentation 20 is verified (block 204). If it is incorrect, it is rejected (block 206) and optionally may be reprinted. If it is correct, it is moved by a gantry assembly (block 208) for placement into a bag (block 210).

Contemporaneously, medication containers 20 associated with the medication documentation 10 are sorted. Medication containers 20 are sorted in one of the infeed loop apparatus process, the centrifugal organizer apparatus process, and linear organizer apparatus process, as illustrated in FIGS. 2C-2E. If there is only one medication container 20 associated with the medication documentation 10, one of the infeed loop apparatus 104, the centrifugal organizer apparatus 101, and linear organizer apparatus 103 sorts the medication container 20. If there is more than one medication container 20 associated with the medication documentation 10, either the centrifugal organizer apparatus 101 or the linear organizer apparatus 103 is used to sort the medication container 20.

In the infeed loop apparatus system of FIG. 2C, when the medication container 20 is received (block 212), the medication container 20 is then verified (block 214). Verification is described further below. When the medication container 20 is correct, it is moved by a telescoping tube (block 216) to be deposited into a bag (block 210). When it is incorrect, the medication container 20 is routed to a different area, known as a diverter transport mechanism (block 218). The medication container 20 may be independently verified by a pharmacist or operator and after a predetermined time period, it is again verified (block 220). When it again cannot be verified, it is rejected (block 206). When it can now be verified, the medication container 20 is moved by the telescoping tube (block 216) to be deposited into the bag (block 210).

In the centrifugal organizer apparatus process of FIG. 2D, totes 21 containing medication containers 20 are received (block 232) and then travel through the tote transport mechanism (block 234). Then, the tote 21 travels up the tote elevator (block 236) and is deposited into the centrifugal feeder such that the medication containers 20 enter the centrifugal feeder (block 238). Finally, the medication containers 20 are routed to the pneumatic container travel system (block 240). In the linear organizer apparatus process of FIG. 2E, totes 21 containing medication containers 20 are received (block 242) and then travel through the tote transport mechanism (block 244). Then, the tote 21 is deposited into the input transport system and the medication containers 20 travel through a first fulling transport mechanism, and optionally, a second funneling transport mechanism (block 246). The medication containers 20 are then verified (block 248). When the medication containers 20 are correct, the medication containers 20 are routed to the pneumatic container travel system (block 240). When the medication containers 20 are incorrect, the medication containers 20 are routed to a reject area (block 206).

Figure 2B:
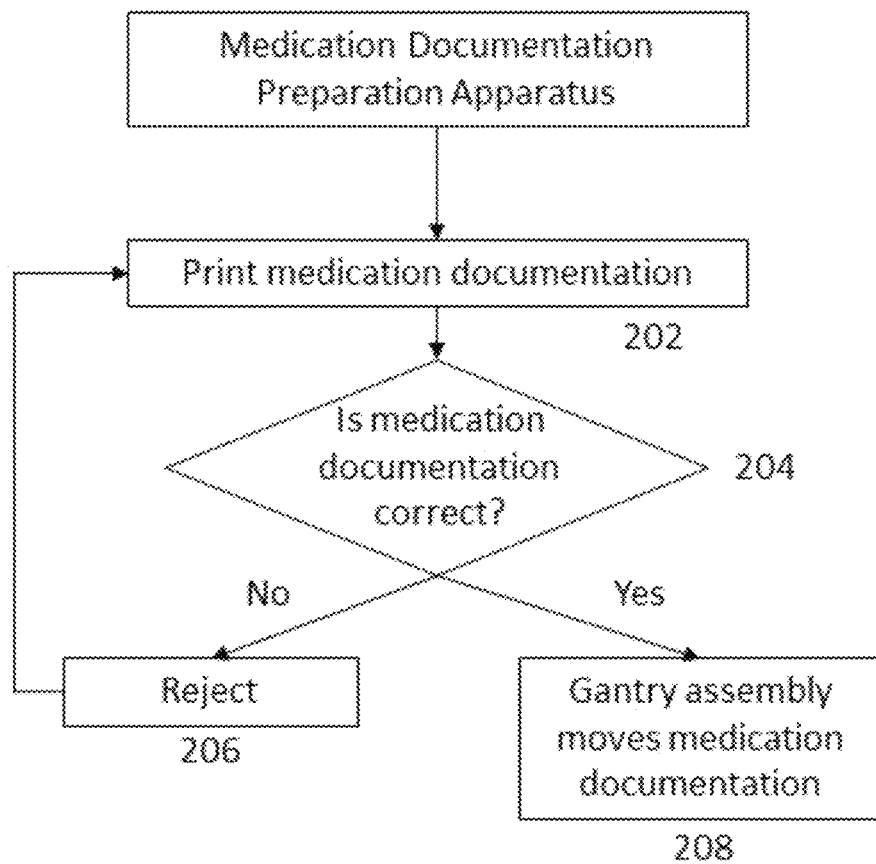
FIG. 2B is a diagram of a medication documentation preparation apparatus process, according to an example embodiment of the present disclosure.
Figure 2C:
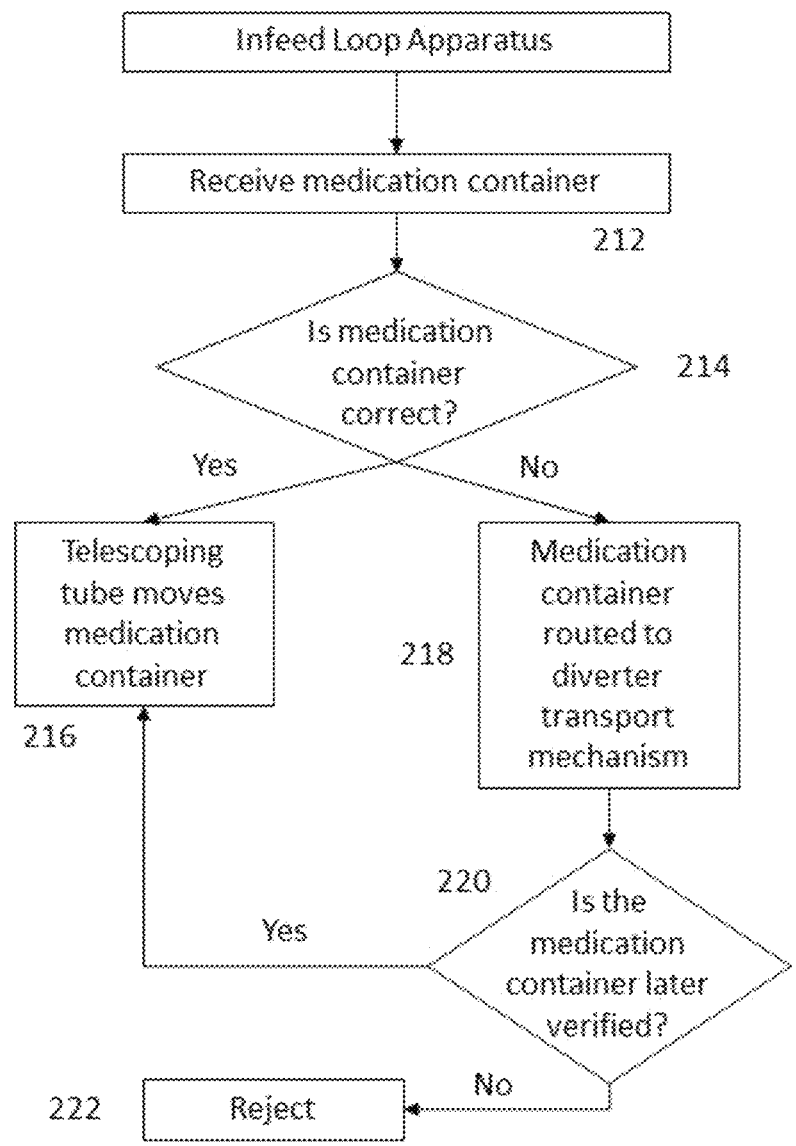
FIG. 2C is a diagram of an infeed loop apparatus process, according to an example embodiment of the present disclosure.
Figure 2D:
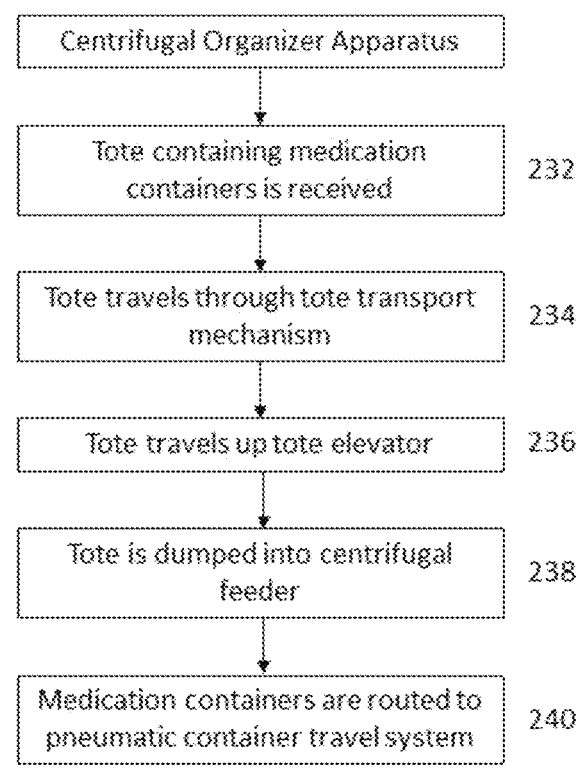
FIG. 2D is a diagram of a centrifugal organizer apparatus process, according to an example embodiment of the present disclosure.
Figure 2E:
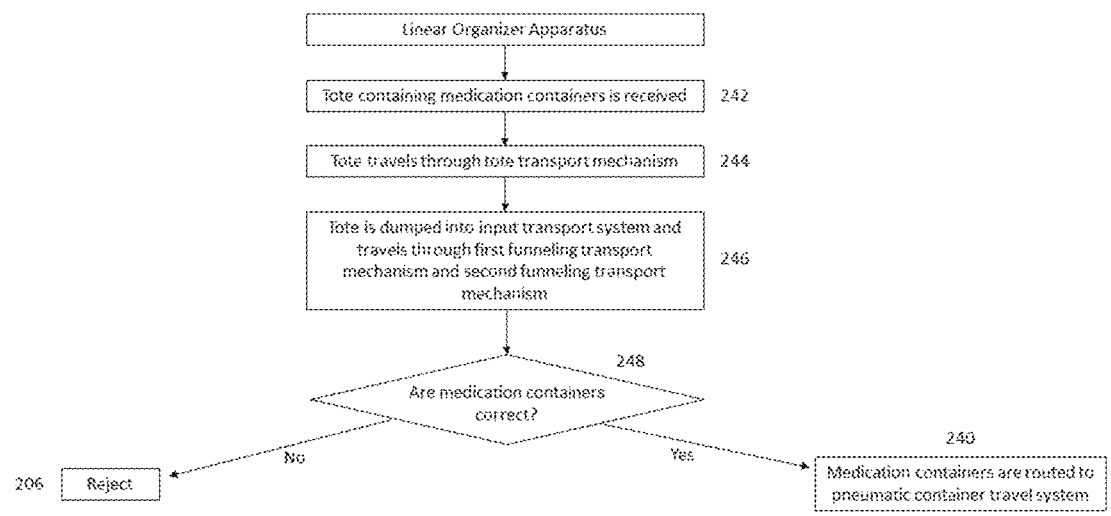
FIG. 2E is a diagram of a linear organizer apparatus process, according to an example embodiment of the present disclosure.
Figure 2F:
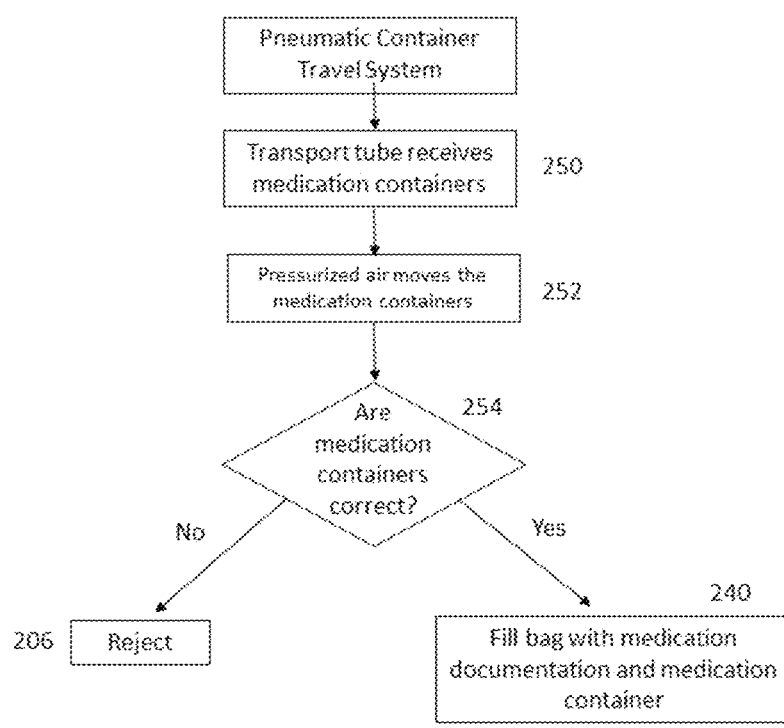
FIG. 2F is a diagram of a pneumatic container travel system process, according to an example embodiment of the present disclosure.
Figure 2G:
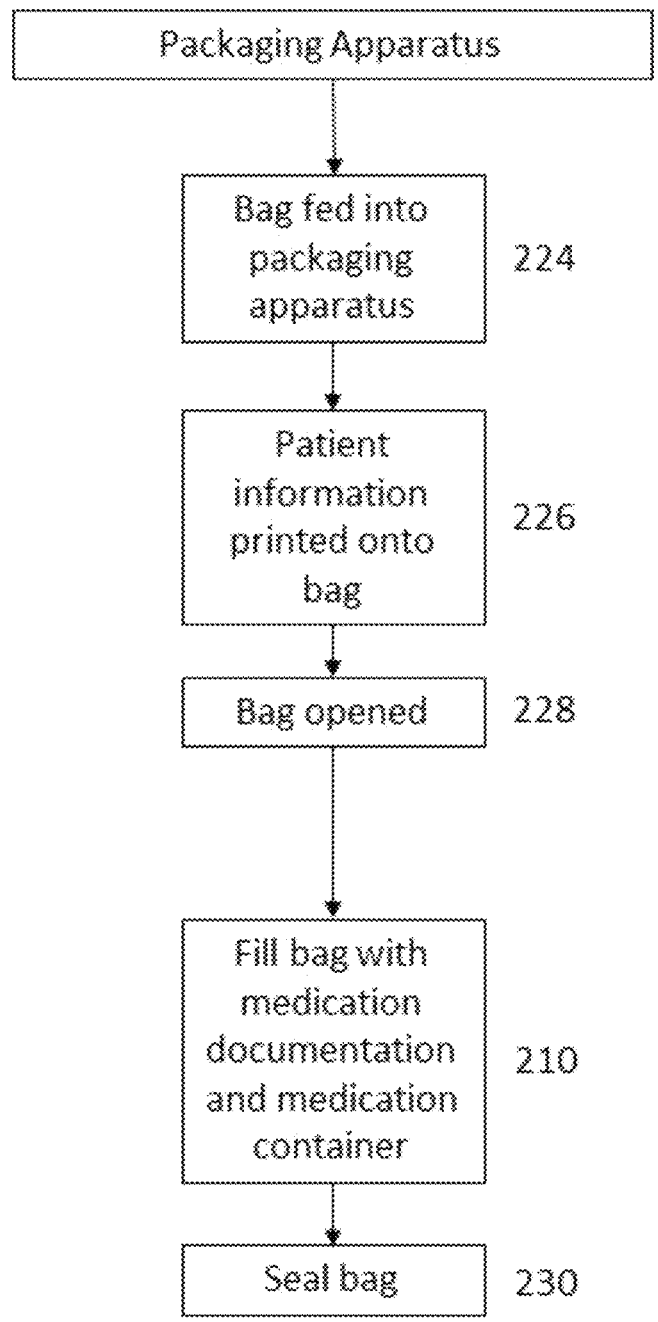
FIG. 2G is a diagram of a packaging apparatus process, according to an example embodiment of the present disclosure.

From the centrifugal organizer apparatus or the linear organizer apparatus, medication containers 20 are then routed through the pneumatic container travel system process of FIG. 2F. In block 250, the transport tube receives the medication containers 20. The medication containers 20 are then moved through the transport tube by pressurized air (block 252). The medication containers 20 are then verified (block 254). When the medication containers 20 are correct, the medication containers 20 are routed to the pneumatic container travel system (block 240). When the medication containers 20 are incorrect, the medication containers 20 are routed to a reject area (block 206).

To prepare the bag for loading, the bag is fed into a packaging apparatus (block 224) and the packaging apparatus process of FIG. 2D begins. Patient information is printed onto the bag (block 226) and the bag is opened (block 228). The bag is filled with the medication documentation 10 from the medication documentation preparation apparatus and medication container 20 from the infeed loop apparatus (block 210). Once the bag is filled (block 210), the bag is sealed (block 230).

The processes illustrated in FIGS. 2A-2G may occur concurrently, in tandem, or in sequence with other steps as described further below. For instance, the operations of the medication documentation preparation apparatus may occur simultaneously with the operations of the infeed loop apparatus, or the operations of each apparatus may occur at different times. Additionally, processes may depend on one another to initiate. In some embodiments, the medication documentation may be printed upon signal that the telescoping tube has begun to move medication containers 20 in the infeed loop apparatus to the packaging apparatus. In other embodiments, the packaging process of FIG. 2D may not begin until the medication documentation preparation apparatus process of FIG. 2B and the infeed loop apparatus process of FIG. 2C have been completed. It will be appreciated that many variations of the order and process of the methods illustrated in FIG. 2A-2D may be apparent to a person having ordinary skill in the art.

Figure 3:
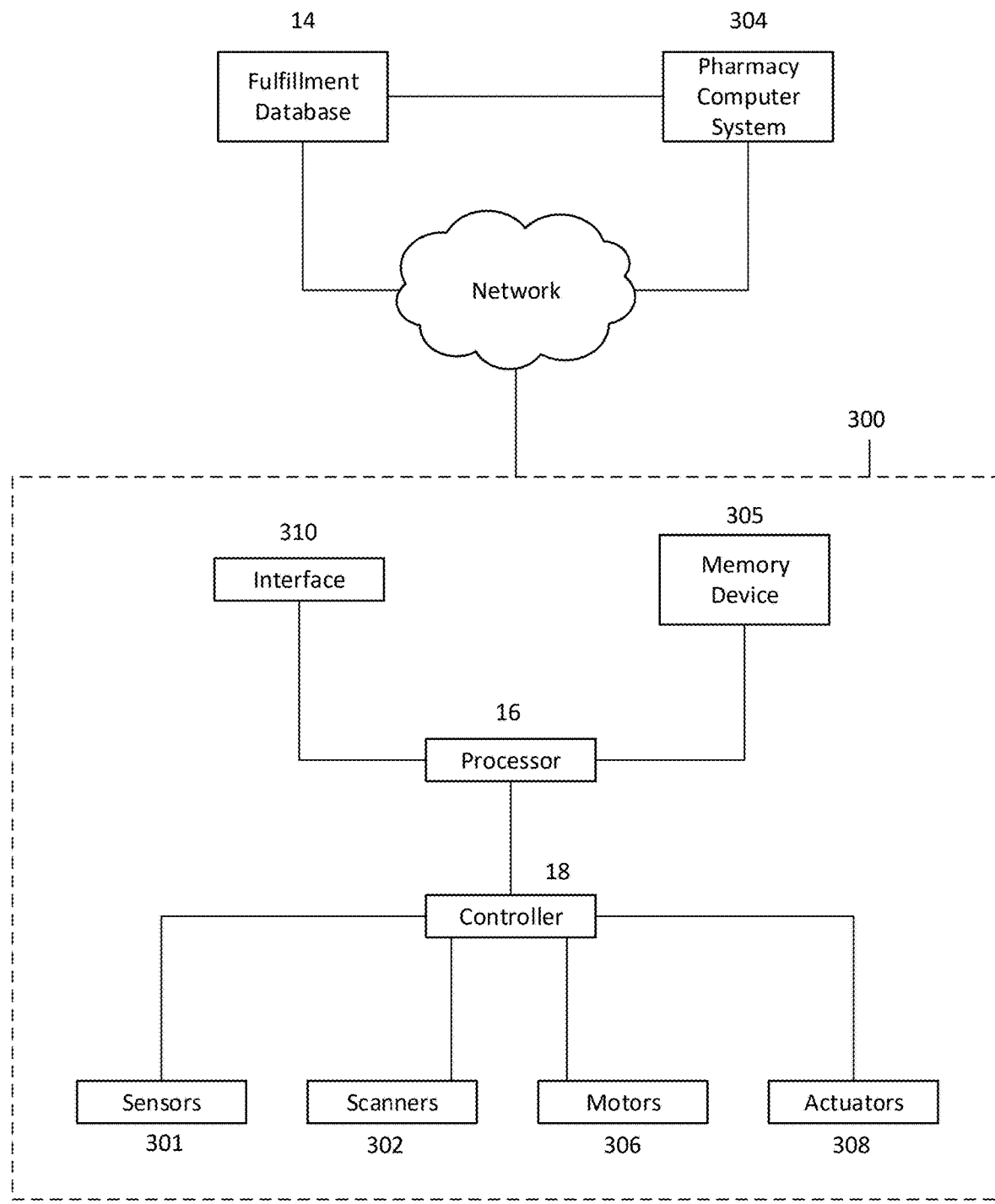
FIG. 3 is a diagram of the communication system in the medication bagger system, according to an example embodiment of the present disclosure.

FIG. 3 illustrates an application server 300 configured to control the medication bagger system 100. The application server 300 may be connected to the medication documentation preparation apparatus 102, the infeed loop apparatus 104, and the packaging apparatus 106 via a local area network ("LAN"), a wireless LAN, a serial connection such as RS 232 or RS 485, a controller area network ("CAN") connection, an Ethernet connection, Open Platform Communications ("OPC"), IO-Links, a hardwire connection, or other various connections as known by a person having ordinary skill in the art. In some embodiments, the application server 300 may communicate using a Fieldbus or Hart communication protocol.

The example application server 300, as illustrated in FIG. 3, includes a memory device 305, an interface 310, a processor 16, and a centralized logic controller 18, though other application servers may further include a workstations, a laptop computer, a distributed computing system, etc. The application server 300 is communicatively coupled to a pharmacy computer system 304 and/or a fulfillment database 14.

The application server 300 may include a memory device 305 that stores machine-readable instructions, which when executed, cause the application server 300 to perform the operations disclosed herein. Additionally, the application server 300 is communicatively coupled to the memory device 305, which may include any random access memory ("RAM"), read only memory ("ROM"), flash memory, magnetic or optical disks, optical memory, or other storage media. The memory device 305 is configured to store instructions for routing the medication documentation 10 and medication containers 20.

In some embodiments, the memory device 305 may store movement instructions regarding the routing of medication documentation 10 and medication containers 20 in a database. In these embodiments, the application server 300 uses the interface 310 to communicate with the medication documentation preparation apparatus 102, the infeed loop apparatus 104, the packaging apparatus 106, and the database in the memory device 305.

In the illustrated embodiment, the application server 300 may be communicatively coupled to the pharmacy computer system 304 via a LAN connection, a serial connection such as RS 232 or RS 485, a CAN connection, an Ethernet connection, OPC, IO-Links, a hardwire connection, or other various connections as known by a person having ordinary skill in the art. In some embodiments, the application server 300 may communicate using a Fieldbus or Hart communication protocol.

The pharmacy computer system 304 is configured to transmit patient information from the fulfillment database 14 to the processor 16 of the application server 300 via the interface 310. Alternatively, the application server 300 receives the patient information directly from the fulfillment database 14. The pharmacy computer system 304 may also provide a queue order that indicates which medication orders are being routed to the medication bagger system 100.

The processor 16 of the application server 300 may include a user interface 311 that provides options for an operator or pharmacist to directly override decisions and movement instructions by the processor 16. The user interface 311 can be a screen that displays parameters such as patient information or information related to the efficiency and efficacy of various components of the medication bagger system 100.

The application server 300 is configured to process the patient information in a defined workflow to ensure a prescription is fulfilled using the medication bagger system 100 via the processor 16. Processing includes the processor 16 determining how the medication order is to be filled and whether both the medication documentation 10 and the medication container 20 are correct at various stages throughout the fulfillment process, as described further below. The processor 16 may be connected to the medication bagger system 100 components through the controller 18. These components such as scanners 302 can be communicatively coupled via a local area network ("LAN"), a wireless LAN, a serial connection such as RS 232 or RS 485, a controller area network ("CAN") connection, an Ethernet connection, Open Platform Communications ("OPC"), IO-Links, a hardwire connection, or other various connections known by a person having ordinary skill in the art. In some embodiments, the processor 16 may communicate using a Fieldbus or Hart communication protocol.

The processor 16 is also communicatively coupled with at least one logic controller 18. The processor 16 can transmit movement instructions to the controller 18, which converts the movement instructions into signals or messages for motors 306 and/or actuators 308 of the medication bagger system 100. The controller 18 includes an interface for receiving movement instructions and receiving updates to movement instructions from the processor 16. The signals and/or messages cause the motors 306 and/or the actuators 308 to move in a specified manner. The motors 306 and actuators 308 receive the signals and/or messages from the controller 18, which are used to directly control the motors 306 and actuators 308. The motors 306 and/or actuators 308 can include pneumatic slides, transport mechanisms such as conveyors, gantries, and/or routers. The controller 18 can include at least one programmable logic controller ("PLC"). In instances where the controller 18 includes PLCs, the controller interface may include a PLC table interface.

In order to properly ensure that a patient receives the appropriate order, the medication container 20 and medication documentation 10 are tracked by sensors 301 and scanners 302. Sensors 301 may be used to track the weight of medication documentation 10 or medication containers 20, verify that medication documentation 10 or medication containers 20 are contained within the medication bagger system 100, as well as determine whether the medication documentation 10 or medication containers 20 are at various stages of the process. The bar codes 11 that are printed or otherwise encoded on medication documentation 10 and each medication container 20 are periodically scanned by scanners 302 throughout the routing, bagging, and packaging processes to verify a match. Scanners 302 read the bar code 11 and transmit the read label (patient) information to the application server 300. It should be appreciated that the scanners 302 identified in the application are exemplary and other scanners 302 may be added or omitted in other embodiments of the medication bagger system 100. Additionally, the plurality of scanners 302 within the medication bagger system 100 need not be configured in the same manner.

As shown in FIG. 3, the sensors 301 and scanners 302 communicate with the controller 18 and processor 16 to determine movement instructions: the appropriate route for the medication documentation 10 and medication container 20. These movement instructions are updated as the application server 300 uses the present location of the medication documentation 10 or medication container 20 to determine one or more next stations that the medication documentation 10 or medication container 20 will pass in the medication bagger system 100.

Medication Documentation Preparation Apparatus Embodiment

Figure 4A:
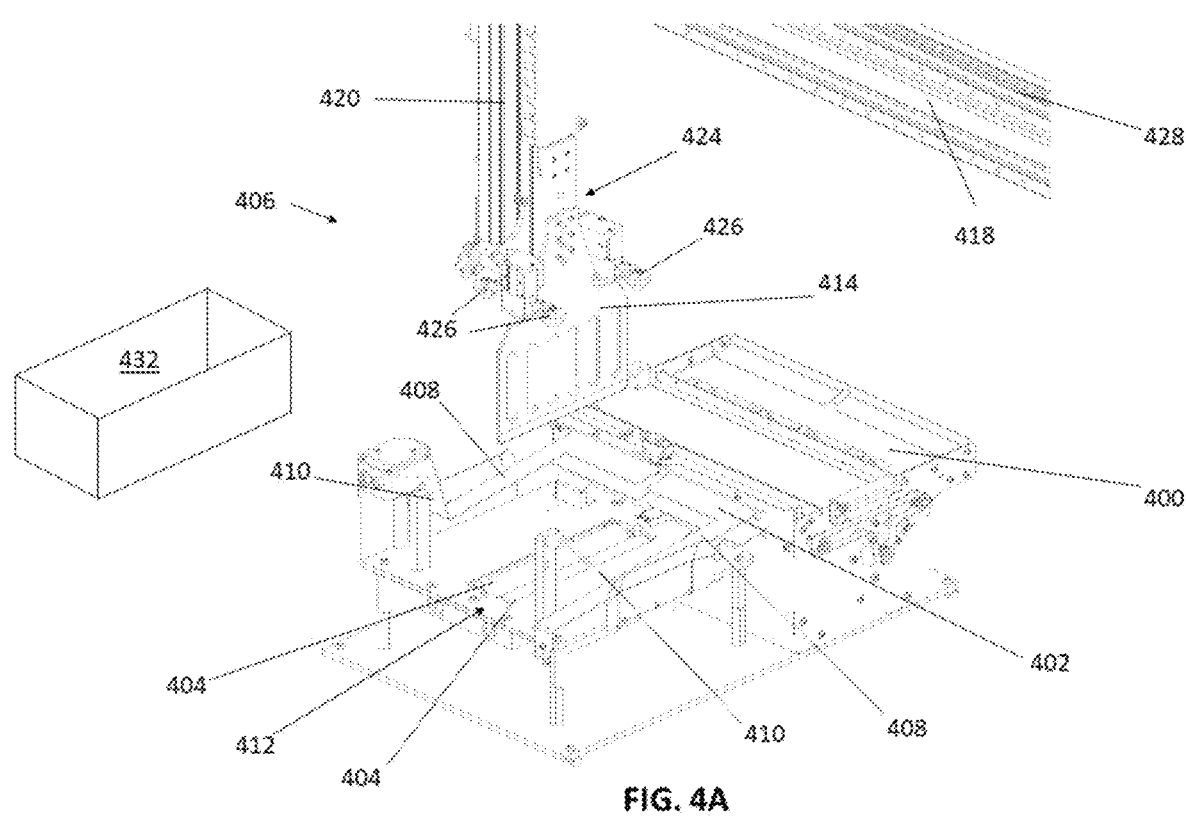
FIG. 4A shows the medication documentation preparation apparatus prior to medication documentation being fed into the apparatus, according to an example embodiment of the present disclosure.
Figure 4B:
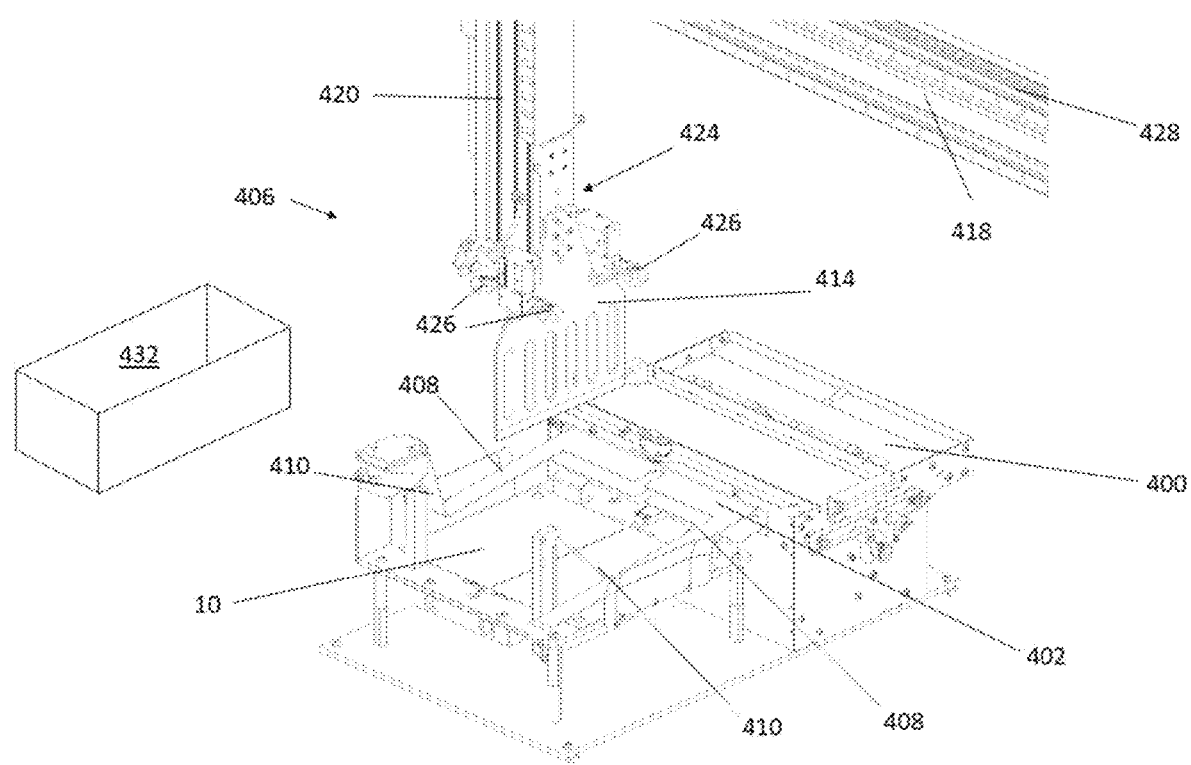
FIG. 4B shows medication documentation fed into the medication documentation preparation apparatus, according to an example embodiment of the present disclosure.
Figure 4C:
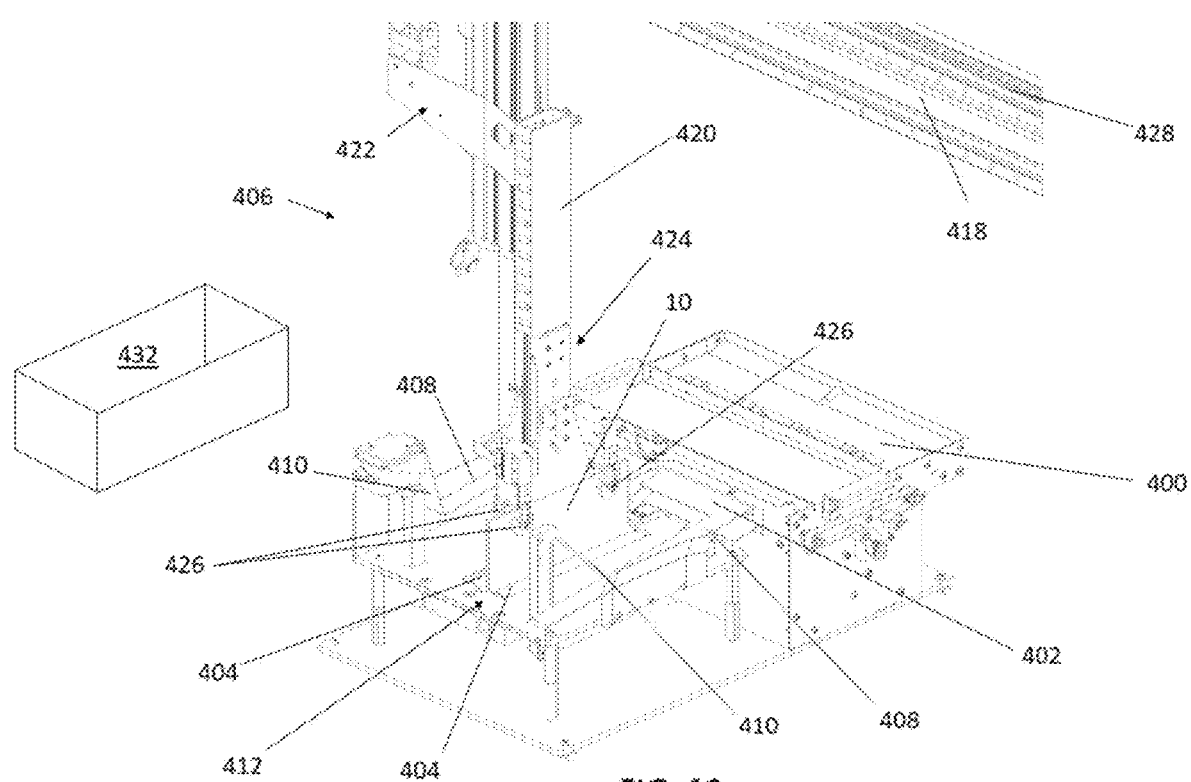
FIG. 4C shows the medication documentation being folded within the medication documentation preparation apparatus, according to an example embodiment of the present disclosure.
Figure 4D:
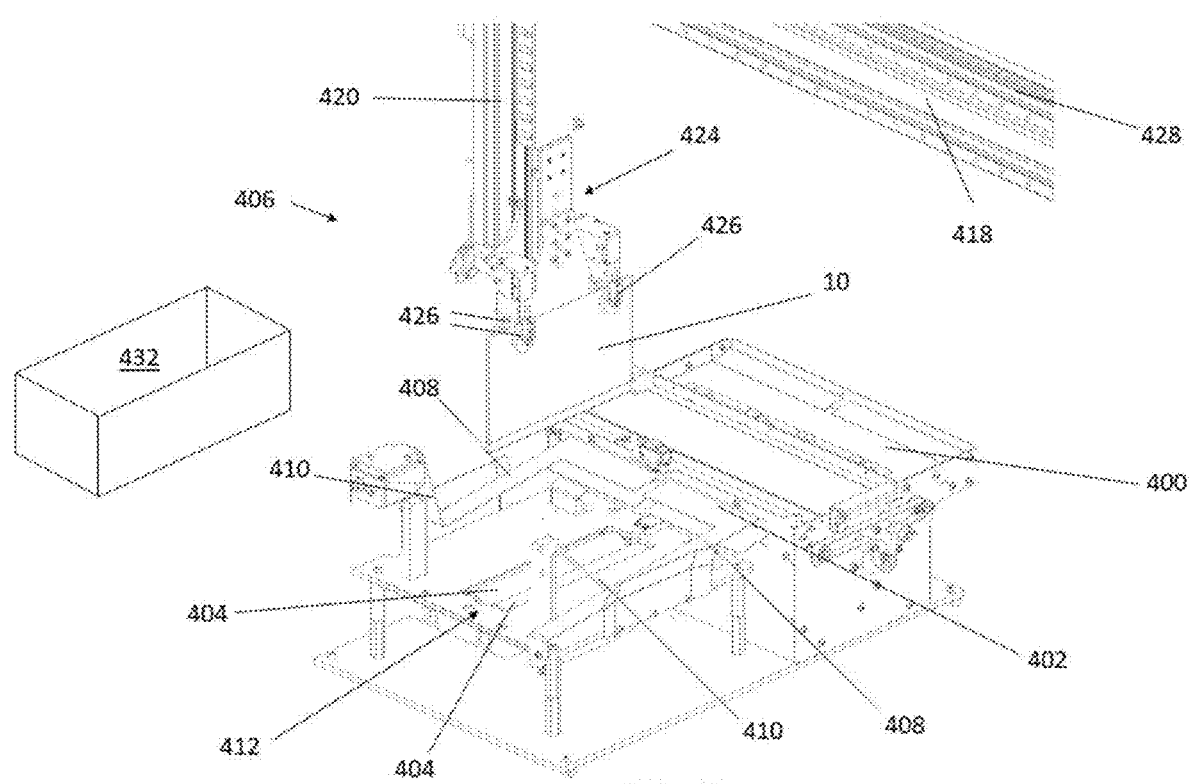
FIG. 4D shows the medication documentation being lifted by the gantry assembly in the medication documentation preparation apparatus, according to an example embodiment of the present disclosure.
Figure 5:
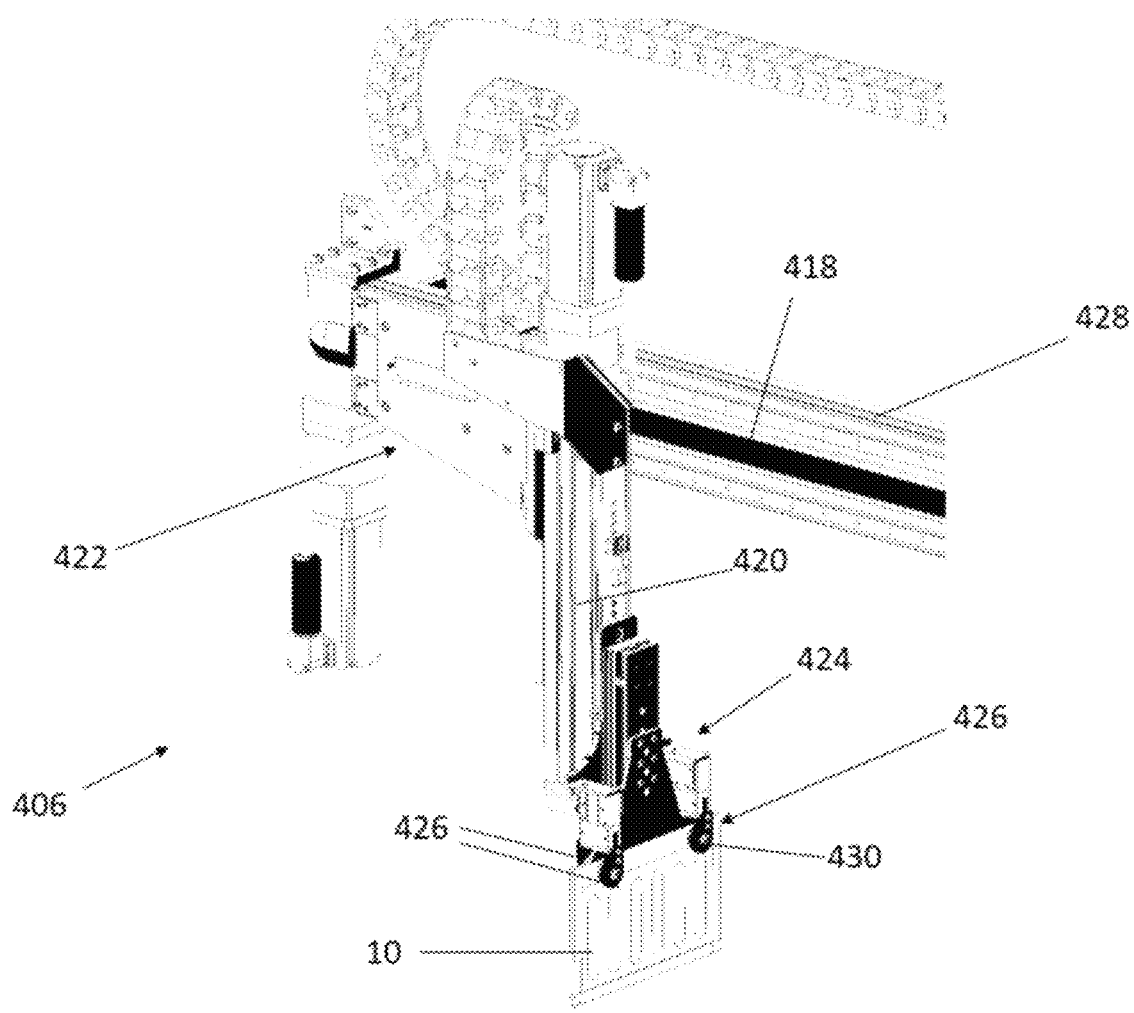
FIG. 5 shows an isometric view of the gantry assembly, according to an example embodiment of the present disclosure.

FIGS. 4A-6 illustrate the medication documentation preparation apparatus 102, which includes at least one printer 400, a tray 402, at least two rollers 404, and a gantry assembly 406, according to an example embodiment of the present disclosure. The medication documentation preparation apparatus 102 also includes a moveable gantry assembly 406. The gantry assembly 406 comprises a first arm 418, a second arm 420 connected to the first arm 418, a pusher 414 connected to an end 424 of the second arm 420, and gantry grippers 426. A close-up view of the gantry assembly 406 is shown in FIG. 5.

The first arm 418 includes a track 428 for the second arm 420 to move along. In the illustrated embodiments, the first arm 418 is approximately parallel relative to the ground and the second arm 420 is approximately perpendicular to the ground. The second arm 420 is configured to move laterally along the length of the first arm 418 by an actuator 308 programmed to receive movement instructions from the controller 18. The second arm 420 is configured to also move vertically by an actuator 308 programmed to receive movement instructions from the controller 18. Affixed at the end 424 of the second arm 420 is the pusher 414. The pusher 414 is a thin component devised to fold medication documentation 10 around it. The pusher 414 may be any material sufficiently strong enough to push paper between the rollers 404. The pusher 414 has a width that is less than the slit 412 formed between the rollers 404 so that the pusher 414 can fit between the slit 412.

Also connected to the end 424 of the second arm 420 are the gantry grippers 426. Each gantry gripper 426 includes at least two arms 430 designed to engage the medication documentation 10. The arms 430 are symmetric to one another. Upon receipt of movement instructions from the processor 16, the controller 18 initiates at least one actuator 308 to extend the gantry grippers 426 to pinch the medication documentation 10. When brought together, the arms 430 move toward one another to squeeze the medication documentation 10. Then, the gantry grippers 426 are configured to hold the medication documentation 10 as the gantry assembly 406 moves. When the gantry grippers 426 are not engaged with the medication documentation 10, the gantry grippers 426 rest at a position perpendicular to the second arm 420. This position allows the pusher 414 to fully fold the medication documentation 10 without the gantry grippers 426 hampering the fold. In some embodiments, a third and fourth gantry gripper 426 are also configured to engage the medication documentation 10. FIGS. 4A-4D show the medication documentation preparation apparatus 102 in various states throughout the medication documentation preparation process. The medication documentation preparation process begins with printing the medication documentation 10. The printer 400 receives the patient information for the medication documentation 10 from the controller 18 and/or the processor 16. The controller 18 triggers a scanner 302 to scan a bar code 11 on a label 22 of a medication container 20 that is located in infeed loop apparatus 104. The bar code 11 is used to poll the fulfillment database 14. The resulting matching information is then relayed back to the controller 18 for printing the medication documentation 10.

In some embodiments, a scanner 302 at the infeed loop apparatus 104 scans a bar code 11 of a next medication container to be dispensed. The scanner 302 may be located at an entrance to the infeed loop apparatus 104 and/or at an exit of the infeed loop apparatus 104. Label patient information read from the scanner 302 is used by the processor 16 to query the fulfillment database 14 to confirm the patient information matches patient information in the fulfillment database 14. After a match is made between the patient information, the processor 16 is configured to use at least some of the patient information to print the medication documentation 10 using the printer 400.

The application server 300 controls the medication documentation preparation apparatus 102. As discussed above, the application server 300 transmits movement instructions to the controller 18, which implement the movement instructions. The controller 18 is communicatively coupled to motor(s) 306 for controlling the positioning of the gantry assembly 406, the movement of the first arm 418, the movement of the second arm 420, and the actuators 308.

The controller 18, in some embodiments, uses Simple Network Management Protocol ("SNMP") to determine when the printer 400 is available to print the patient information to create medication documentation 10. The controller 18 also employs modular printing systems to transmit and receive print commands. This modular printing system can be customized to appropriately control the medication documentation preparation apparatus 102. The custom modular printing system may be built using pre-existing modular printing systems such as Linux Common UNIX Printing System ("Linux CUPS").

There are a variety of printer states that can be returned to the controller 18, which may include information that the printer 400 is ready to print, the printer 400 has open doors that must be manually closed, the printer 400 is out of paper, or that the printer 400 is not ready to print for any other reason.

When the controller 18 determines that the printer 400 is ready to print the medication documentation 10 (block 202 in FIG. 2B), the controller 18 polls the printer 400 to determine if there is a queue of medication documentation 10 to be printed. If the queue is empty, the controller 18 triggers the medication documentation 10 to print. If the queue is not empty, the controller 18 waits until the queue empties before relaying movement instructions to the printer 400. The controller 18 directs the printing queue and can override the already existing queue when the controller 18 determines it to be necessary.

After the medication documentation 10 is printed, the medication documentation 10 exits the printer 400, and it is transferred to the tray 402 by the transporter 416. As shown in FIG. 4A, the tray 402 includes at least two sidewalls 408 and at least one stopper 410 for aligning a center of the medication documentation 10 over at least two rollers 404 upon receipt from the printer 400. The rollers 404 are stationary when the medication documentation 10 arrives in the tray 402 and may be kept stationary by brakes or other stoppage mechanisms as known to a person having ordinary skill in the art. The rollers 404 may be any material sturdy enough that allows the medication documentation 10 to roll. However, in a preferred embodiment, the rollers 404 are a metal, such as a stainless steel, which allows the rollers 404 to freely spin, but not be so light that the rollers 404 slip while assisting in the folding of the medication documentation 10. The rollers 404 have a pre-defined distance, e.g., a slit 412, between them. The slit 412 is a distance into which medication documentation 10 can fold. Because medication documentation 10 can be a range of pages of paper, the slit 412 is large enough to accommodate thicker medication documentation 10. When the medication documentation 10 is folded by the pusher 414 of the gantry assembly 406 as described below, the medication documentation 10 folds into the slit 412.

Upon the printer 400 printing the medication documentation 10, the medication documentation 10 is moved from the printer 400 to a tray 402 by a transporter 416 as shown in FIG. 4B. In illustrated embodiments, the transporter 416 may be a ramp to the tray 402 and guides on the sidewalls 408 of the tray 402 that the medication documentation 10 follows upon the printer 400 ejecting the medication documentation 10 directly onto the tray 402. In other embodiments, the transporter 416 includes paper rollers actuated by a motor 306. In yet other embodiments, the transporter 416 may be a conveyor track, a belt conveyor system, plurality of rollers, or a dial machine indexer. If necessary, the transporter 416 is activated by the controller 18 when the printer 400 begins printing the medication documentation 10.

In some embodiments, the transporter 416 leads the medication documentation to the tray which may include a window located in a middle section of the tray. In some embodiments, the window may be transparent. In other embodiments, the rollers may be located within or beneath the window of the tray.

As shown in FIG. 2B, the medication documentation 10 is verified for accuracy (block 204). Once printed, a sensor 301 measures a number of pages in the medication documentation 10. This may occur at the tray 402 or the transporter 416. The page count must match the page count stored in the fulfillment database 14. When the page count does not match, the medication documentation 10 is rejected for patient safety and security (block 206). In some instances, the processor 16 is configured to receive the information indicative of the page count from the sensor 301. The processor 16 uses a page count in the patient information stored at the fulfillment database 14 to determine at least one page is missing. In some embodiments, the processor 16 causes the gantry assembly 406 via the controller 18 to pick up and move (or push) the incorrect medication documentation 10 to a documentation reject area 432 when a page count is not correct. When the medication documentation 10 is rejected, the controller 18 is configured to instruct the printer 400 to re-print the medication documentation 10.

In addition, the scanner 302 scans the first and last page of the medication documentation 10 to check for a match in the fulfillment database 14. The scanner 302 communicates with the processor 16 to verify the match. When bar codes 11 on either the first or the last page of the medication documentation 10 do not match the patient information in the fulfillment database 14 or cannot be read or scanned, the medication documentation 10 is rejected.

When medication documentation 10 is rejected, the processor 16 determines the proper course of action based on the printer queue and other system parameters. The processor 16 chooses between three courses of action. The medication documentation preparation apparatus 102 continues to operate during a rejection.

A first course of action when the medication documentation 10 is rejected is for the processor 16 to transmit movement instructions to the controller 18 to configure the motor 306 to move the first arm 418 of the gantry assembly 406 to an intermediate position. Once the gantry assembly 406 has been moved, the scanner 302 retries scanning the bar codes 11 to verify that at least one of the bar codes 11 does not match the patient information in the fulfillment database 14.

A second course of action when the medication documentation 10 is rejected is for the processor 16 to transmit movement instructions to the controller 18 to cause the motor 306 to move the first arm 418 of the gantry assembly 406 so that the pusher 414 can push the medication documentation 10 into the slit 412 between the rollers 404 to fold the medication documentation 10 in half. This movement is shown in FIG. 4C. The pusher 414 moves approximately four inches downward in this step, so as to avoid fully pushing the medication documentation 10 through the slit 412 between the rollers 404. When the pusher 414 is moved between the rollers 404, the rollers 404 spin to assist folding the medication documentation 10. After the pusher 414 is in position creating a physical crease on the medication documentation 10, the processor 16 causes the actuator 308 to engage the gantry grippers 426 with the folded medication documentation 10. The gantry grippers 426 pinch the medication documentation 10 and hold the medication documentation 10 as the first arm 418 moves the gantry assembly 406 back upwards away from the rollers 404. The processor 16 then transmits movement instructions to the controller 18 to configure the motor 306 to move the first arm 418 of the gantry assembly 406 to an intermediate position located above a medication documentation reject area 432. The gantry grippers 426 then release the medication documentation 10 into the medication documentation reject area 432 which may be any area configured to hold the rejected medication documentation, such as a discard tray. Then, the gantry assembly 406 returns to a position located above the tray 402 to reset. The tray 402 is now clear for a re-print of the medication documentation 10 and is ready to receive a new copy of the medication documentation 10 from the transporter 416 as illustrated by blocks 206 and 202 in FIG. 2B.

A third course of action when the medication documentation 10 is rejected is for the processor 16 to generate an alert. The alert notifies an operator to manually review the medication documentation 10. The operator may have a handheld scanner 302 to read the bar codes 11 on the medication documentation 10. When the operator determines that the medication documentation 10 does not match the patient information in the fulfillment database 14, the operator can manually remove the medication documentation 10, deposit it into the medication documentation reject area 432, and use the user interface 311 to notify the processor 16 that tray 402 is empty. When the operator determines that the medication documentation 10 matches the patient information in the fulfillment database 14, the operator can manually operate the user interface 311 to notify the processor 16 that the medication documentation 10 is correct.

When both (A) the page count of the medication documentation 10 match the page count listed in the fulfillment database 14, and (B) the bar codes 11 match with the patient information in the fulfillment database 14, the gantry assembly 406 follows a set of movement instructions from the processor 16 (via the controller 18) to prepare and package the medication documentation 10. First, the processor 16 causes the motor 306 to move the gantry assembly 406 to a position aligned with the tray 402 where the pusher 414 is directly above the slit 412. Then, the processor 16 causes the motor 306 to move the first arm 418 of the gantry assembly 406, which causes the pusher 414 to push the medication documentation 10 into the slit 412 between the rollers 404 to fold the medication documentation 10 in half. This is shown in FIG. 4C. The pusher 414 moves approximately four inches downward in this step, so as to avoid fully pushing the medication documentation 10 through the slit 412 between the rollers 404. When the pusher 414 is moved between the rollers 404, the rollers 404 spin to assist the medication documentation 10 in its fold.

After the pusher 414 is in position creating a physical crease on the medication documentation 10, the processor 16 causes the actuator 308 to engage the gantry grippers 426 with the folded medication documentation 10. The gantry grippers 426 pinch the medication documentation 10 and hold the medication documentation 10 as the second arm 420 moves the gantry assembly 406 back upwards away from the rollers 404. A sensor 301 angled towards the rollers 404 verifies that all medication documentation 10 has been lifted by the gantry grippers 426. If not all medication documentation 10 has been lifted, the second arm 420 will retry to grip the medication documentation 10 or the medication documentation 10 will be rejected. The lifted medication documentation 10 can be seen in FIG. 4D.

Figure 6:
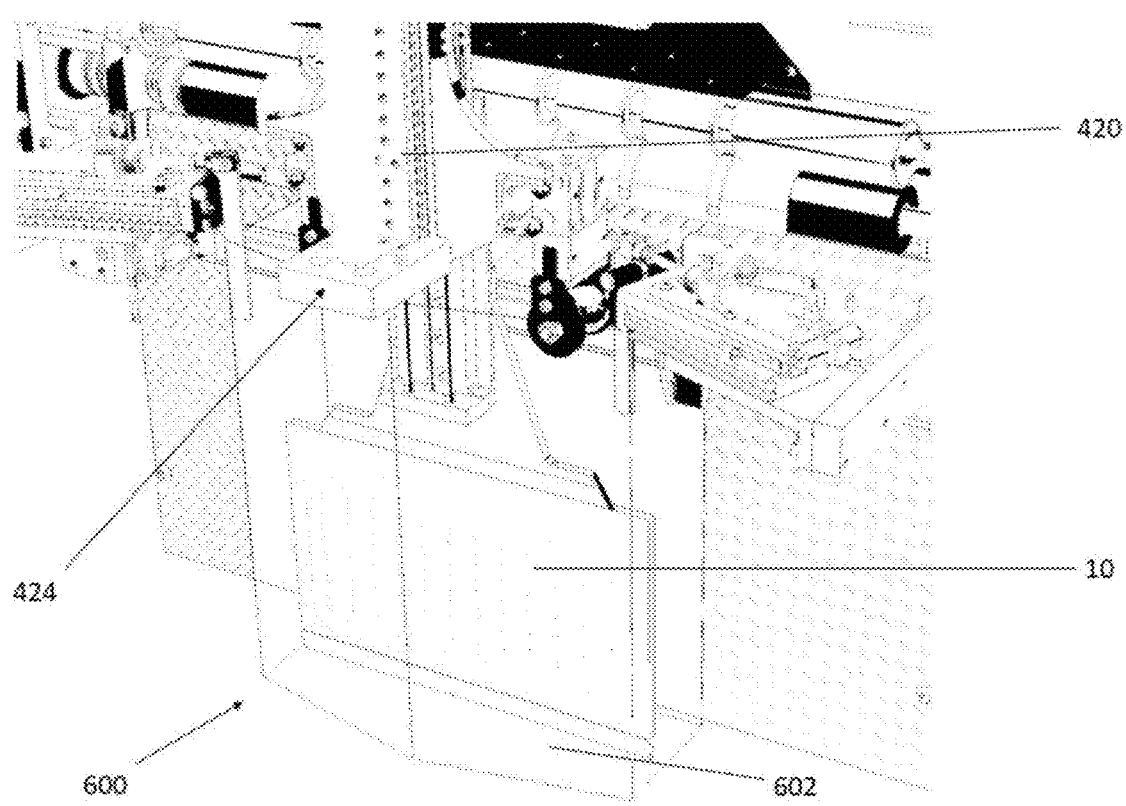
FIG. 6 shows an isometric view of the dispense area, according to an example embodiment of the present disclosure.
Figure 7A:
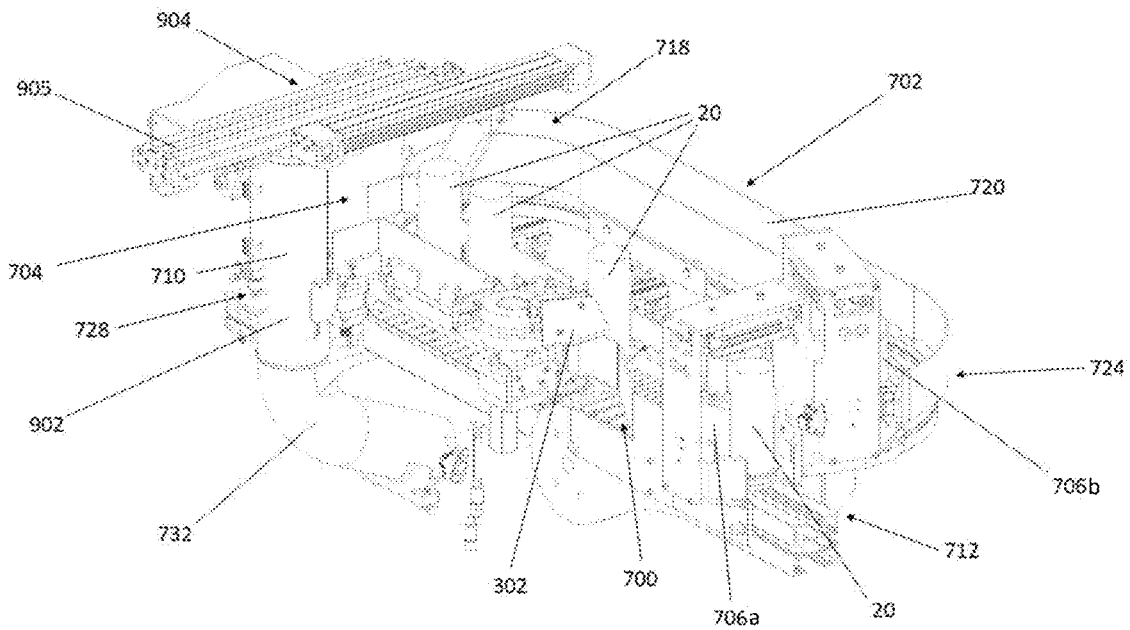
FIG. 7A shows a front view of the infeed loop apparatus, according to an example embodiment of the present disclosure.
Figure 7B:
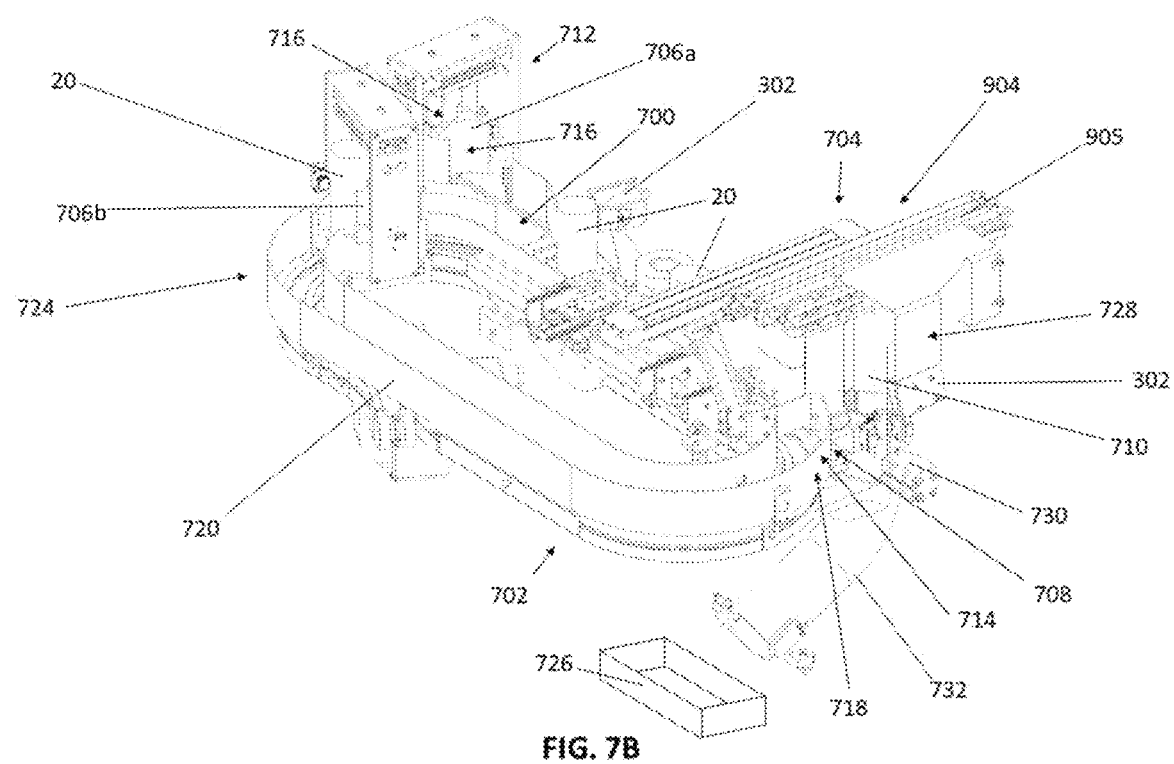
FIG. 7B shows a back view of the infeed loop apparatus, according to an example embodiment of the present disclosure.
Figure 8A:
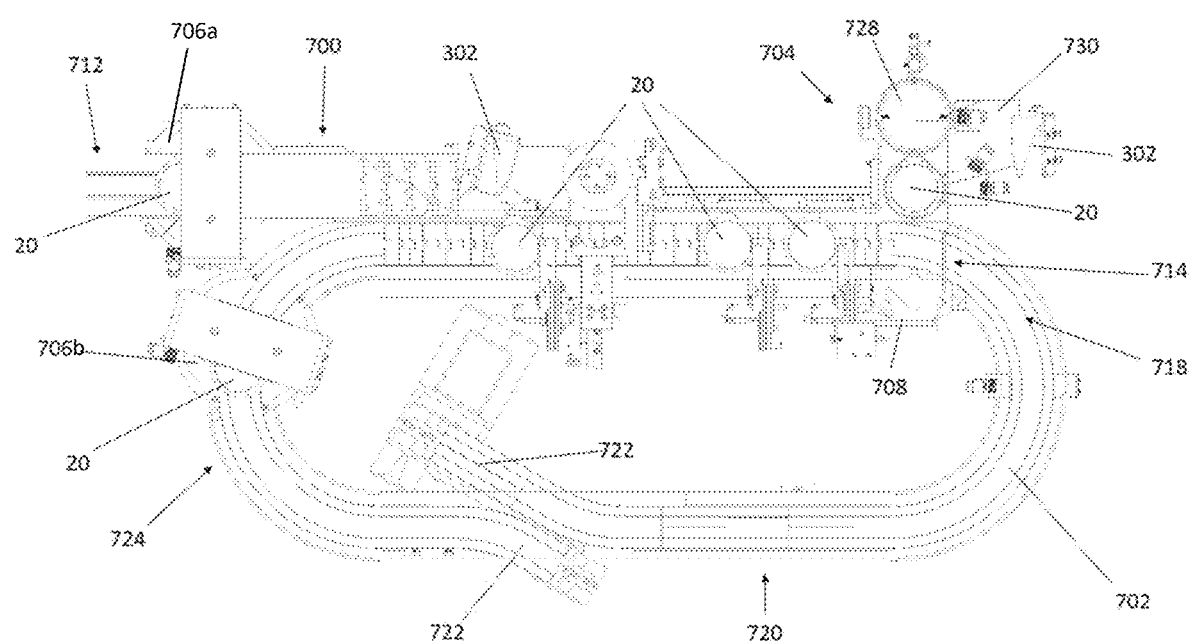
FIG. 8A shows a top view of the infeed loop apparatus with a medication container prior to being pushed into the dispensing tube, according to an example embodiment of the present disclosure.
Figure 8B:
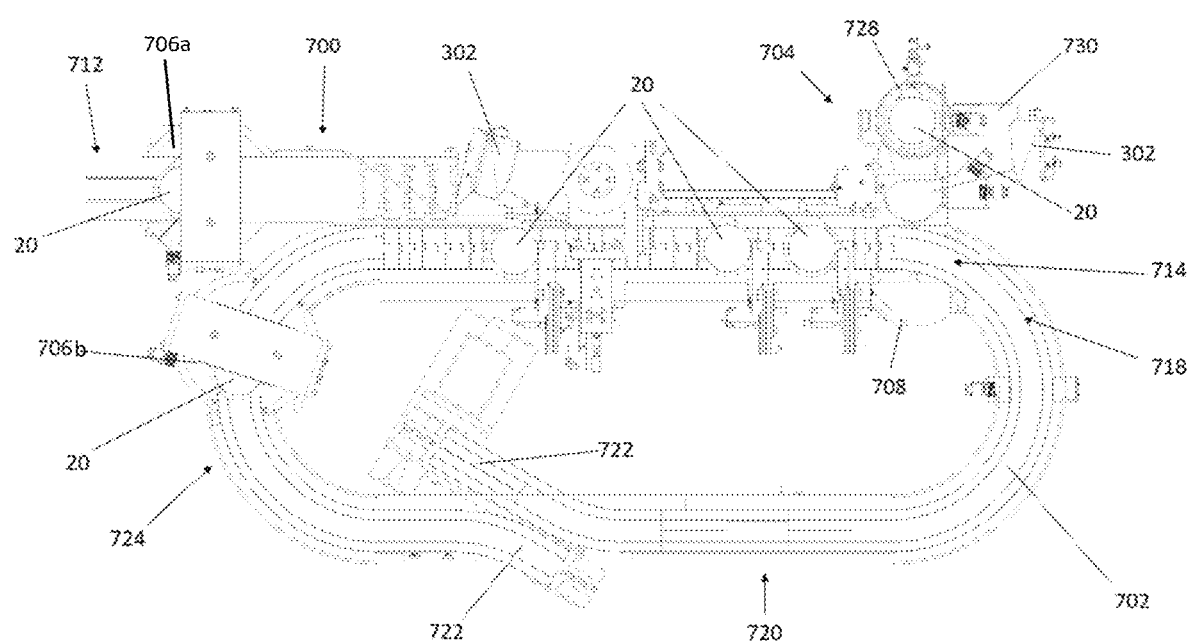
FIG. 8B shows a top view of the infeed loop apparatus with a medication container in the dispensing tube, according to an example embodiment of the present disclosure.

At this point, a scanner 302 located in a dispense area 600 (shown in FIG. 6) scans a bar code 11 located in the dispense area 600 shown in FIG. 6. The dispense area 600 may include a receptacle 602 (e.g., a container) into which the medication documentation 10 can be inserted. The receptacle 602 may be a bag 114 as described in more detail below. When the dispense area 600 includes a receptacle 602, the receptacle 602 has a bar code 11 adhered to its surface. This bar code 11 is scanned by the scanner 302 to verify that the receptacle 602 matches the patient information of the medication documentation 10. In some embodiments, the receptacle 602 omits a bar code such that scanning of the receptacle is omitted.

When the patient information on the receptacle 602 in the dispense area 600 is confirmed to match, the processor 16 causes the motor 306 to move the gantry assembly 406 to a dispense position that is directly above the dispense area 600. The processor 16 then causes the motor 306 to move the second arm 420 of the gantry assembly 406 downward toward the dispense area 600. As the second arm 420 moves, the actuator 308 connected to the pusher 414, pushes the medication documentation 10 down and out of the gantry grippers 426, causing the medication documentation 10 to be pushed thoroughly into any receptacle 602 in the dispense area 600 without losing the fold shape provided by the gantry assembly 406, as shown in FIG. 6. At this point, the medication documentation 10 is folded in the dispense area 600 and removed from the gantry assembly 406. The gantry grippers 426 return to a position perpendicular to the second arm 420 of the gantry assembly 406.

The processor 16 then instructs the motor 306 to return the gantry assembly 406 to its position over the tray 402 to allow the next medication documentation 10 to begin the medication documentation preparation process 102.

Infeed Loop Apparatus Embodiment

FIGS. 7A-9C illustrate the infeed loop apparatus 104, according to an example embodiment of the present disclosure. The infeed loop apparatus 104 includes a feed transport mechanism 700, a diverter transport mechanism 702, an output transport mechanism 704, routers 706a, 706b, a mover 708, and a dispensing tube 710.

The feed transport mechanism 700 is configured to receive pre-labeled medication containers 20 and can receive more than one medication container 20 contemporaneously (block 212 in FIG. 2C). The medication containers 20 may be fed into the feed transport mechanism 700 in a variety of manners, including but not limited to, manually feeding, conveying by conveyor belt or dial machine indexer, or rolling the medication containers 20 down ramps.

In the illustrated embodiment, the feed transport mechanism 700 is a conveyor track. In other embodiments, the feed transport mechanism 700 may be a belt conveyor system, a plurality of rollers, a configuration of ramps and sidewalls, or a dial machine indexer. The feed transport mechanism 700 includes an input end 712, which is configured to receive at least one medication container 20. The feed transport mechanism 700 is connected to the diverter transport mechanism 702, and output transport mechanism 704 at an exit end 714. The feed transport mechanism 700 is configured to move the medication containers 20 towards the exit end 714.

At the input end 712 of the feed transport mechanism 700, a router 706a briefly holds the medication container 20 so that a scanner 302 can scan the bar code 11 located on the label 22 of the medication container 20. The patient information associated with the bar code 11 is transmitted to the processor 16, which compares the label patient information to patient information in the fulfillment database 14. The router 706a, as described below, moves to allow the medication container 20 to continue along the feed transport mechanism 700.

In illustrated embodiments, each router 706a, 706b includes two concave openings 716 intended to receive a medication container 20. In other embodiments, the router 706a, 706b can be any device intended to hold and subsequently route the medication container 20 based on movement instructions received by the controller 18. The routers 706a, 706b are configured to selectively route the medication container 20 based on patient information indicative as to whether the medication container 20 is ready for packaging. In some embodiments, the routers 706a, 706b can rest on a turntable, or routing table, which rotates based on movement instructions received by the controller 18. This can be a 180-degree rotation to allow the medication container 20 to pass by the router 706a, 706b. In other embodiments, the router 706 itself can physically rotate by brackets affixed to either side of the router 706, which are operatively controlled by the controller 18. If the router 706 rotates by itself, it pushes the selected medication container 20 to the appropriate location. In yet other embodiments, the router 706 may be a pusher designed to push the medication container 20 to the appropriate location. It should be appreciated that the routers 706a, 706b identified in the application are exemplary and other routers 706a, 706b may be added or omitted in other embodiments of the medication bagger system 100. Additionally, if multiple routers 706a, 706b exist on the same infeed loop apparatus 104, they need not be configured in the same manner.

At the exit end 714 of the feed transport mechanism 700, the medication container 20, the medication container label 22 is scanned by a scanner 302 to read the bar code 11 on the medication container 20. The patient information associated with the bar code 11 is transmitted by the scanner 302 to the processor 16. The processor 16 is configured to identify if the label patient information contained within the bar code 11 on the medication container 20 matches the patient information in the fulfillment database 14. One of the primary data points verified in the fulfillment database 14 is whether a pharmacist has verified the prescription associated with the patient information.

If the processor 16 identifies that the patient information contained within the bar code 11 on the medication container 20 does not match the patient information in the fulfillment database 14 (or the prescription cannot otherwise be fulfilled), the processor 16 transmits movement instructions causing the controller 18 to not move an actuator 308 which directs the medication container 20 to the diverter transport mechanism 702 (block 218).

The first end 718 of the diverter transport mechanism 702 is also connected to the output transport mechanism 704. If the processor 16 identifies that the label patient information contained within the bar code 11 on the medication container 20 matches the patient information in the fulfillment database 14, the processor 16 transmits movement instructions causing the controller to push the actuator 308 to direct the medication container 20 to the output transport mechanism 704 (block 216).

This is a convergence point of the first end 718 of the diverter transport mechanism 702, the exit end 714 of the feed transport mechanism 700, and the output transport mechanism 704. The first end 718 of the diverter transport mechanism 702 further includes another bar code scanner 302. If the processor 16 identifies that the patient information contained within the bar code 11 on the medication container 20 does not match the patient information in the fulfillment database 14, the processor 16 transmits movement instructions to the controller 18 and the controller 18 does not cause the actuator 308 to move, thus allowing the medication container 20 to continue to the diverter transport mechanism 702. There are two common reasons for the label patient information on the medication container 20 to not match the patient information in the fulfillment database 14. First, a pharmacist may not have manually verified and approved the medication order. Second, the order may have been cancelled. It should be appreciated that these two scenarios identified in the application are merely exemplary and other scenarios may arise where the label patient information does not match the patient information in the fulfillment database 14.

The diverter transport mechanism 702 includes a conveyor track that is configured to have a semi-oval shape with a straight edge 720. In some embodiments, the straight edge 720 of the diverter transport mechanism 702 may include diversions 722 such as those shown in FIGS. 8A and 8B. These diversions 722 may be configured to route medication containers 20 in more complex manners than that described in this application. In other embodiments, the diverter transport mechanism 702 may be a belt conveyor system, a plurality of rollers, a configuration of ramps and sidewalls, or a dial machine indexer. The diverter transport mechanism 702 includes the first end 718 which is connected to the exit end 714 of the feed transport mechanism 700. The diverter transport mechanism 702 also includes a second end 724 connected to the feed transport mechanism 700 near the input end 712 of the feed transport mechanism 700.

If a medication container 20 is in the diverter transport mechanism 702 because a pharmacist has not approved the medication order, an alert is sent from the processor 16 to the pharmacy computer system 304. The pharmacy computer system 304 then notifies a pharmacist to verify the prescription associated with the patient information assigned to the medication container 20, beginning a secondary medication verification as illustrated in block 220 of FIG. 2C. At the second end 724 of the diverter transport mechanism 702, the medication container 20 is held for a defined time period. As an example, the defined time period may be five minutes, ten minutes, fifteen minutes, twenty minutes, or thirty minutes.

During the predetermined time period, the pharmacist can virtually verify the patient information associated with the medication container 20 and can transmit movement instructions to the processor 16. If the pharmacist determines that the medication container 20 and corresponding patient information is correct and should continue from the diverter transport mechanism 702 to the output transport mechanism 704, the pharmacist can virtually notify the application server 300 that the medication container 20 is to be moved from the diverter transport mechanism 702 through use of the pharmacy computer system 304. The medication container 20 is then routed back onto the feed transport mechanism 700 by a router 706b, where the medication container 20 begins the verification process again. Any medication containers 20 in front of the verified mediation container 20 are cycled through the feed transport mechanism 700 back to the diverter transport mechanism 702 since those containers are still not verified but need to be moved to enable the verified mediation container 20 to proceed to bagging.

If the pharmacist does not manually override the alert within the specified time period, the controller 18 is configured to divert the medication container 20 to a medication container reject area 726 at the end of the defined time period (block 206). In illustrated embodiments, the medication container reject area 726 is an area located beneath the output transport mechanism 704. When the defined time period ends, a router 706b at the second end 724 of the diverter transport mechanism 702 directs the medication container 20 to move back onto the feed transport mechanism 700. Once the medication container 20 reaches the first end 718 of the diverter transport mechanism 702, the mover 708 loads the medication container 20 into the dispensing tube 710 located within the output transport mechanism 704. The mover 708 moves along one axis and is configured to direct the medication container 20. The mover 708 contains a concave opening such that when a medication container 20 engages with the mover 708, the mover 708 is able to direct the medication container 20 along its path of travel.

The dispensing tube 710, which normally contains a pin and a pin actuator 730 to act as a floor for the medication container 20 as described below, receives instructions from the controller 18 for the pin actuator 730 to retract the pin away from the dispensing tube 710 so that the medication container 20 falls directly through the dispensing tube 710 and into the medication container reject area 726. In some embodiments, there may be a reject transport mechanism 732 which directs the medication container 20 to a medication container reject area 726 located away from the output transport mechanism 704. In the illustrated embodiments, the reject transport mechanism 732 is a chute.

When the medication container 20 is in the diverter transport mechanism 702 because the medication order has been cancelled, after being routed to the diverter transport mechanism 702, the processor 16 and/or the controller 18 is configured to divert the medication container 20 to the medication container reject area 726 at the end of the defined time period. As an example, the defined time period may be five minutes, ten minutes, fifteen minutes, twenty minutes, or thirty minutes. The defined time period may differ between medication containers 20 that were diverted due to pharmacist error versus medication containers 20 that were diverted due to order cancellation.

If, when the medication container 20 is at the feed transport mechanism 700, the processor 16 identifies that the label patient information contained within the bar code 11 on the medication container 20 matches the patient information in the fulfillment database 14, the processor 16 transmits movement instructions to the controller 18, which causes the mover 708 to direct the medication container 20 to the output transport mechanism 704. In the illustrated embodiment, the mover 708 pushes the medication container 20 off of the feed transport mechanism 700 and onto the output transport mechanism 704. Prior to the processor's 16 movement instructions, the mover 708 remains drawn back so as not to block the feed transport mechanism 700 from the diverter transport mechanism 702.

The output transport mechanism 704 includes a dispensing mechanism 728 to dispense the medication container 20. In the illustrated embodiments, the dispensing mechanism 728 is the dispensing tube 710. In other embodiments, the dispensing mechanism 728 may be a gantry, a claw, a conveyor, or other mover.

The dispensing tube 710 includes an inner tube 900 and an outer tube 902. The inner tube 900 is affixed to a lateral movement section 904 that comprises a frame 905. The outer tube 902 surrounds the inner tube 900 as a sleeve. The outer tube 902, which includes a telescoping section 906, expands vertically to facilitate dispensing of the medication container 20. The dispensing tube 710 also includes a pin at a bottom of the inner tube 900 that acts as a floor for the medication container 20. A pin actuator 730, which is communicatively coupled to the processor 16, is located within the dispensing tube 710 and controls the movement of the pin.

Figure 9A:
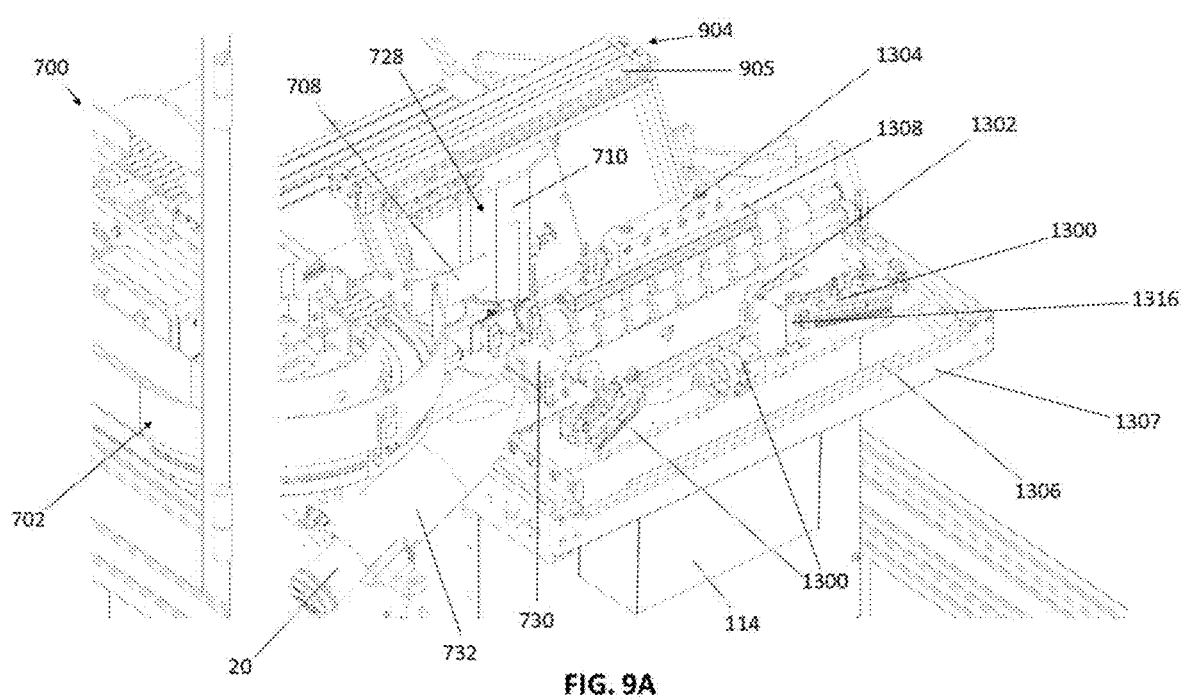
FIG. 9A shows a view of the infeed loop apparatus and the dispensing tube without a medication container, according to an example embodiment of the present disclosure.
Figure 9B:
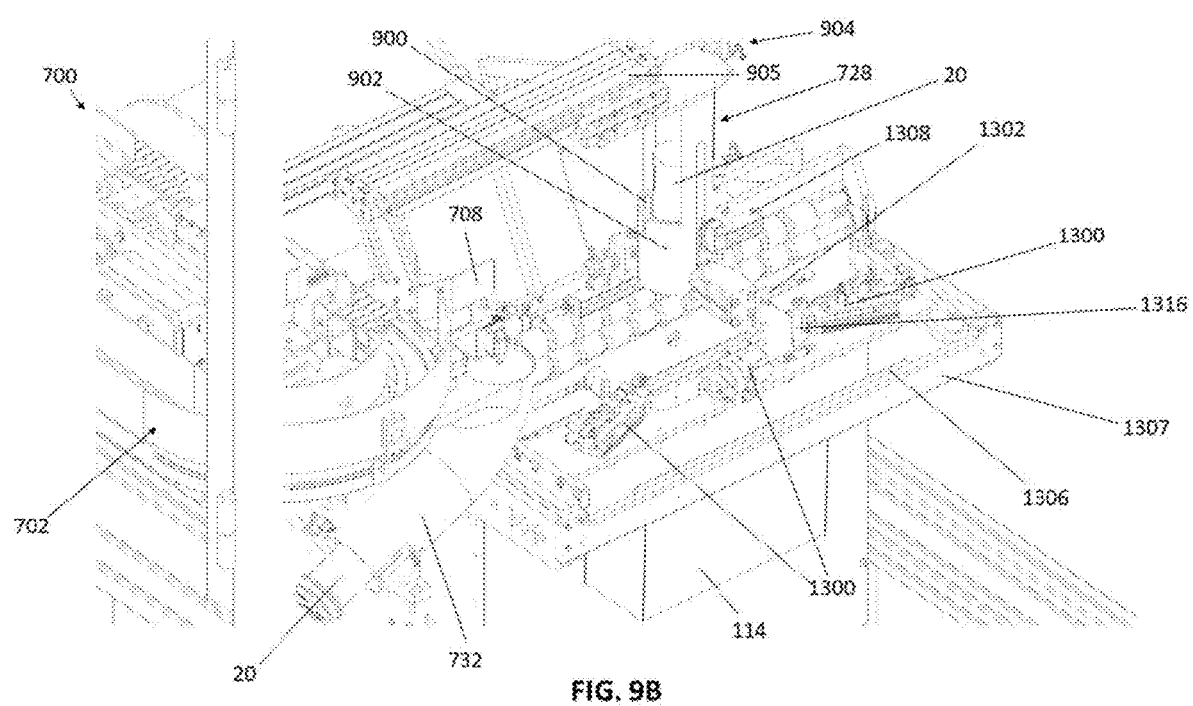
FIG. 9B shows a view of the infeed loop apparatus and the dispensing tube with a medication container in it prior to the telescoping section being expanded, according to an example embodiment of the present disclosure.
Figure 9C:
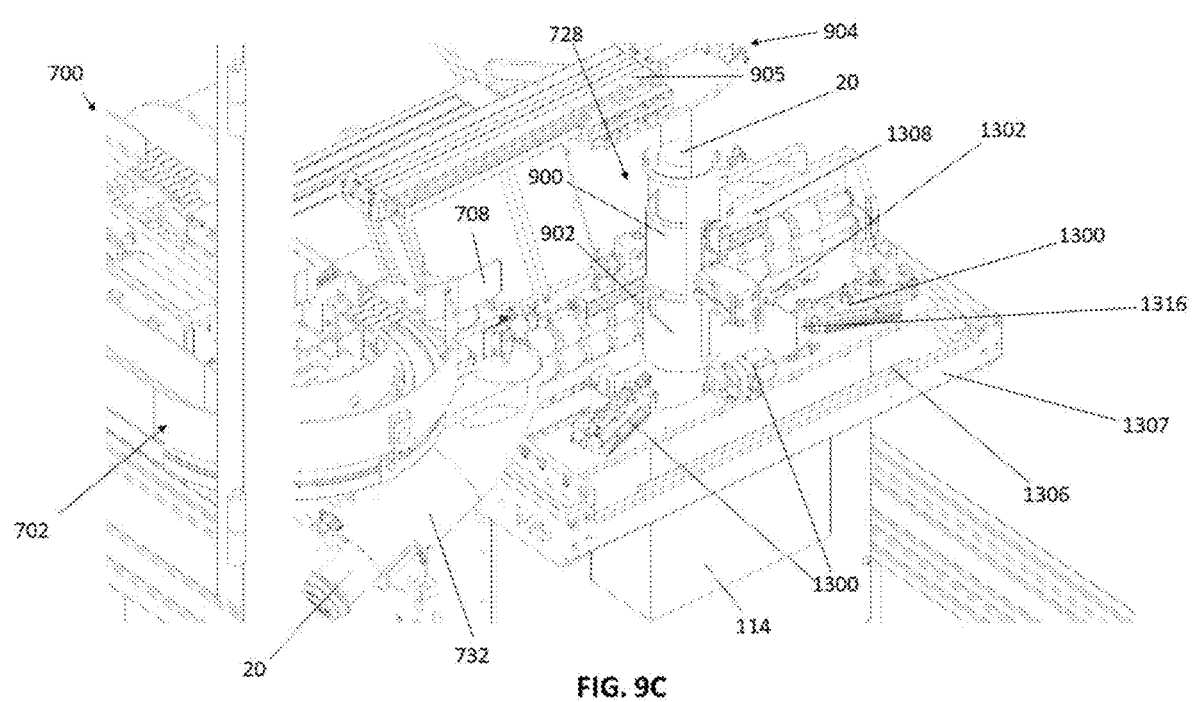
FIG. 9C shows a view of the infeed loop apparatus and the dispensing tube with a medication container in it with an expanded telescoping section, according to an example embodiment of the present disclosure.
Figure 10:
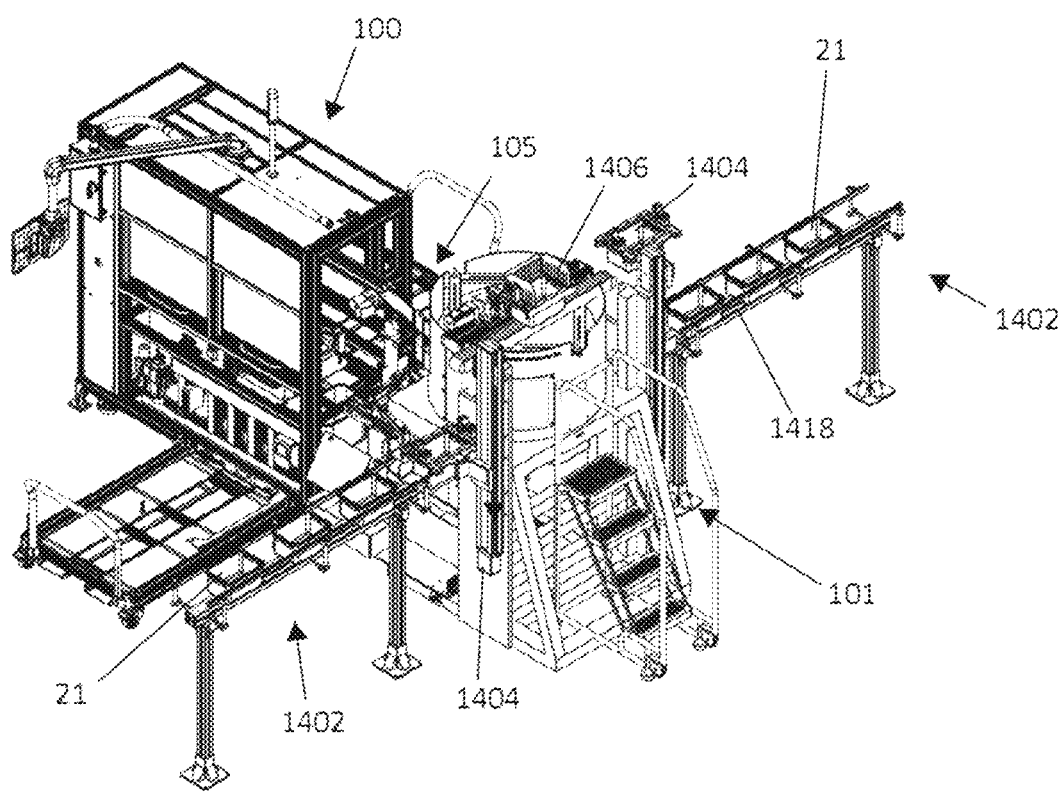
FIG. 10 shows a view of a centrifugal organizer apparatus and the medication bagger system, according to an example embodiment of the present disclosure.

When the medication container 20 is deposited into the dispensing tube 710, the processor 16 relays movement instructions to the controller 18, which directs the lateral movement section 904 to transfer the medication container 20 to a receptacle 602 that is ready to be filled. The lateral movement section 904 can move the medication container 20 contained within the dispensing tube 710 from the output transport mechanism 704 to the receptacle 602, as shown in FIGS. 9A-9C.

After the processor 16 determines that the dispensing tube 710 has arrived at a location directly above an opened receptacle 602, lateral movement of the inner tube 900 stops. As described below, the opened receptacle 602 may be a bag 114 in the packaging apparatus 106. As shown in FIG. 9C, the telescoping section 906 of the outer tube 902 enveloping the inner tube 900 expands vertically downward towards the receptacle 602 to ensure that the medication container 20 is contained within the receptacle prior to dropping the medication container 20. When the telescoping section 906 of the outer tube 902 is fully extended, the pin actuator 730 releases the pin and the medication container 20 falls into the receptacle 602. Though the illustrated embodiments utilize gravity to drop the medication container 20 within the receptacle, other methods known to a person having an ordinary skill in the art may be utilized.

Centrifugal Organizer Apparatus Embodiment

Some orders, such as those with multiple medication containers, may be transported within a fulfillment center in totes 21 for placement in a single or multiple bags. The totes 21 hold medication containers 20 corresponding to a single order and may be any receptacle capable of holding at least one container. It should be appreciated that the totes 21 identified in the application and illustrated in FIGS. 10-21 are exemplary. The centrifugal organizer apparatus 101 disclosed herein can accommodate any tote that is capable of being emptied of medication containers 20 by gravity. The centrifugal organizer apparatus 101 may be altered to accommodate different totes 21, as described below.

FIGS. 10 to 18 illustrate the centrifugal organizer apparatus 101, according to an example embodiment of the present disclosure. The centrifugal organizer apparatus 101 includes a tote transport mechanism 1402, a tote elevator 1404, a tote dumper 1406, a centrifugal feeder 1408, and an exit ramp 1410.

The tote transport mechanism 1402 is configured to receive totes 21 each holding medication containers 20 for a single order to be fulfilled, as shown and described in conjunction with block 232 in FIG. 2D. The tote transport mechanism 1402 receives pre-labeled medication containers 20 in totes 21 that can contain more than one medication container 20 contemporaneously. The medication containers 20 may be manually placed into a tote 21 by a pharmacist or other fulfillment worker or may be automatically fed into the totes 21 in a variety of manners, including but not limited to, manually feeding, conveying by conveyor belt, a plurality of rollers, a dial machine indexer, rolling the medication containers 20 down ramps, or by any other fulfillment device such as a robotic arm.

Figure 11:
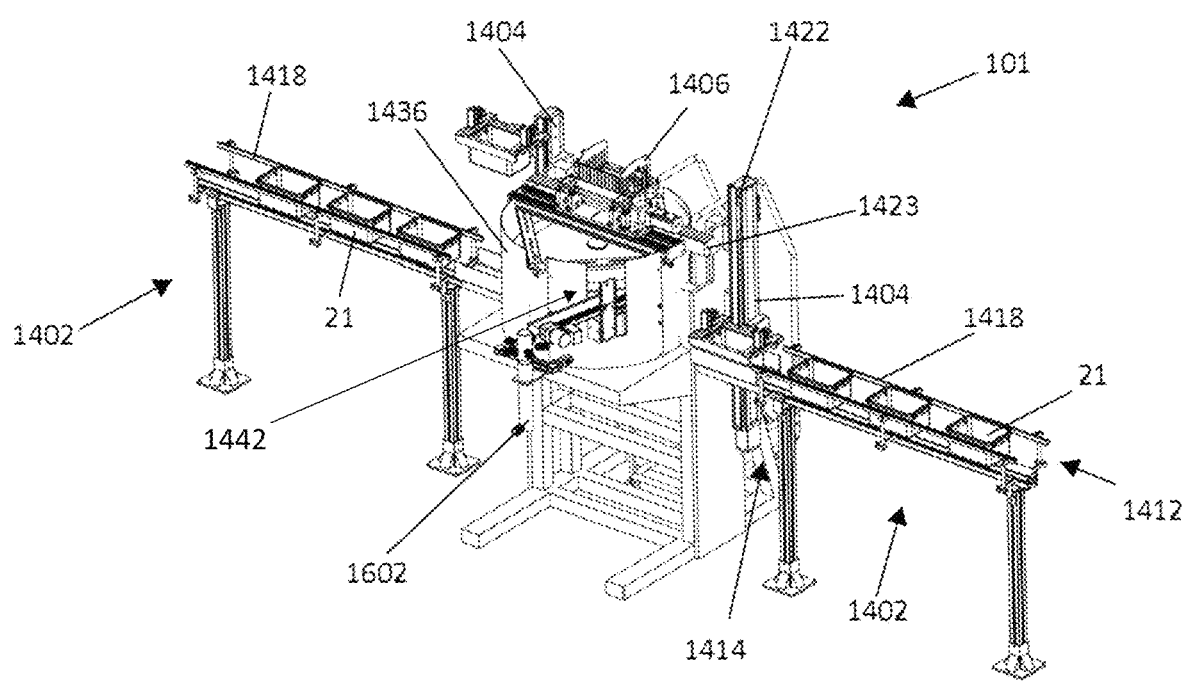
FIG. 11 shows a view of the centrifugal organizer apparatus, according to an example embodiment of the present disclosure.

As shown in FIG. 11, the tote transport mechanism 1402 includes an input end 1412, which is configured to receive at least one tote 21, and an exit end 1414, which is configured to deposit the at least one tote 21 to the tote dumper 1406. The tote transport mechanism 1402 moves the totes 21 from the input end 1412 to the exit end 1414. In some embodiments, such as the illustrated embodiments shown in FIGS. 10 and 11, there may be more than one tote transport mechanism 1402.

In the illustrated embodiments, the tote transport mechanism 1402 is a conveyor track with an elevator capable of carrying totes 21. In other embodiments, the tote transport mechanism 1402 may be a belt conveyor system, a plurality of rollers, or a dial machine indexer. In some embodiments, at the input end 1412 of the illustrated tote transport mechanism 1402, totes 21 are received onto a conveyor track 1416. In some embodiments, the tote transport mechanism 1402 may include rails 1418 to ensure that a tote 21 is successfully deposited onto the conveyor track 1416 and does not fall. The rails 1418 may be configured to allow a lip of the tote 21 to travel along the tote transport mechanism 1402. The tote 21 moves along the tote transport mechanism 1402 until it reaches the exit end 1414 of the tote transport mechanism 1402 (block 234). In some embodiments, the exit end 1414 of the tote transport mechanism 1402 includes a tote elevator 1404 to lift the tote 21 up to allow the tote 21 to be dumped into the centrifugal feeder 1408.

In the illustrated embodiments, the tote transport mechanism 1402 is configured to operate continuously as a horizontal conveyor track. Below the conveyor track are pneumatic cylinders controlled by sensors in communication with a controller 18 that are configured to engage with a bottom side of the conveyor track upon instruction from the controller 18. When engaged, the pneumatic cylinders create a barrier that stops totes 21 traveling along the tote transport mechanism 1402 to create a queue for the tote elevator 1404. While totes 21 are held by the pneumatic cylinders, the conveyor track may continue to run as the chain that is used for the conveyor track may be designed to allow for slip of the totes 21 when the totes 21 are stopped. Sensors in communication with the controller 18 may be used to ensure that the pneumatic cylinders move at appropriate times to ensure sequential passage of totes 21 from the tote transport mechanism 1402 to the tote elevator 1404.

Figure 18:
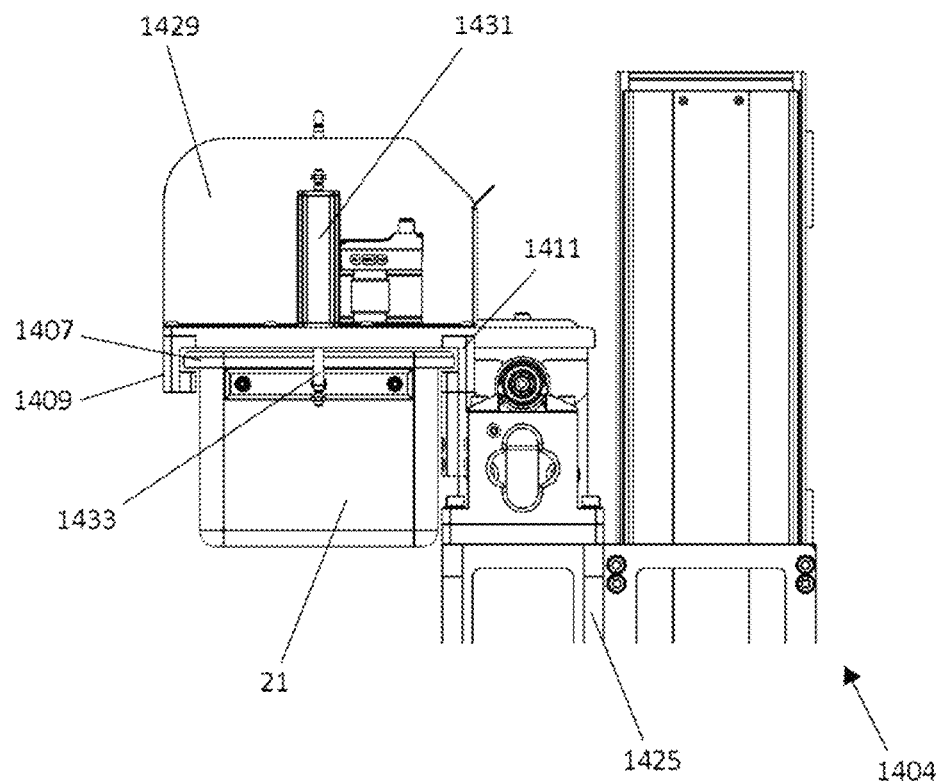
FIG. 18 shows a close-up side view of a tote elevator, according to an example embodiment of the present disclosure.

The tote elevator 1404 includes an elevator frame 1425, a motor 1426, a dowel 1428, arm members 1430, first and second guides 1409, 1411 configured to engage with a lip 1407 on a tote 21, and electric actuators 1431 containing guide pins 1433. The arm members 1430 extend perpendicularly from the elevator frame 1425. Attached at the ends of the arm members 1430 furthest from the elevator frame 1425 is a first guide 1409, which is c-shaped or u-shaped, allowing the lip 1407 of the tote 21 to slide into the first guide 1409. A second guide 1411, which is also c-shaped or u-shaped, is affixed to the elevator frame 1425 and is configured to receive the lip 1407 of the tote 21. When the lip 1407 of the tote 21 is slid between the first and second guides 1409, 1411 as shown in FIG. 18, the tote elevator 1404 may lift the tote 21 from the tote transport mechanism 1402 (block 236 in FIG. 2D).

After the tote 21 is received by the first and second guides 1409, 1411, electric actuators 1431 coupled to the arm members 1430 release guide pins 1433 that extend down on both sides of the tote 21. This prevents the tote 21 from potentially moving side to side during operation of the tote elevator 1404. After the guide pins 1433 are engaged, the processor 16 causes the motor 1426 via the controller 18 to move the tote elevator 1404 from a first position at the exit end 1414 of the transport mechanism 1402 to a second position at a top of the centrifugal feeder 1408. From the tote elevator 1404, the tote 21 may be deposited onto a tote dumper conveyor track 1423, which guides the tote 21 to the tote dumper 1406.

Figure 12A:
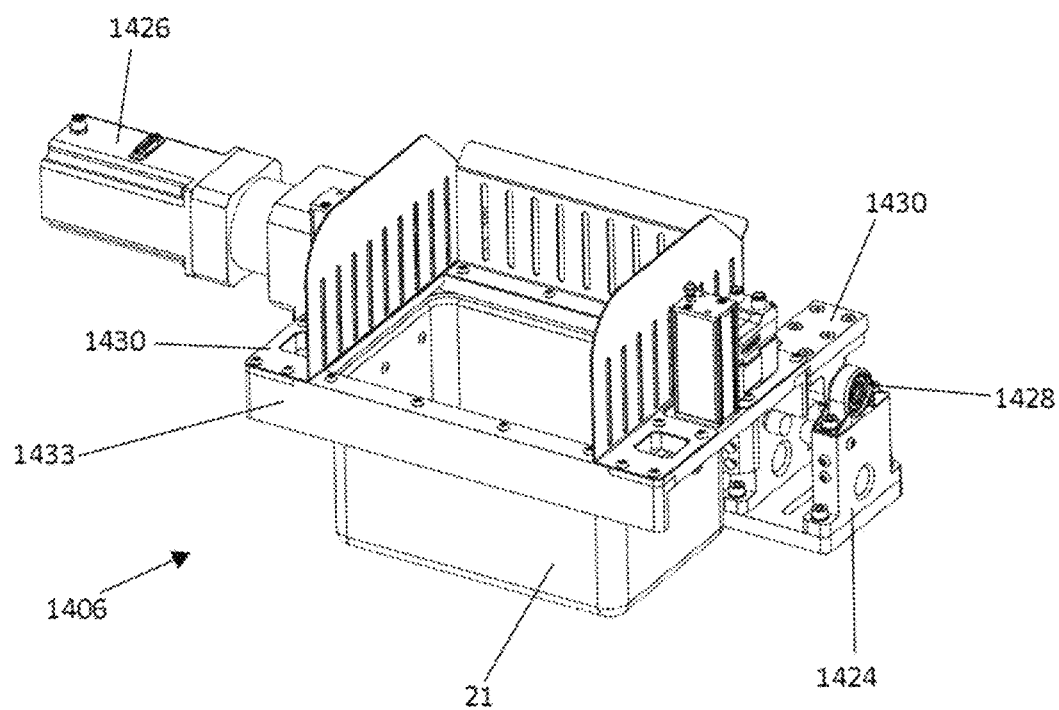
FIG. 12A shows an isometric view of a tote dumper in a holding position, according to an example embodiment of the present disclosure.
Figure 12B:
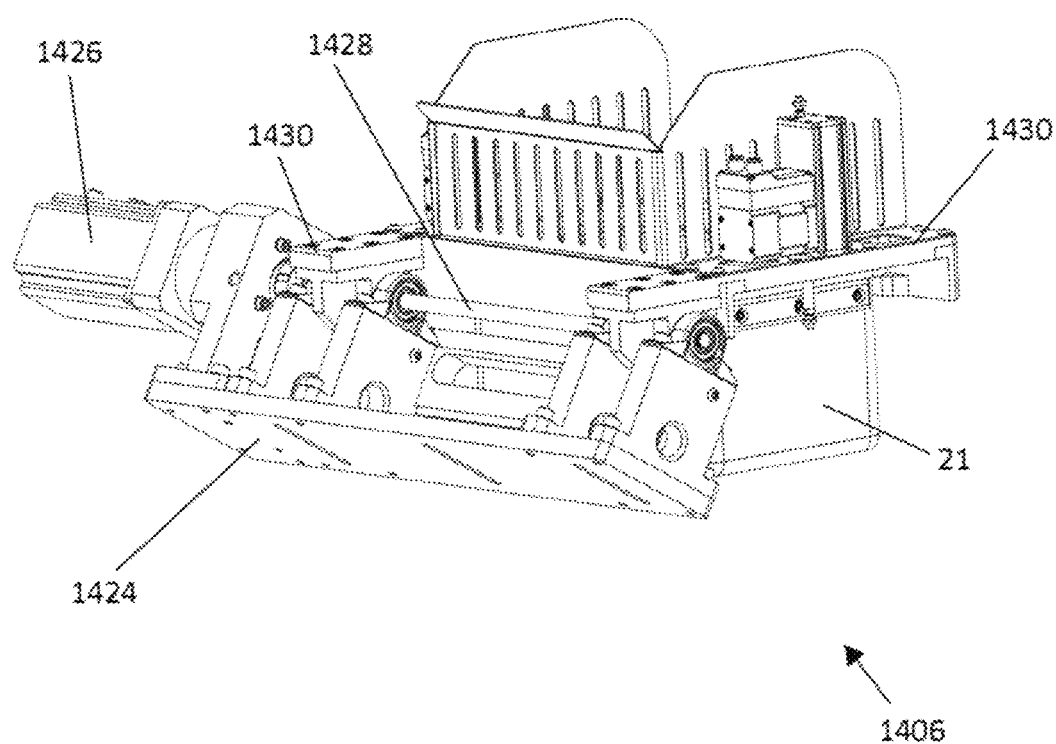
FIG. 12B shows an isometric view of a tote dumper in a dropping position, according to an example embodiment of the present disclosure.

As shown in FIGS. 12A and 12B, the tote dumper 1406 includes a supporting member 1424, a motor 1426, a dowel 1428, and arm members 1430. The supporting member 1424 is affixed to a stationary location on the centrifugal organizer apparatus 101, such as the main frame 108. The supporting member 1424 contains holes through which the dowel 1428 is threaded. Also threaded on the dowel 1428 are arm members 1430 that hold the tote 21. The dowel 1428 is coupled to the motor 1426 such that the motor 1426 can rotate the dowel 1428, which causes the arm members 1430 to follow and thereby deposit the medication containers 20 contained within the tote 21 into the centrifugal feeder 1408 by gravity. As the supporting member 1424 is affixed to a frame 1432 that is suspended above the centrifugal feeder 1408, the supporting member 1424 does not rotate when the motor 1426 is engaged, and thus provides stability for the tote dumper 1406.

Figure 13:
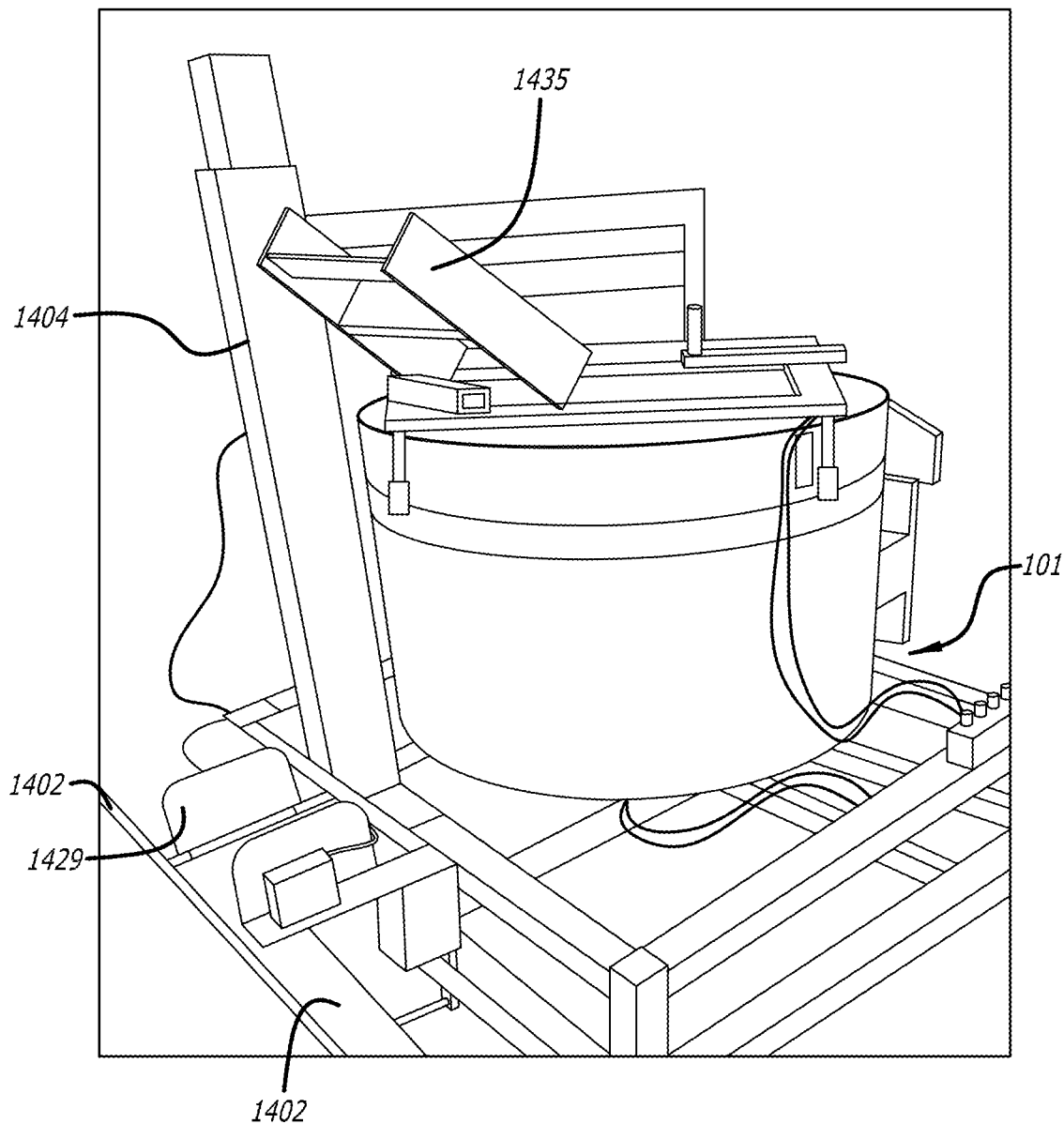
FIG. 13 shows a view of the centrifugal organizer apparatus, according to an example embodiment of the present disclosure.
Figure 14:
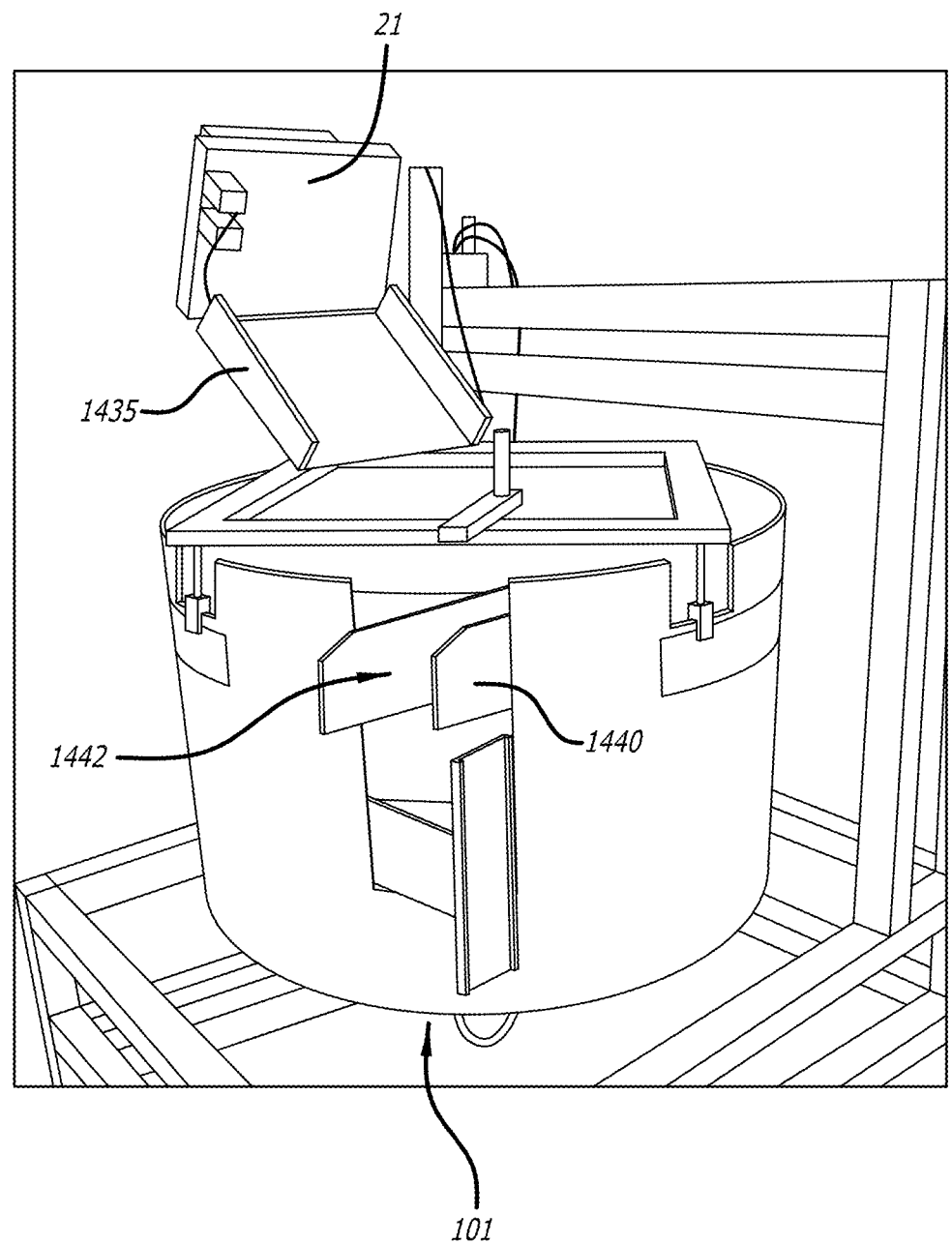
FIG. 14 shows a view of the centrifugal organizer apparatus, according to an example embodiment of the present disclosure.
Figure 15:
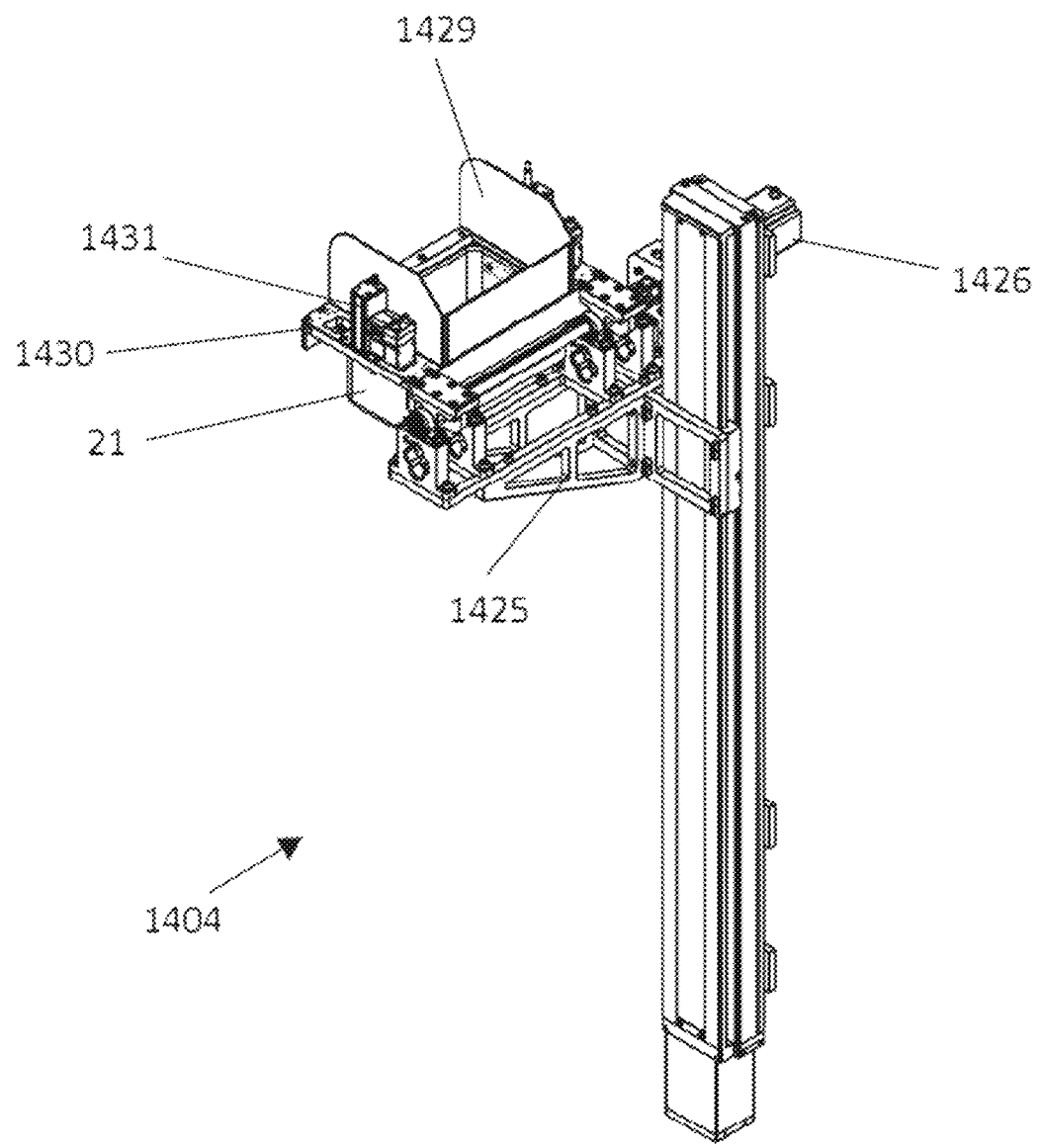
FIG. 15 shows an isometric view of a tote elevator, according to an example embodiment of the present disclosure.
Figure 16:
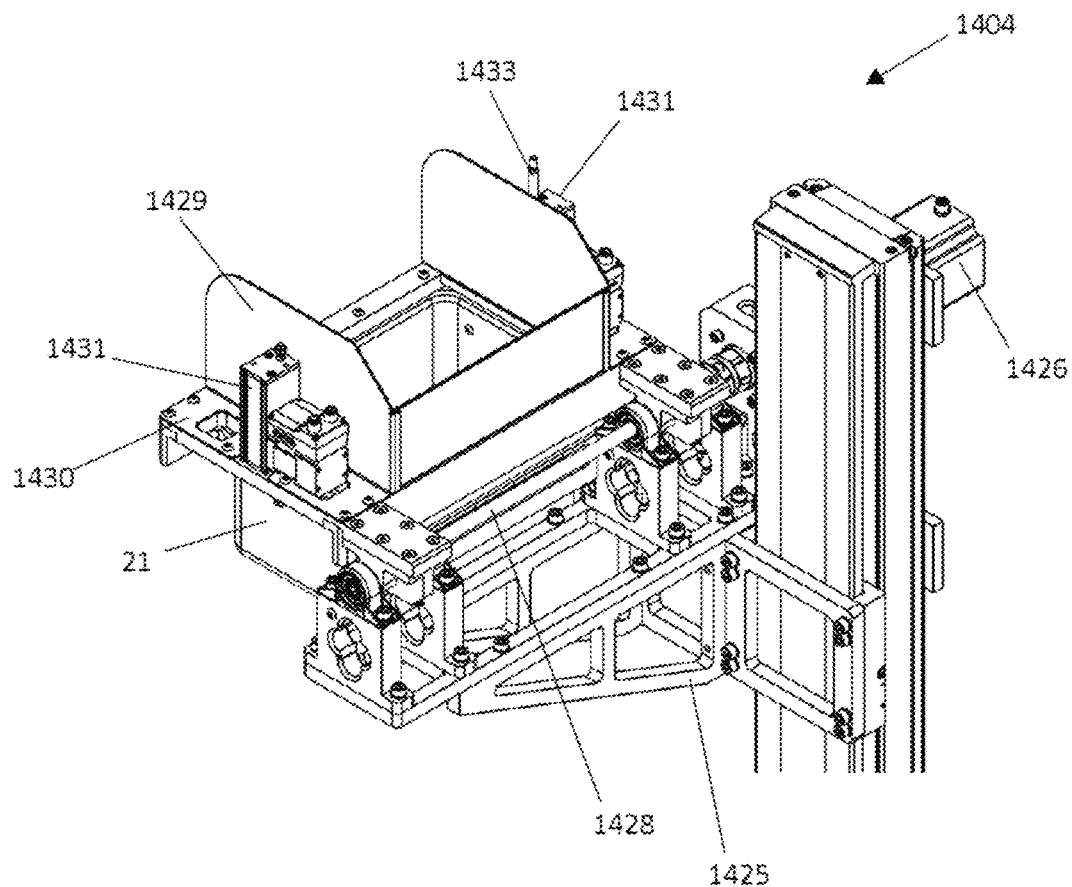
FIG. 16 shows a close-up view of a tote elevator, according to an example embodiment of the present disclosure.
Figure 17:
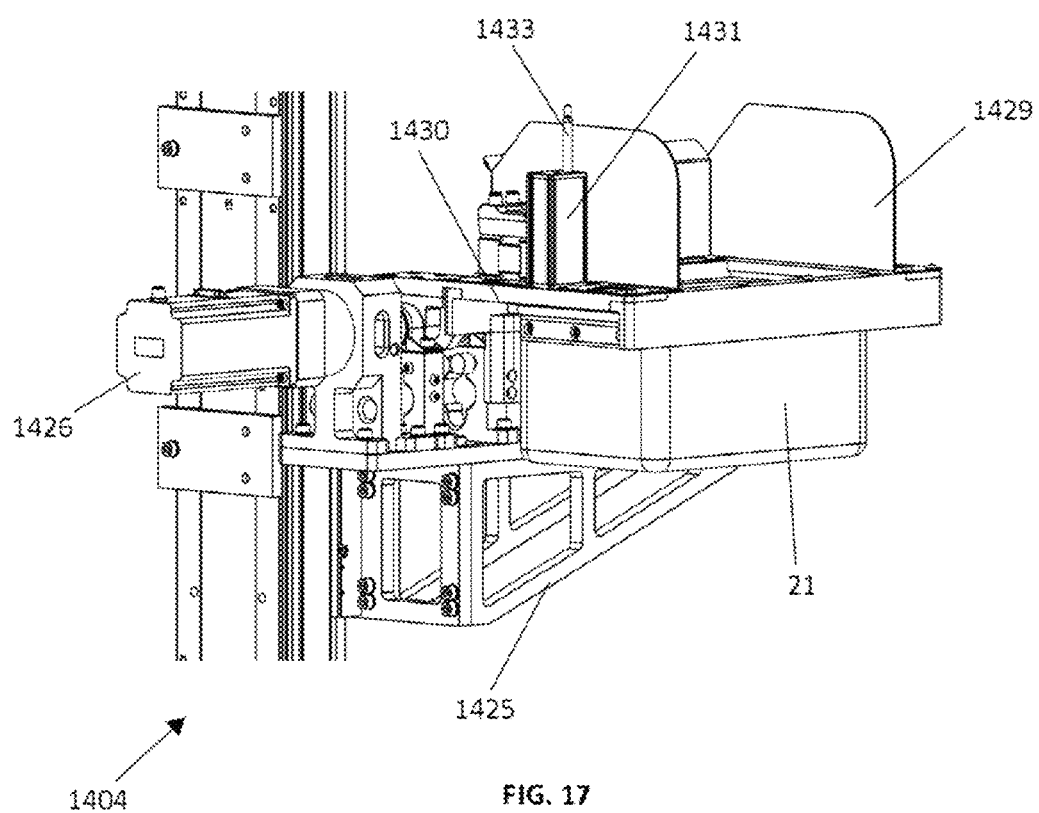
FIG. 17 shows a close-up back view of a tote elevator, according to an example embodiment of the present disclosure.

In a holding position, the arm members 1430 support a tote 21, which is held upright with the medication containers 20. In a dropping position, the motor 1426 is configured to rotate the dowel 1428 about a horizontal axis. In some embodiments such as FIGS. 12A and 12B, the arm members 1430 may be connected by a supporting member 1424. Optionally, the arm members 1430 may include walls 1429 that extend upward from the arm members 1430 to facilitate the exit of the medication containers 20 from the tote dumper 1406 into the centrifugal feeder 1408. A ramp 1435 may also be placed above the centrifugal feeder 1408, as shown in FIGS. 13 and 14, to control the location at which the medication containers 20 drop into the centrifugal feeder 1408. Once the medication containers 20 are dropped, the tote dumper 1406 returns from the dropping position to the holding position and is then lowered to receive another tote 21. Some embodiments may include multiple tote dumpers 1406. This configuration is purely exemplary and other configurations that allow the tote dumper 1406 to release the contents of the tote 21 may be used.

After the contents of the tote 21 have been released (block 238), the tote 21 is placed onto an exit transport mechanism such as a conveyor where it travels back into circulation and is loaded with a new order. The exit transport mechanism may be a continuation of the tote transport mechanism 1402.

Figure 19:
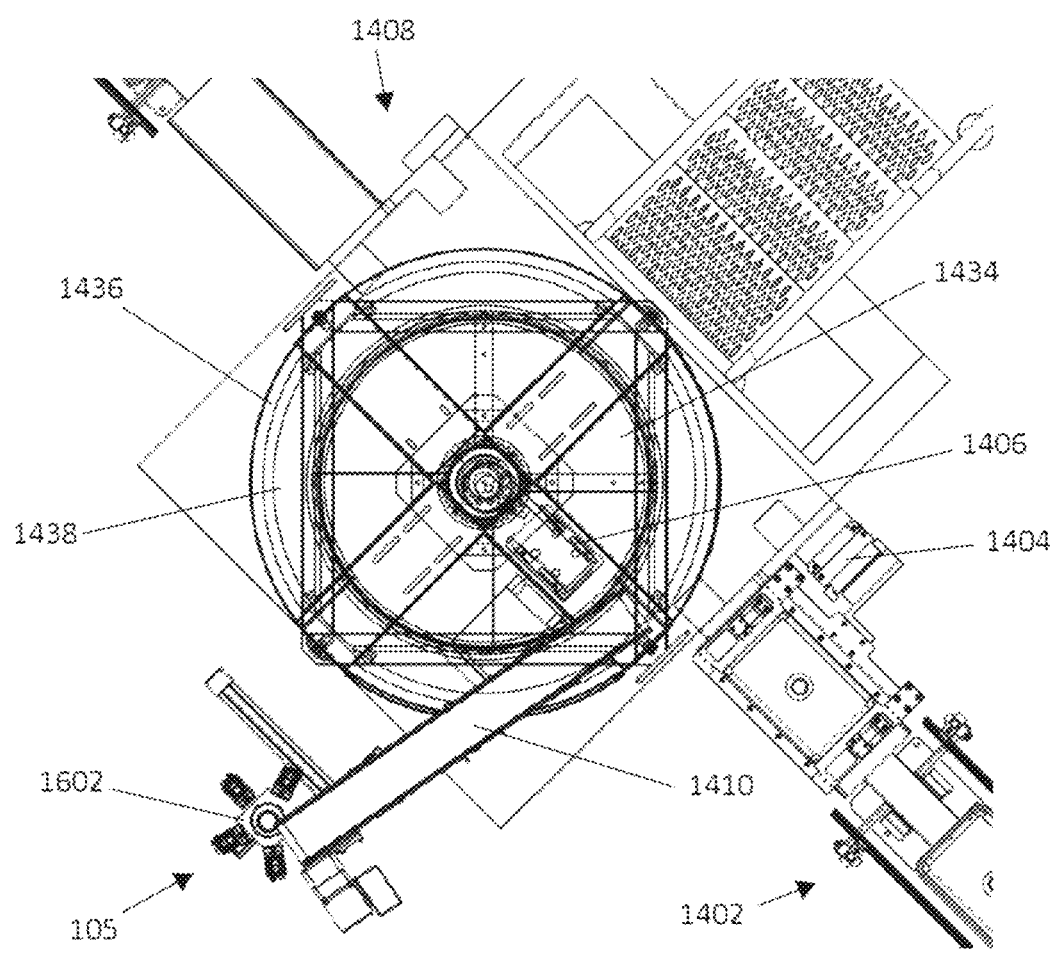
FIG. 19 shows a top view of the centrifugal organizer apparatus, according to an example embodiment of the present disclosure.

The centrifugal feeder 1408 includes a rotatable conical diverter 1434, an external wall 1436, and a horizontal platform 1438. The external wall 1436 of the centrifugal feeder 1408 creates a vertical wall that encompasses the other components of the centrifugal feeder 1408. The external wall 1436 may be comprised of any material strong enough to support the other components of the centrifugal feeder 1408 and to support medication containers 20 coming into contact with the external wall 1436. Attached perpendicularly to the external wall 1436 is a horizontal platform 1438. The horizontal platform 1438 is affixed along the perimeter within the centrifugal feeder 1408. The horizontal platform may be comprised of any material strong enough to support medication containers 20 coming into contact with the horizontal platform 1438. As shown in FIGS. 11 and 19, a hole within the external wall 1436 allows the horizontal platform 1438 to connect to the exit ramp 1410, as described below. Near the exit ramp 1410, an exit ramp wall 1440 (shown in FIG. 14) may be placed adjacent to the horizontal platform 1438 to prevent medication containers 20 from traveling along the exit ramp 1410 without built-up speed from the centrifugal force.

Figure 20:
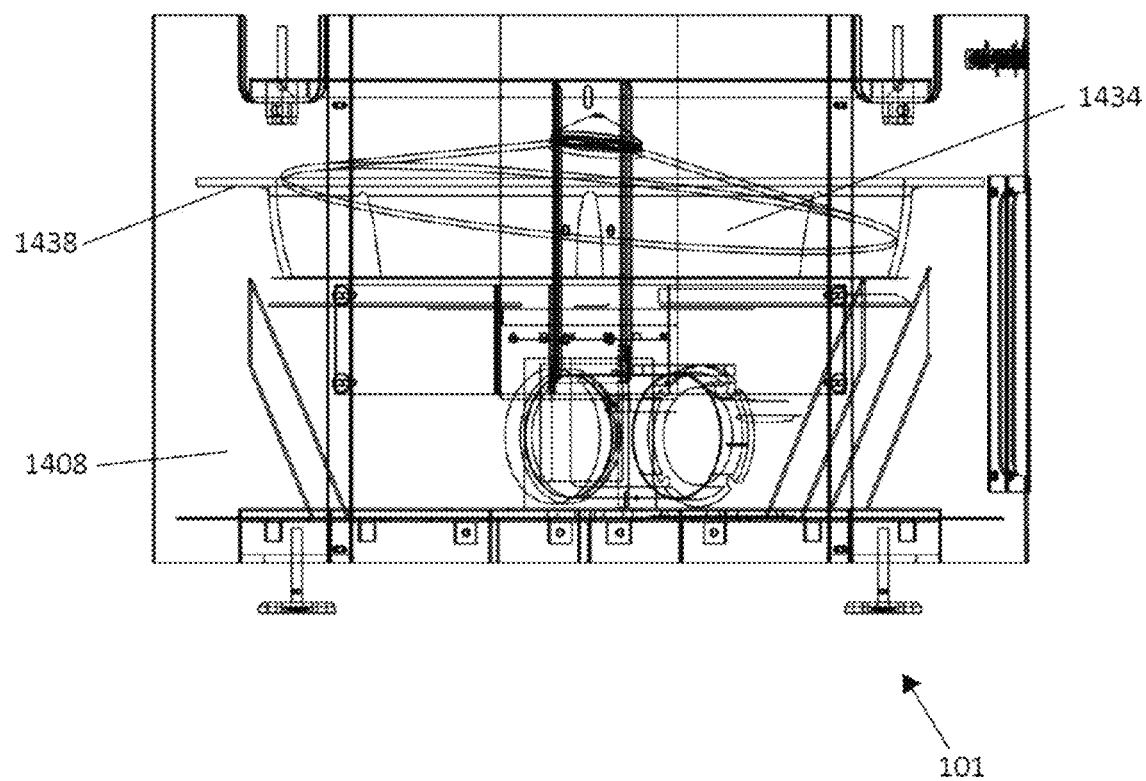
FIG. 20 shows a side view of the centrifugal organizer apparatus, according to an example embodiment of the present disclosure.

The horizontal platform 1438 surrounds the conical diverter 1434. The conical diverter 1434 can be comprised of any material capable of exhibiting a smooth surface allowing the medication containers 20 within the centrifugal feeder 1408 to slide along the conical diverter 1434. Thus, materials that exhibit lower coefficients of friction with the medication containers 20 are ideal. The conical diverter 1434 has a circular base with a raised center creating a conical shape having an apex in its middle. From the center of the conical diverter 1434, the conical diverter 1434 is sloped downward creating a ramp from the center of the conical diverter 1434 to the outer perimeter. The conical diverter 1434 rests within the centrifugal feeder 1408 at a non-horizontal angle such that the conical diverter 1434 creates an angle with the ground. As the conical diverter 1434 rotates in the centrifugal feeder 1408, the conical diverter 1434 guides the medication containers 20 with centrifugal force to the external wall 1436 and the horizontal platform 1438 of the centrifugal feeder 1408 when the conical diverter 1434 rotates. From a side view, as shown in FIG. 20, the higher end of the perimeter of the conical diverter 1434 is at the same height as the horizontal platform 1438.

The conical diverter 1434, which is powered by a motor 306, rotates as medication containers 20 enter the centrifugal feeder 1408 from the tote dumper 1406. The rotation of the conical diverter 1434 creates centrifugal force such that the medication containers 20 within the centrifugal feeder 1408 are directed to the external wall 1436 located adjacent to the circumference of the conical diverter 1434. Additionally, the sloped surface of the conical diverter 1434 further guides the medication containers 20 to the external wall 1436. Because the conical diverter 1434 is at an angle with the ground creating a high end and a low end, the rotation pattern of the conical diverter 1434 raises the medication containers 20 up to the level of the horizontal platform 1438 at which point the centrifugal force pushes the medication containers 20 onto the horizontal platform 1438. Ideally, the medication containers 20 will be under a centrifugal force high enough such that the medication containers 20 continue along the horizontal platform 1438 to an exit ramp 1410. The horizontal platform 1438, or base ledge, is stationary and is perpendicular to the external wall 1436 of the centrifugal feeder 1408.

In instances where the medication containers 20 are stopped on the horizontal platform 1438, sensors in the pneumatic container travel system 105 detect missing medication containers 20 from an order and reject the order as described below. Operator intervention may be necessary to remove the medication containers 20 from the horizontal platform 1438.

An aperture 1442 within the external wall 1436 allows the horizontal platform 1438 to meet the exit ramp 1410. The exit ramp 1410 includes a horizontal platform causing the medication containers 20 to travel to the pneumatic container travel system 105, which is discussed in further detail below. Additionally, scanners may be directed at the exit ramp 1410 which are configured may be directed to read bar codes 11 on the medication containers 20 to determine if the bar codes 11 match the patient information in the fulfillment database 14.

Linear Organizer Apparatus Embodiment

Figure 21:
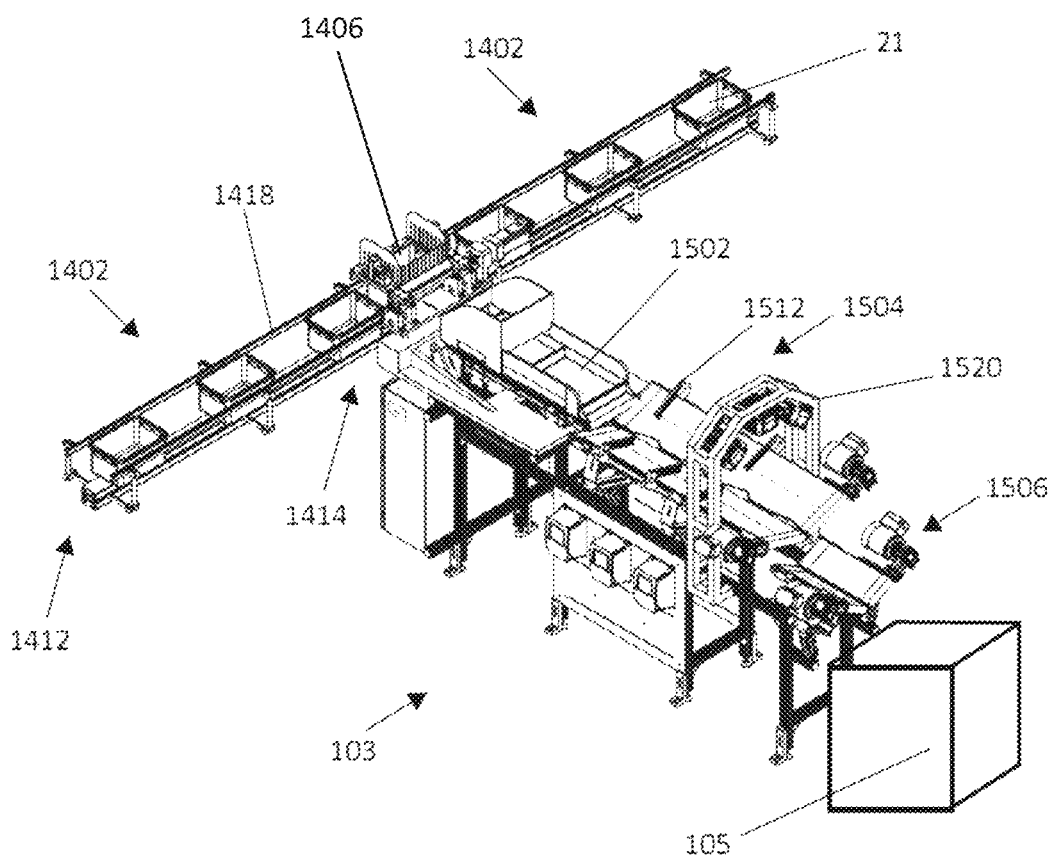
FIG. 21 shows a view of a linear organizer apparatus, according to an example embodiment of the present disclosure.
Figure 22:
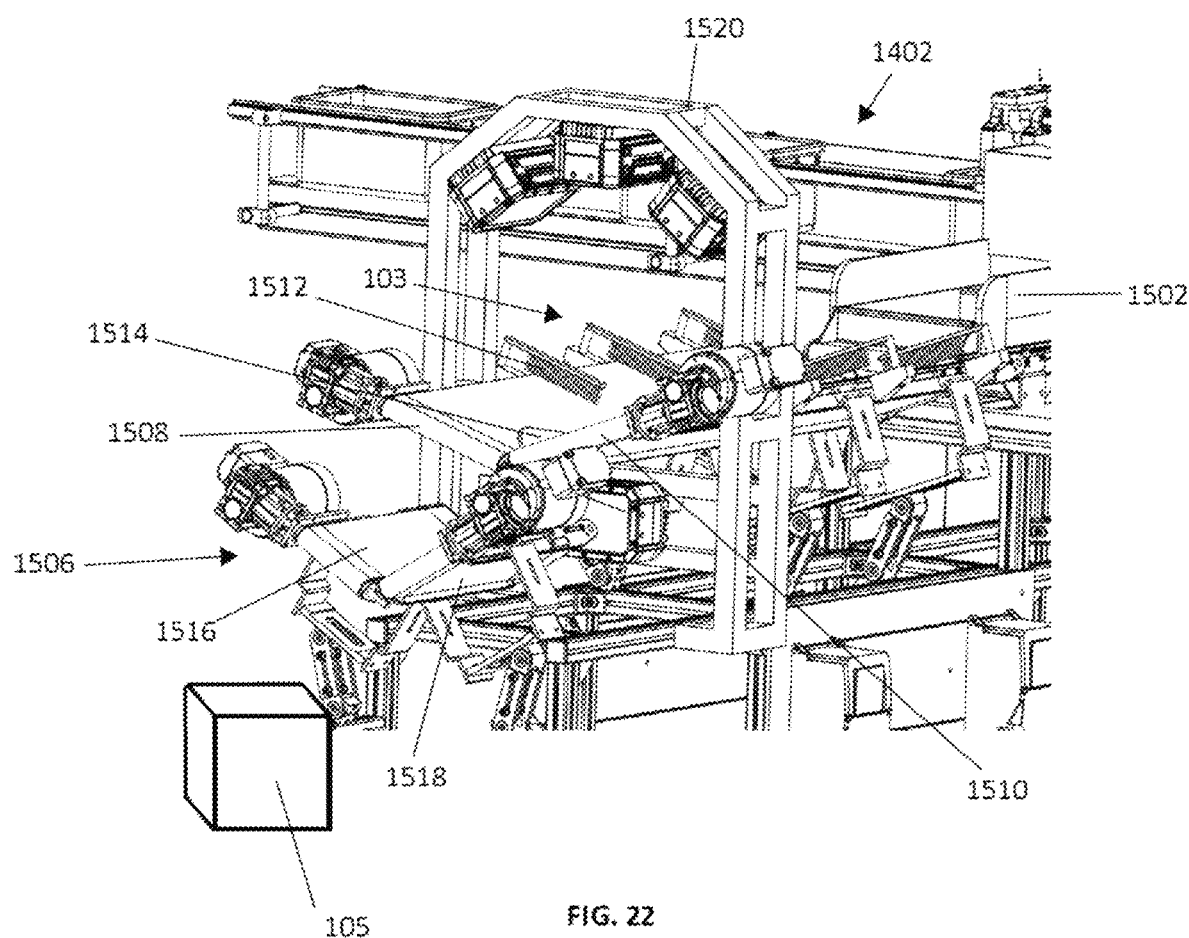
FIG. 22 shows a view of a first funneling transport mechanism and a second funneling transport mechanism of the linear organizer apparatus, according to an example embodiment of the present disclosure.
Figure 23:
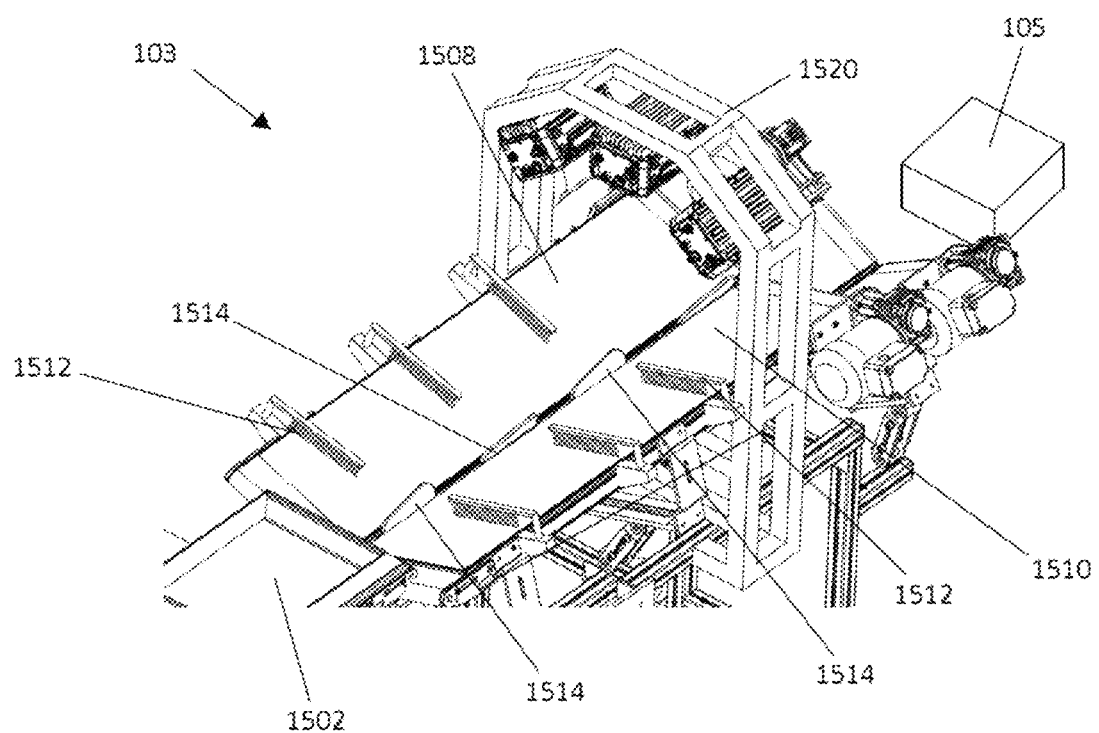
FIG. 23 shows a view of the first funneling transport mechanism of the linear organizer apparatus, according to an example embodiment of the present disclosure.

Totes 21 containing medication containers 20 may alternatively travel through a linear organizer apparatus 103 instead of the centrifugal organizer apparatus 101. FIGS. 21 to 23 illustrate one embodiment of the linear organizer apparatus 103. The linear organizer apparatus 103 includes an input transport mechanism 1502, a first funneling transport mechanism 1504, and in some embodiments, a second funneling transport mechanism 1506.

As in the centrifugal organizer apparatus 101, some orders, such as those with multiple medication containers 20, may be transported within a fulfillment center in totes 21. The totes 21 hold medication containers 20 corresponding to a single order. The linear organizer apparatus 103 is configured to accommodate any tote that is capable of being emptied of medication containers 20 by gravity. The linear organizer apparatus 103 may be altered to accommodate different totes 21, as described below.

The tote transport mechanism 1402 is configured to receive totes 21 holding the medication containers 20 of a single order to be fulfilled. The tote transport mechanism 1402 receives pre-labeled medication containers 20 and can receive more than one medication container 20 contemporaneously, as shown in block 242 of FIG. 2E. The medication containers 20 may be manually filled by a pharmacist or other fulfillment worker or may be automatically fed into the totes 21 in a variety of manners, including but not limited to, manually feeding, conveying by conveyor belt, a plurality of rollers, a dial machine indexer, rolling the medication containers 20 down ramps, or by any other fulfillment device such as a robotic arm.

The tote transport mechanism 1402 includes an input end 1412, which is configured to receive at least one tote 21, and an exit end 1414, which is configured to deposit the at least one tote 21 to the tote dumper 1406. The tote transport mechanism 1402 moves the totes 21 from the input end 1412 to the exit end 1414.

In the illustrated embodiment, the tote transport mechanism 1402 is a conveyor track 1416. In other embodiments, the tote transport mechanism 1402 may be a belt conveyor system, plurality of rollers, a dial machine indexer, or may include an elevator. At the input end 1412 of the illustrated tote transport mechanism 1402, totes 21 are received onto a conveyor track 1416. In some embodiments, the tote transport mechanism 1402 may include rails 1418 to ensure that a tote 21 is successfully deposited onto the conveyor track 1416 and does not fall.

The tote 21 moves along the tote transport mechanism 1402 until it reaches the exit end 1414 of the tote transport mechanism 1402 where the tote 21 engages with a tote dumper 1406 (block 244). As shown in FIGS. 12A and 12B, the tote dumper 1406 includes a supporting member 1424, a motor 1426, a dowel 1428, and arm members 1430. The supporting member 1424 is affixed to a stationary location on the linear organizer apparatus 103, such as the main frame 108. The supporting member 1424 contains holes through which the dowel 1428 is threaded. Also threaded on the dowel 1428 are arm members 1430 which hold the tote 21. The dowel 1428 is coupled to the motor 1426 such that the motor 1426 can rotate the dowel 1428, which causes the arm members 1430 to follow and thereby deposit the medication containers 20 contained within the tote 21 into the input transport mechanism 1502 of the linear organizer apparatus 103. The supporting member 1424 does not rotate when the motor 1426 is engaged, and thus provides stability to the tote dumper 1406.

In a holding position, the arm members 1430 support a tote 21, which is held upright with the medication containers 20. In a dropping position, the motor 1426 is configured to rotate the dowel 1428 about a horizontal axis. In some embodiments such as FIGS. 12A and 12B, the arm members 1430 may be connected by supporting member 1424. Optionally, the arm members 1430 may include walls 1429 that extend upward from the arm members 1430 to facilitate the exit of the medication containers 20 from the tote dumper 1406 into the input transport mechanism 1502. In some embodiments, a ramp 1435 may also be used to control the location at which the medication containers 20 drop into the input transport mechanism 1502, as shown in FIG. 21. Once the medication containers 20 are dropped, the tote dumper 1406 returns from the dropping position to the holding position and is then lowered to receive another tote 21. Some embodiments may include multiple tote dumpers 1406. This configuration is purely exemplary and other configurations which allow the tote dumper 1406 to release the contents of the tote 21 may be known to a person having ordinary skill in the art.

After the contents of the tote 21 have been released, the tote 21 is placed onto an exit transport mechanism, such as a conveyor, where it travels back into circulation and is loaded with a new container. The exit transport mechanism may be a continuation of the tote transport mechanism 1402.

From the tote dumper 1406, the medication containers 20 enter the input transport mechanism 1502. In the illustrated embodiment, the input transport mechanism 1502 is a cleated belt conveyor track containing a plurality of cleats that separate orders contained with each tote 21. The cleats extend outward to a width that allows the medication containers 20 to be held securely. In embodiments where the input transport mechanism 1502 is a cleated belt conveyor track, vertical walls may extend upwards from the cleated belt conveyor track to ensure that the medication containers 20 contained within a single tote 21 are kept within the same cleat.

In yet other embodiments, the input transport mechanism 1502 may be a conveyor track, a belt conveyor system, a plurality of rollers, or a dial machine indexer. The input transport mechanism 1502 moves medication containers 20 from the tote transport mechanism 1402 to the first funneling transport mechanism 1504, which is at a lower elevation than the input transport mechanism 1502.

The first funneling transport mechanism 1504 includes a first left conveyor belt 1508 and a first right conveyor belt 1510. Both the first left conveyor belt 1508 and first right conveyor belt 1510 are tilted at an angle such that the first left conveyor belt 1508 and the first right conveyor belt 1510 have an upper end and a lower end. The lower ends of the first left conveyor belt 1508 and the first right conveyor belt 1510 are in close proximity to one another creating a v-shape between the two conveyor belts. This v-shape guides the medication containers 20 traveling along the first funneling transport mechanism 1504 in a straight line to the second funneling transport mechanism 1506.

In some embodiments, the first funneling transport mechanism 1504 also includes bumper rods 1512 affixed above the first left conveyor belt 1508 and first right conveyor belt 1510. The bumper rods 1512, which also are tilted at an angle matching the conveyor belts, guide the medication containers 20 towards the lower ends of the conveyor belts. The bumper rods may be any material suitable to gently guide the medication containers 20 without causing significant damage to the containers or contents therein. In the illustrated embodiment, the bumper rods 1512 include soft comb-like teeth made of a material such as silicone that help direct the medication container 20. It should be appreciated that the number of bumper rods 1512 in the linear organizer apparatus 103 may differ in other embodiments. The use of six bumper rods 1512 in FIG. 23 is purely exemplary.

Additionally, in some embodiments, the first funneling transport mechanism 1504 may include fins 1514 near the lower ends of the first left conveyor belt 1508 and the first right conveyor belt 1510. The fins 1514 may be used to guide the medication containers 20 into a straight line to travel along the first funneling transport mechanism 1504. While the fins 1514 may have any shape or size, in one such embodiment, the fins 1514 may have a shape that increases in elevation along the travel path of the medication containers 20. The fins 1514 may orient towards either the first left conveyor belt 1508 or the first right conveyor belt 1510. In the embodiment shown in FIG. 23, one fin 1514 is shown as oriented towards the first right conveyor belt 1510 and two fins 1514 are shown as oriented towards the first left conveyor belt 1508.

In some embodiments, such as the embodiment shown in FIG. 22, the linear organizer apparatus 103 may include a second funneling transport mechanism 1506. The second funneling transport mechanism 1506 includes a second left conveyor belt 1516 and a second right conveyor belt 1518. Both the second left conveyor belt 1516 and second right conveyor belt 1518 are tilted at an angle such that the second left conveyor belt 1516 and the second right conveyor belt 1518 have an upper end and a lower end. The lower ends of the second left conveyor belt 1516 and the second right conveyor belt 1518 are in close proximity to one another creating a v-shape between the two conveyor belts. This v-shape guides the medication containers 20 traveling along the second funneling transport mechanism 1506 in a straight line to an exit. Like the first funneling transport mechanism 1504, the second funneling transport mechanism 1506 may also include bumper rods 1512 and fins 1514.

After exit from the second funneling transport mechanism 1506, the medication containers 20 are led to the pneumatic container travel system 105. The transport tube 1602 of the pneumatic container travel system 105 may be placed at the exit of the first funneling transport mechanism 1504 or the second funneling transport mechanism 1506 or the medication containers 20 may have to travel further to reach the transport tube 1602. In some embodiments, the medication containers 20 may transport up or down an elevator to reach the transport tube 1602.

The linear organizer apparatus 103 also includes a plurality of scanners 302 affixed to a scanner arch 1520. The scanners 302 scan the bar codes 11 on each medication container 20 to ensure the quantity of medication containers 20 and the contents of the medication containers 20 are correct before transferring the medication containers 20 to the pneumatic container travel system 105, as discussed below (block 248 in FIG. 2E). The shape of the scanner arch 1520 allows multiple scanners 302 configured in multiple directions to detect the bar codes 11 irrespective of the orientation and position of the medication container 20. In instances where a scanner 302 detects a difference from the medication containers 20 on the linear organizer apparatus 103 than the medication containers 20 identified in the fulfillment database 14, the order is rejected and the medication containers 20 are routed to a reject area.

Pneumatic Container Travel System Embodiment

After exiting the infeed loop apparatus 104, the centrifugal organizer apparatus 101, or the linear organizer apparatus 103, the medication containers 20 travel to the packaging apparatus 106. To transport the medication containers 20 between locations, a pneumatic container travel system 105 is used. The pneumatic container travel system 105 may include a transport tube 1602, an air nozzle 1604, a scanner frame 1606, and scanners 302.

The transport tube 1602 is capable of receiving a plurality of medication containers 20 (block 250 of FIG. 2F) and has a large enough diameter to allow the medication containers 20 within the tube to pass through. The transport tube 1602 may be comprised of any material strong enough to withstand pressure from pressurized air flow. In some embodiments, the transport tube 1602 may be transparent.

An air nozzle 1604 is configured to blow pressurized air strong enough to move the medication containers 20 through the transport tube 1602 (block 252). In some embodiments, the air nozzle 1604 is connected to a pressurized air source and is controlled by a flow control (e.g., a pressure regulator) and a pneumatic valve. The pneumatic valves have an open position and a closed position. In the open position, pressurized air is outputted from air nozzles 1604 coupled to the valve. In the closed position, no air is outputted from air nozzles 1604 coupled to the valve.

The flow control is fluidly coupled between the pressurized air source and the air nozzle 1604 and is configured to regulate the flow of pressurized air. In some embodiments, the flow control is controlled by the controller 18, which is communicatively coupled to at least one sensor 301. The controller 18 receives data from the sensor 301 and transmits control instructions to the flow control as to whether the flow of compressed air should be increased or decreased.

In some embodiments, the controller 18 may be configured to transmit control instructions to the flow control to turn off pressurized air flow while medication containers 20 are loaded into the transport tube 1602. In alternative embodiments, there may be a door affixed to transport tube 1602. The a motor 306 that controls the door is communicatively coupled to the controller 18 to control the flow of pressurized air. The controller 18 may transmit control instructions to the motor 306 to shut the door, thereby blocking pressurized air from entering the transport tube 1602.

The type of sensor, the location of the sensor, and the force of the pressurized air from the air nozzle 1604 may all be adjusted to change the distance the medication containers 20 travel laterally from the flow of air. For instance, the sensor may be an optical sensor, a micro switch, or any sensor appropriate to determine the orientation of the medication container 20. In the illustrated embodiment, the sensor is an optical sensor located upstream from the air nozzle 1604, though it should be appreciated that the identified sensor mechanisms in the application are exemplary and other sensor mechanisms may be added or omitted in other embodiments of the pneumatic container travel system 105.

Figure 24:
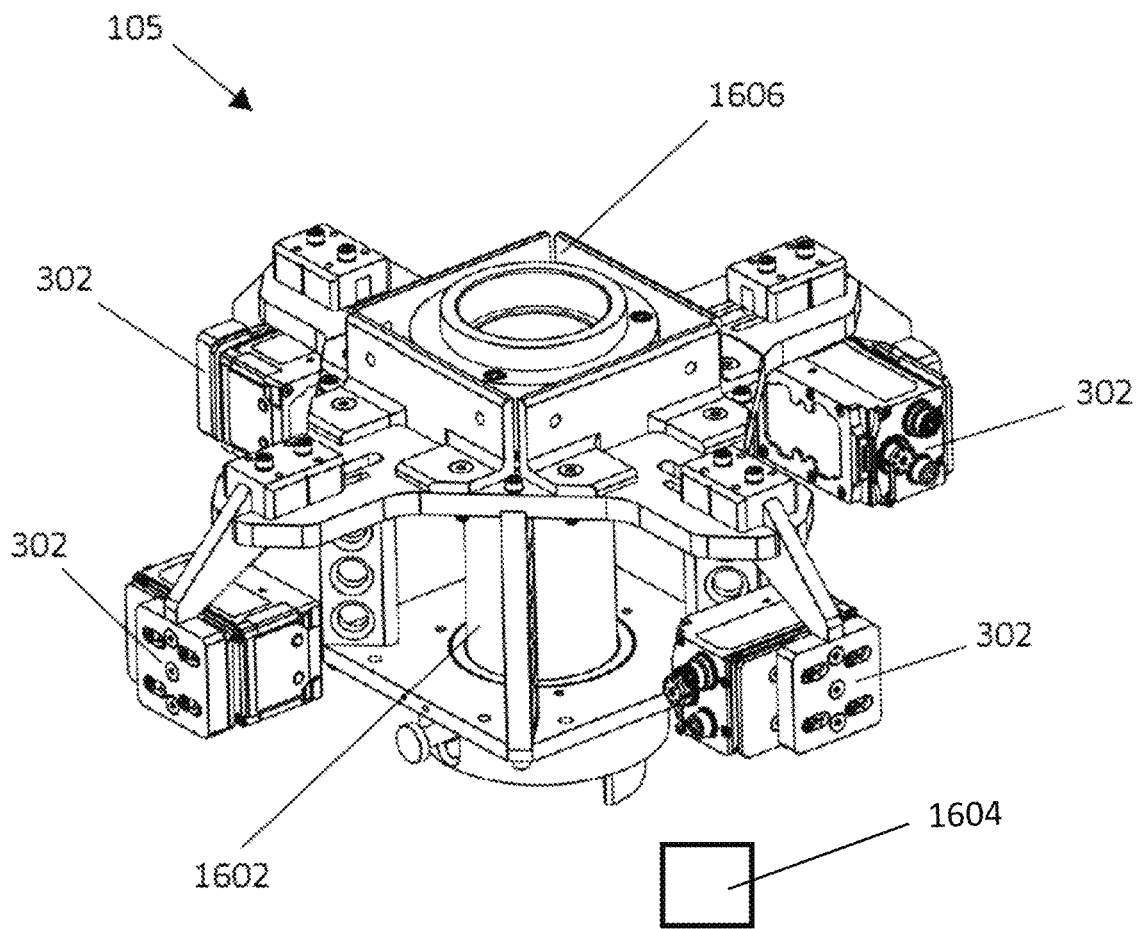
FIG. 24 shows a view of a scanner frame of a pneumatic container travel system, according to an example embodiment of the present disclosure.
Figure 25:
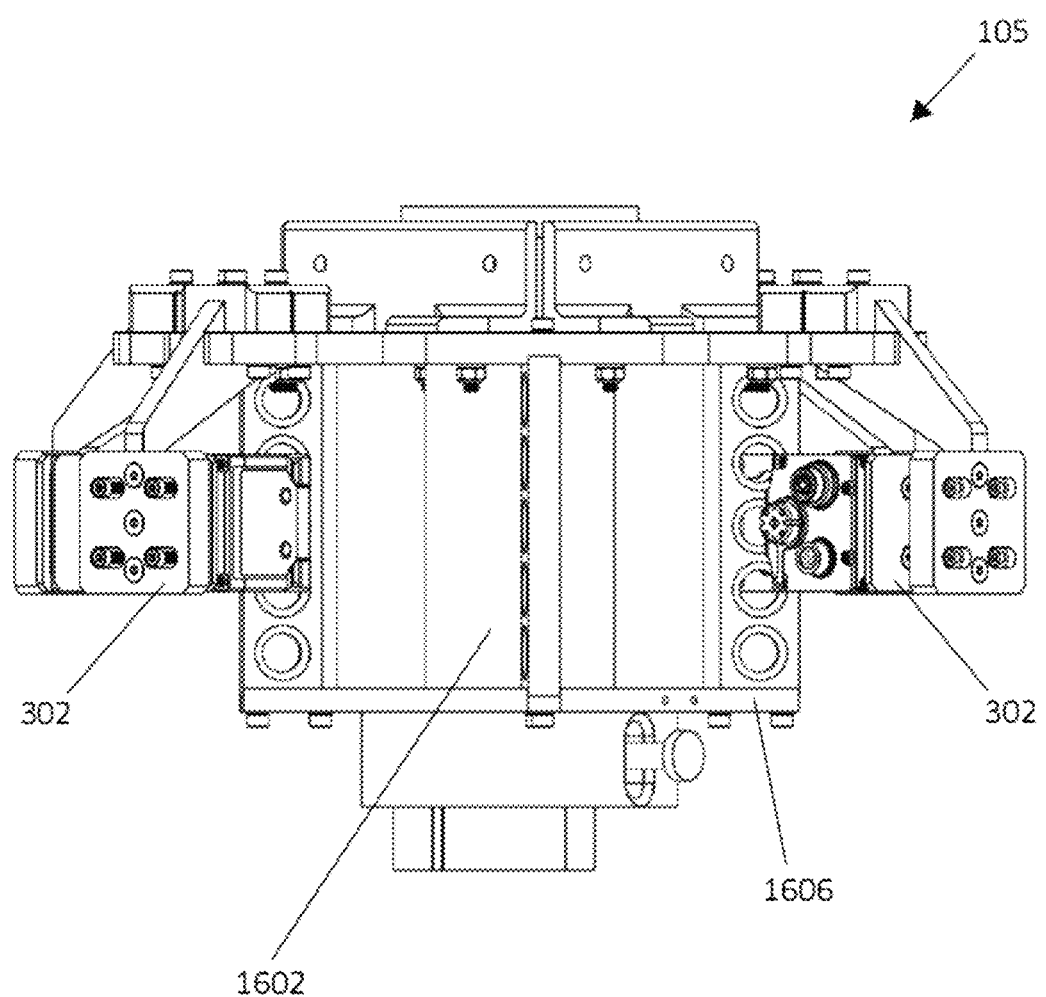
FIG. 25 shows a side view of the scanner frame of the pneumatic container travel system, according to an example embodiment of the present disclosure.
Figure 26:
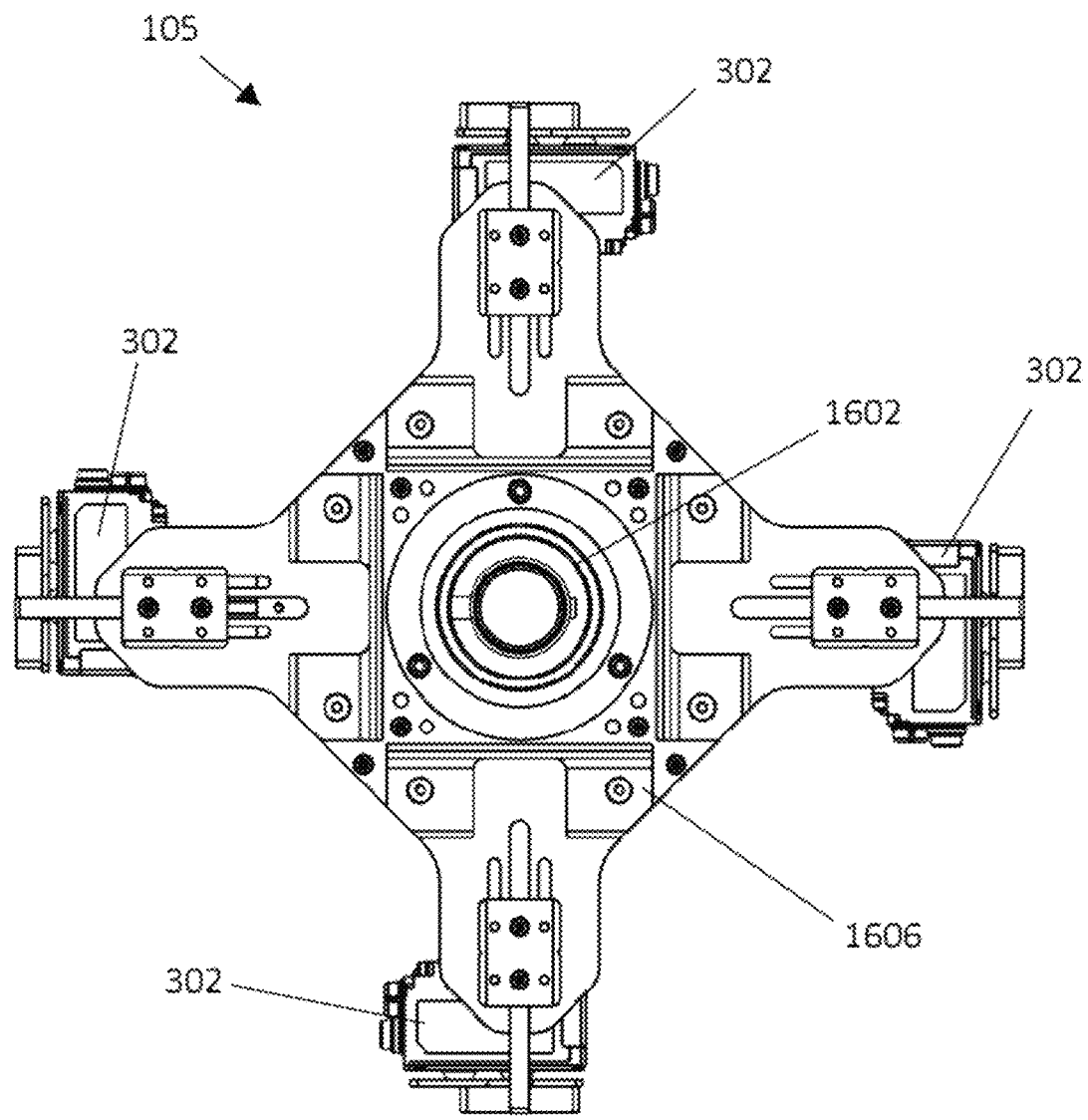
FIG. 26 shows a top view of the scanner frame of the pneumatic container travel system, according to an example embodiment of the present disclosure.

In embodiments where the transport tube 1602 is transparent, scanners 302 may be directed to read bar codes 11 on the medication containers 20 to determine if the bar codes 11 match the patient information in the fulfillment database 14 (block 254). A scanner frame 1606, as shown in FIGS. 24 to 26, may hold a plurality of scanners 302. The scanner frame 1606 is affixed to the transport tube 1602 and may be any material suitable to hold the scanners 302.

The scanners 302 are positioned in a horizontal orientation and located adjacent to one another. The angle between each scanner 302 may vary but may include 90 degrees of separation or 120 degrees of separation. The vertical height of the scanners 302 may be the same. In some embodiments, such as those shown in FIGS. 24 to 26, there are four scanners 302. In other embodiments, there may be three scanners 302. It should be appreciated that the number of scanners 302 in the pneumatic container travel system 105 may differ in other embodiments. The number of scanners 302 may depend on the how fast the pneumatic container travel system 105 requires medication containers 20 to pass through the pneumatic container travel system 105 and a strength of the pressurized air from the air nozzle 1604. The use of four scanners 302 in the description below is purely exemplary.

Figure 27:
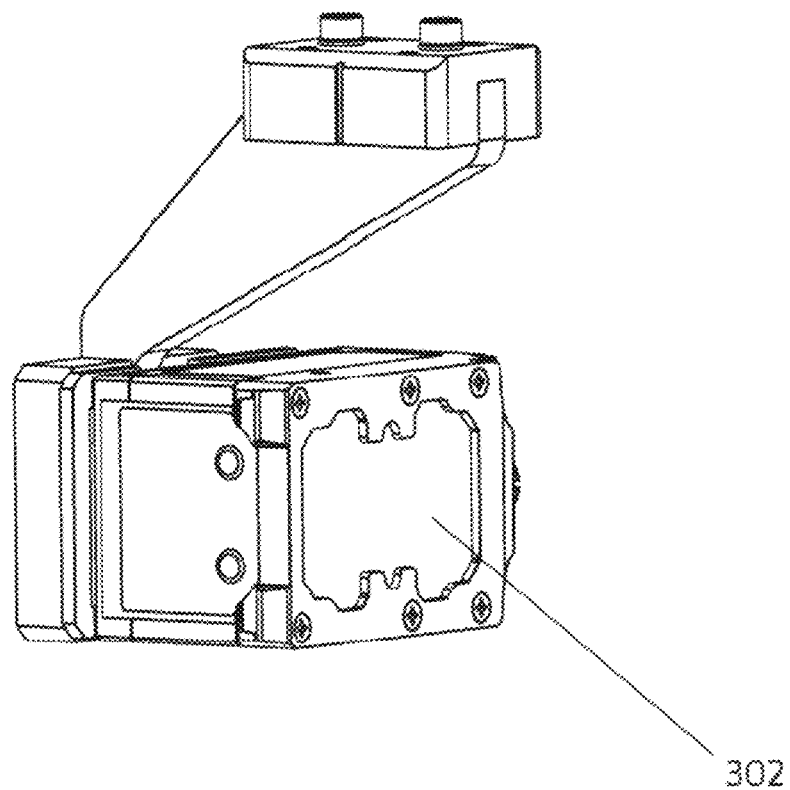
FIG. 27 shows a close-up view of a scanner, according to an example embodiment of the present disclosure.

The type of scanners 302 and the location of the scanners 302 may be adjusted. For instance, the scanners may be optical sensors, micro switches, or any scanners appropriate to identify and scan the bar code 11 on the medication containers 20. In the illustrated embodiment, the scanners 302 are optical scanners located upstream from the air nozzle 1604, though it should be appreciated that the identified scanner mechanisms in the application are exemplary and other scanner mechanisms may be added or omitted in other embodiments of the pneumatic container travel system 105. An enlarged view of the scanners 302 used within the illustrated embodiments is shown in FIG. 27.

When a medication container 20 passes by the scanners 302 on the scanner frame 1606, the medication container labels 22 are scanned to read the bar code 11 on the medication container 20. The patient information associated with the bar code 11 is transmitted by the scanner 302 to the processor 16. The processor 16 is configured to identify if the patient information contained within the bar code 11 on the medication container 20 matches the patient information in the fulfillment database 14. If the processor 16 identifies that the patient information contained within the bar code 11 on the medication container 20 does not match the patient information in the fulfillment database 14, the processor 16 is configured to transmit movement instructions to the controller 18, and the controller 18 is configured to cause the medication containers 20 to be deposited into a reject area or rejection transport mechanism and use the interface 310 to notify the processor 16 that transport tube 1602 is empty to begin the process again.

If the bar codes 11 match the patient information in the fulfillment database 14, the scanners 302 communicate with the controller 18 and processor 16 to have the medication containers 20 continue to move within the transport tube 1602. If the bar codes 11 do not match the patient information in the fulfillment database 14, the pneumatic container travel system 105 is configured to deposit the medication containers 20 into a reject area or rejection transport mechanism and use the interface 310 to notify the processor 16 that transport tube 1602 is empty to begin the process again.

The medication containers 20 may reach the packaging apparatus 106 from the pneumatic container travel system 105 by a variety of transport mechanisms. For instance, the pneumatic container travel system 105 may be routed to a dispensing tube similar to the dispensing tube 710 of the infeed loop apparatus 104. Alternatively, the pneumatic container travel system 105 may direct the medication containers 20 to a pneumatic air lock manifold where the processor 16 routes the medication containers 20 via pressurized air to the packaging apparatus.

Packaging Apparatus Embodiment

After both the medication documentation 10 and the medication container 20 are obtained and confirmed to match the patient information, the packaging process begins. FIGS. 28A-33 illustrate the packaging process with the packaging apparatus 106, according to an example embodiment of the present disclosure. The medication documentation 10 and accompanying medication container 20 can be packaged into a receptacle 602 of any kind. This may include bags, boxes, pouches, bins, packages, or containers. In some embodiments, the packaging process may take less than five seconds.

In illustrated embodiments, the receptacles 602 filled by the packaging apparatus 106 are bags 114. The bags 114 can be individual pre-made bags or a plurality of bags that are attached to one another (i.e., a preformed length of bags). Additionally, a pre-made plurality of bags that are affixed to one another may be wound up into a roll or folded into a predetermined shape. The packaging apparatus 106 may accommodate both kinds of configurations. In illustrated embodiments, the bags 114 are wound up into a roll.

Figure 28A:
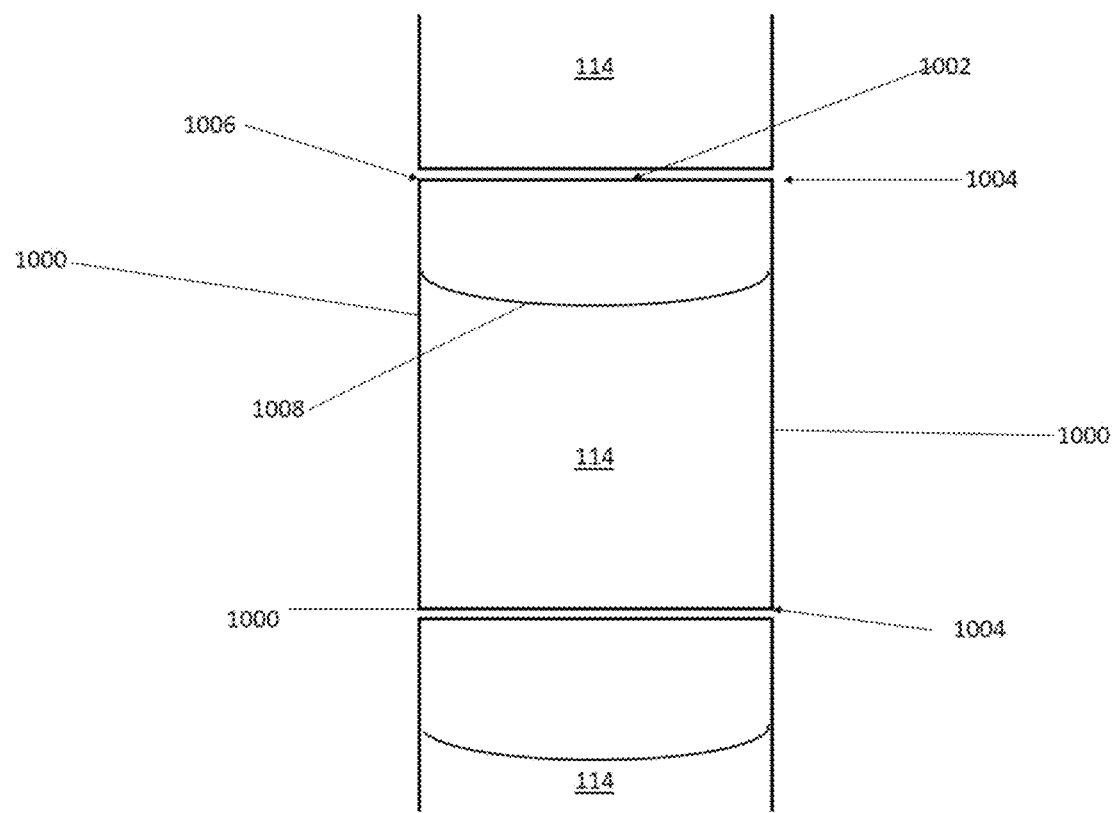
FIG. 28A shows a front view of pre-attached bags that are no longer connected, according to an example embodiment of the present disclosure.
Figure 28B:
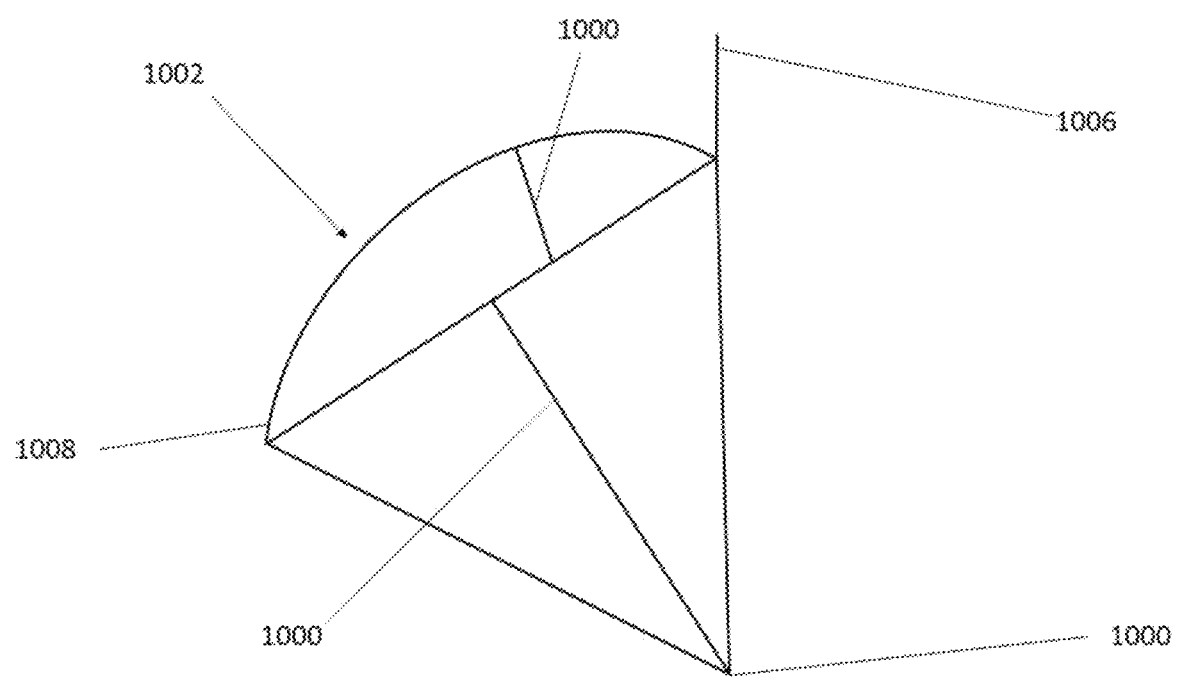
FIG. 28B shows a side view of a bag, according to an example embodiment of the present disclosure.

It should be appreciated that the bags 114 disclosed herein and illustrated in FIGS. 28A and 28B are exemplary. The packaging apparatus 106 can package any bag that includes at least three edges 1000 that are already sealed together. The remaining edge that is unsealed is known as an inflation edge 1002. The volume of the bags 114 utilized in the packaging apparatus 106 is predetermined, though the packaging apparatus 106 may be manually altered to accommodate multiple different-sized bags 114, as described below.

In the illustrated embodiment, the bags 114 are made of a polymer such as ethylene. In some embodiments, the bags 114 can be made of high-density polyethylene ("HDPE"), low-density polyethylene ("LDPE"), or linear low-density polyethylene ("LLDPE"). In yet other embodiments, the bags 114 are made of paper or a paper-based compound. There is no coating on the interior on the bags 114.

The bags 114, as shown in from a front view in FIG. 28A and a side view in FIG. 28B, may also contain perforations 1004. In illustrated embodiments, a back side 1006 of the inflation edge 1002 of the leading bag 114 may be perforated and attached to a bottom edge of another bag in the plurality of bags 114. In this embodiment, a front side 1008 of the inflation edge 1002 of the leading bag 114 is not attached to another bag. In other embodiments, the perforations 1004 may be located at different locations on the leading bag 114. Some perforations 1004 may extend perpendicularly from the inflation edge 1002 of the leading bag 114. Bags 114 may also have smaller holes to ensure that the leading bag 114 does not contain excess air when fully sealed. It should be appreciated that the perforations 1004 and other bag holes identified in the application are exemplary and other perforations 1004 and other bag configurations may be utilized with other embodiments of the packaging apparatus 106.

Figure 29:
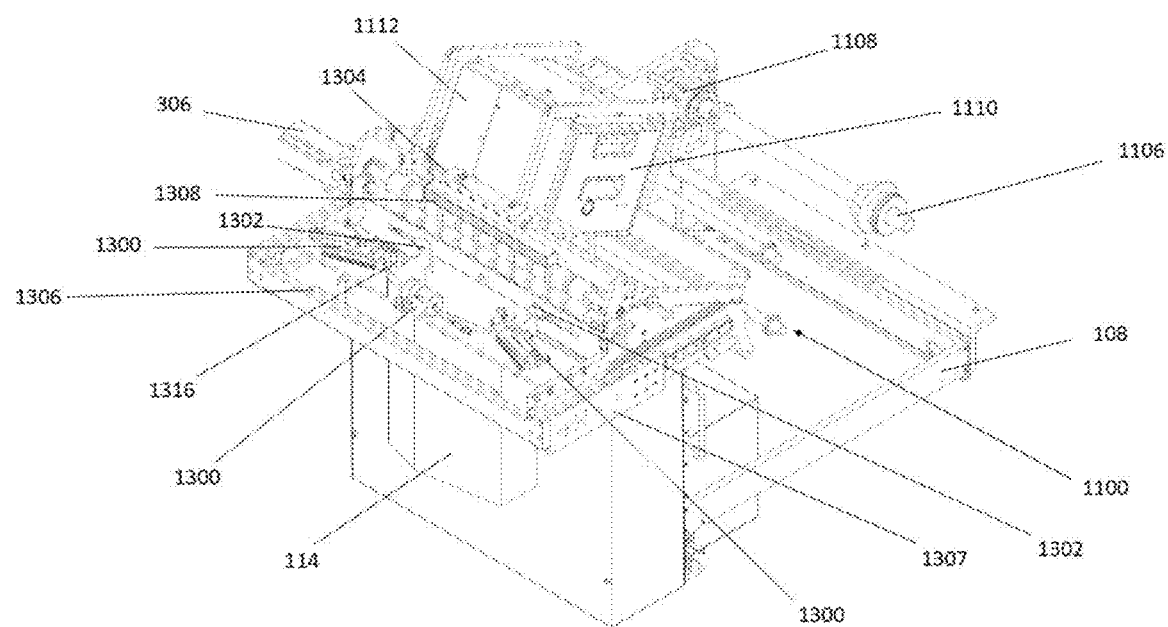
FIG. 29 shows an isometric view of a packaging apparatus, according to an example embodiment of the present disclosure.

Referring now to FIG. 29, the packaging apparatus 106 includes a bag transport mechanism 1100, a printing station 1102, and a loading station 1104. The method for packaging medication documentation 10 and medication containers 20 at the packaging apparatus 106 includes feeding a leading bag 114 to the printing station 1102, printing patient information onto the leading bag 114, transporting the leading bag 114 to a loading station 1104, opening the leading bag 114, engaging the leading bag 114, filling the leading bag 114 with medication documentation 10 and at least one medication container 20, stretching the leading bag 114 taut, and sealing the leading bag 114.

The bag transport mechanism 1100 is affixed to the main frame 108, configured to receive a plurality of bags, and moves a leading bag 114 through the entirety of the packaging apparatus 106 system. In some embodiments, the bag transport mechanism 1100 is a plurality of rollers. The rollers 1100 are spaced in a configuration that creates tension on the plurality of bags 114. In other embodiments, the bag transport mechanism 1100 may be a conveyor track, belt conveyor system, or a dial machine indexer. The bag transport mechanism 1100 cooperates with a motor 306 to transport the leading bag 114 to various stations, such as the printing station 1102 and the loading station 1104. For the purposes of this application, only the roller embodiment is described.

In an illustrated embodiment, the bags 114 are affixed to one another in a roll. To allow the bag transport mechanism 1100 to operate on the roll, the roll is placed on a freely rotatable dowel 1106 where a leading bag 114 of the roll is fed through the plurality of rollers 1100 in the bag transport mechanism 1100. Once the processor 16, via the controller 18, transmits movement instructions to the motor 306, the rollers 1100 spin and create tension on the roll, pulling the bags 114 through the rollers 1100 to continue moving throughout the packaging apparatus 106, as described further below.

In this instance, to keep the bag transport mechanism 1100 from moving the plurality of bags 114 too quickly, a clutch 1108 is placed around the dowel 1106 to prevent the rollers 1100 from spinning loosely. The clutch 1108 maintains the bag roll and leading bag 114 in the correct position. The clutch 1108 consists of springs which compress to create friction on the dowel 1106 thereby stopping the movement of the rollers 1100 entirely when activated.

Figure 30:
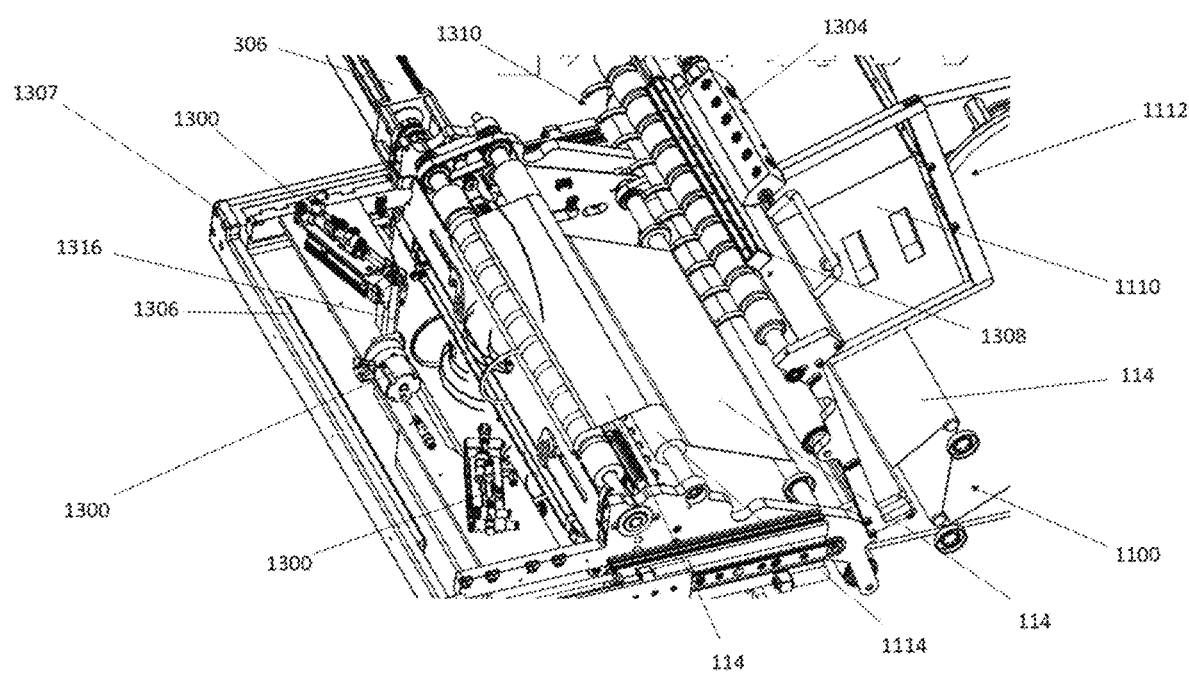
FIG. 30 shows a top view of a printing station and loading station in the packaging apparatus, according to an example embodiment of the present disclosure.

Next, the bag transport mechanism 1100 delivers a leading bag 114 to a printing station 1102 shown in FIG. 30. The printing station 1102 includes a thermal transfer printer 1110, a pivotable thermal transfer printer frame 1112, and a silicone roller 1114. A thermal transfer printer 1110 is contained within a pivotable thermal transfer printer frame 1112, which prints patient information directly onto the leading bag 114. The patient information to be printed onto the leading bag 114 includes a bar code 11 that matches the patient information in the fulfillment database 14. The pivotable thermal transfer printer frame 1112 can be opened or closed so that an operator may access the bag transport mechanism 1100 or other component inside the packaging apparatus 106.

The thermal transfer printer 1110 is operated by the controller 18. The controller 18 employs modular printing systems to transmit and receive print commands. This modular printing system can be customized to appropriately control the packaging apparatus 106. The custom modular printing system may be built using pre-existing modular printing systems such as Linux CUPS.

At the printing station 1102, the front side 1008 of the leading bag 114 is pulled taut by the rollers 1100 in the bag transport mechanism 1100. The leading bag 114 is woven over some rollers and under other rollers within the bag transport mechanism 1100 to create tension. A sensor 301 located within the printing station 1102 communicates with the application server 300 to notify the processor 16 that the leading bag 114 is ready for printing. The processor 16 then transmits movement instructions to the controller 18 which actuates the thermal transfer printer 1110 to print onto the leading bag 114. The thermal transfer printer 1110 prints designs on the front side 1008 of the leading bag 114 that is resting on the silicone roller 1114. The processor 16 may only transmit the movement instructions after the processor 16 receives an indication that a corresponding medications container is ready to be dispensed from the infeed loop apparatus 104. In such an embodiment, the processor 16 may cause the thermal transfer printer 1110 to print at least some of the patient information on the bag 114 while causing the printer 400 of the medication documentation preparation apparatus 102 to print the medication documentation 10 from the same patient information.

Once complete, the processor 16 transmits movement instructions to the controller 18 and the leading bag 114 is transported to a loading station 1104 by the bag transport mechanism 1100, which is powered by the motor 306.

Figure 31:
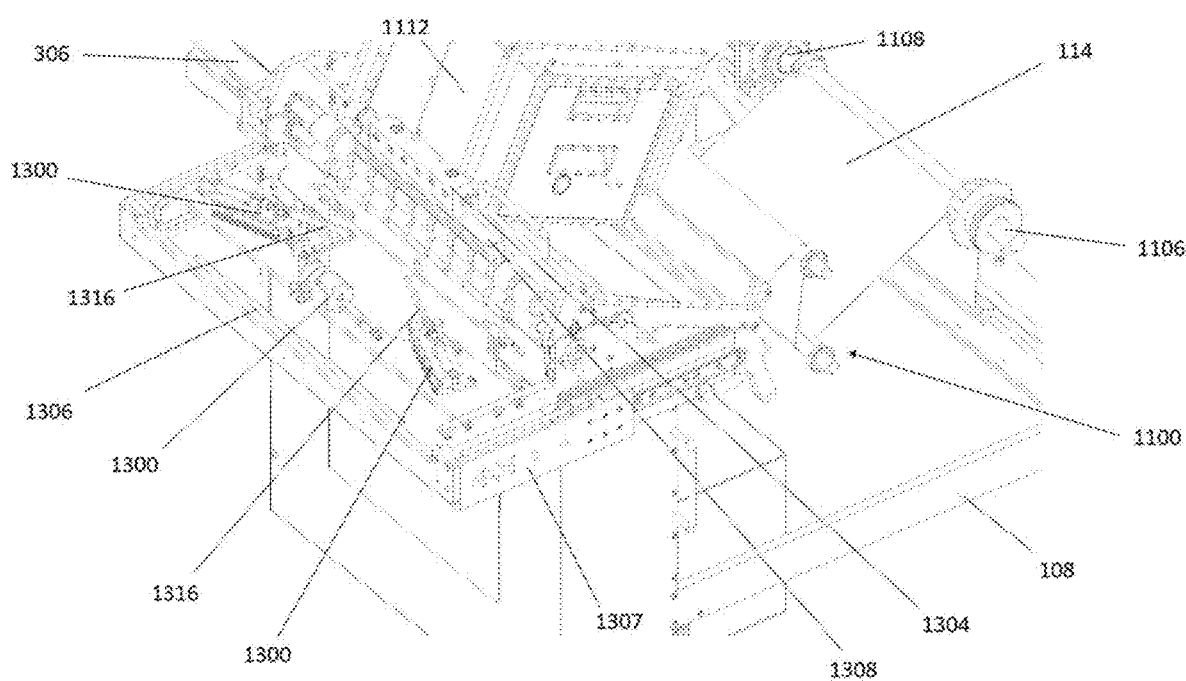
FIG. 31 shows an isometric view of a bag transport mechanism and loading station with a closed bag, according to an example embodiment of the present disclosure.
Figure 32:
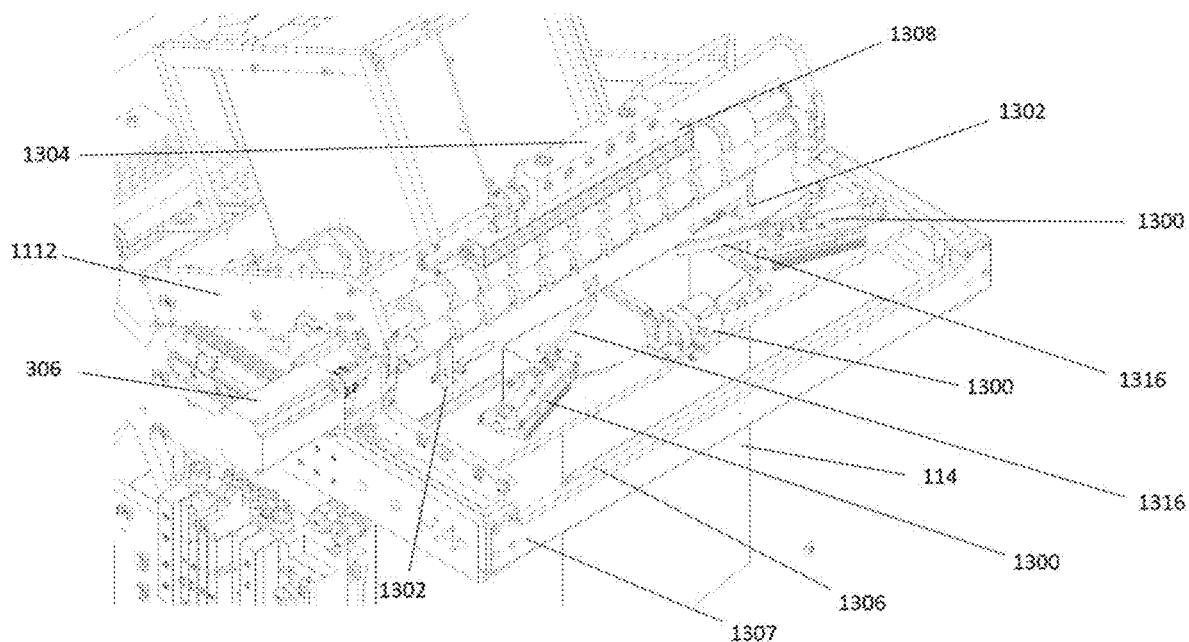
FIG. 32 shows an isometric view of the loading station with an open bag in the packaging apparatus, according to an example embodiment of the present disclosure.
Figure 33:
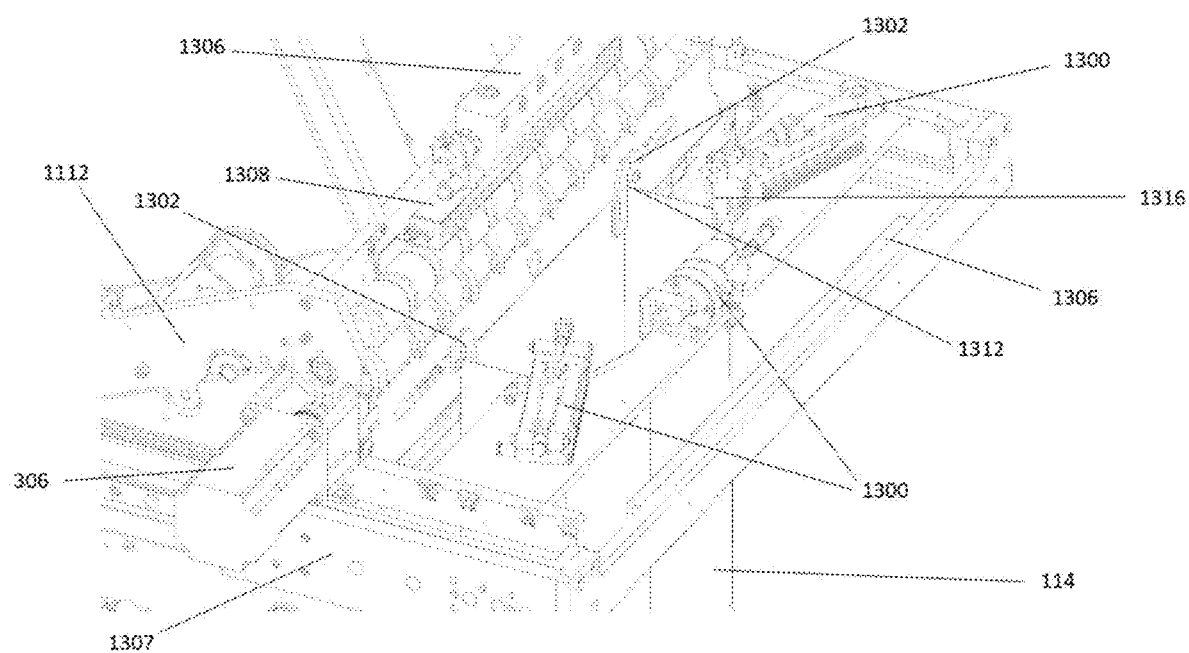
FIG. 33 shows a close-up view of the loading station with an open bag in the packaging apparatus, according to an example embodiment of the present disclosure.

As shown in FIGS. 31-33, the loading station 1104 includes at least a first, a second, and a third articulable finger 1300, at least a first and a second bag gripper 1302, an air knife 1304, a sealing mechanism 1306, and an outer packaging frame 1307. In an illustrated embodiment, the loading station 1104 also includes a static eliminating mechanism 1308. There is a sensor 301 located between the first and second bag grippers 1302 that detects when the leading bag 114 has arrived and is properly located in the loading station 1104. The sensor 301 communicates with the processor 16 when the leading bag 114 is in a proper position, which causes the processor 16 to transmit movement instructions to the controller 18 and the accompanying motor 306 to begin the loading process.

In the illustrated embodiments, at the loading station 1104, the leading bag 114 is positioned vertically so as to have an inflation edge 1002 exposed directly beneath an air knife 1304, though this configuration may vary in other embodiments. Angled bag fingers wrapped around a roller on the bag transport mechanism 1100 allow for the leading bag 114 to fall vertical. Compressed air is then blown by the air knife 1304 towards the inflation edge 1002 of the leading bag 114. In one embodiment, the leading bag 114 is perforated, so that when compressed air at a high enough pressure is blown tangential to the inflation edge 1002, the perforations 1004 along the inflation edge 1002 break and the leading bag 114 is opened. In another embodiment, a back side 1006 of the leading bag 114 along the inflation edge 1002 is perforated and attached to other bags while a front side 1008 of the leading bag 114 along the inflation edge 1002 is not attached to any other bag. In this instance, the compressed air, blown by the air knife 1304, when angled correctly, blows the front side 1008 of the leading bag 114 away from the back side 1006 causing the bag to substantially open as illustrated by FIG. 28B.

As many bags 114 are comprised of materials conducive to static electricity, even when the air knife 1304 blows over the leading bag 114, the edges 1000 of the leading bag 114 may not naturally open if the leading bag 114 is charged with static electricity as the edges 1000 may be attracted to one another. To mitigate this problem, a static eliminating mechanism 1308 is located within the flow path of the compressed air, between the air knife 1304 and the leading bag 114. In the illustrated embodiments, the static eliminating mechanism 1308 is an ionizing bar. The ionizing bar adds positive and negative ions to the air flow, which neutralizes any static electricity that has built up on the leading bag 114. As a result, the front side 1008 of the inflation edge 1002 and the back side 1006 of the inflation edge 1002 of the leading bag 114 are no longer attracted to one another and the compressed air flow substantially opens the bag as illustrated by block 228 in FIG. 2D.

A sensor 301 is used to detect when the leading bag 114 has a large enough opening to insert the medication documentation 10 and medication container 20 into the leading bag 114. The sensor 301 communicates with the processor 16, which determines when the leading bag 14 is considered open. After the processor 16, determines that the leading bag 114 is open, the processor 16 causes the first and second bag grippers 1302 to engage with the opened leading bag 114. Each bag gripper 1302 has two gripper appendages 1312 connected to one another and pointed perpendicularly away from one another so as to form an L-shape. The bag grippers 1302 rotate about an end point 1314 to allow the bag grippers 1302 to pivot into the bag 114. The first bag gripper 1302, located on a left side of the leading bag 114, rotates clockwise into the leading bag 114 until one gripper appendage 1312 is parallel to the inflation edge 1002 of the leading bag 114 and the other gripper appendage 1312 is perpendicular to the inflation edge 1002 of the leading bag 114. The second bag gripper, located on a right side of the leading bag 114, rotates counterclockwise into the leading bag 114 until one gripper appendage 1312 is parallel to the inflation edge 1002 of the leading bag 114 and the other gripper appendage 1312 is perpendicular to the inflation edge 1002 of the leading bag 114. Both bag grippers 1302 move simultaneously and are connected to the same motor 306.

After the bag grippers 1302 have engaged the leading bag 114, the articulable fingers 1300 then engage the leading bag 114. Due to the rapid speed of the packaging apparatus 106, the bag gripper 1302 engagement and the articulable finger 1300 engagement appear to be nearly simultaneous.

The first, second, and third articulable fingers 1300 are located on the outer packaging frame 1307, which is positioned near the front side 1008 of the leading bag 114. The fingers 1300 are used to hold the leading bag 114 open. Each finger 1300 includes a finger appendage 1316 that can move between an open and a closed position. When closed, as shown in FIG. 30, the finger appendage 1316 rests perpendicular to the inflation edge 1002 of the leading bag 114. When opened, as shown in FIG. 31, the finger appendage 1316 rests parallel to the inflation edge 1002 of the leading bag 114. The finger appendage 1316 position is altered by an actuator 308 that is connected to the fingers 1300 and communicatively coupled with the processor 16. In an illustrated embodiment, the actuator 308 is a pneumatic valve. When given movement instructions from the processor 16, a rod on the pneumatic valve retracts to move the finger appendage 1316. When the rod retracts, the finger appendage 1316 automatically drops down into the closed position. The finger appendage 1316 is farther from the back side 1006 of the leading bag 114 in a closed position. As a result, the closed position puts tension on the leading bag 114 causing the bag to be pulled taut along the back side 1006 of the inflation edge 1002.

When the leading bag 114 is opened by the air knife 1304 (block 228), the finger appendages 1316 are in the open position. A sensor 301 communicatively coupled to the processor 16 relays a signal to the processor 16 indicated that the leading bag 114 is sufficiently opened. The processor 16 then transmits movement instructions to the actuator 308 to engage the fingers 1300 with the leading bag 114. The fingers 1300 operate at the same time as one another. Once all fingers 1300 engage the leading bag 114 and all finger appendages 1316 are in the closed position and a nearby sensor 301 confirms and relays this information to the processor 16, the processor 16 transmits movement instructions to the controller 18 and the outer packaging frame 1307 is moved away from the leading bag 114 by the motor 306. Because of this motion, the fingers 1300 pull the leading bag 114 open further. The leading bag 114 has an opening defined by the inflation edge 1002 that is pentagonal. It will be appreciated that this method of opening the bag is purely exemplary and other methods may be known to a person having ordinary skill in the art.

The leading bag 114 is then filled with the medication documentation 10 and medication container 20 corresponding to the patient information. As described above, the corresponding medication documentation 10 is brought and deposited into the leading bag 114 by the gantry assembly 406. As described above, the corresponding medication container 20 is brought and deposited into the leading bag 114 by the dispensing tube 710.

To prepare for the sealing process, after the leading bag 114 is filled with medication documentation 10 and the medication container 20, the processor 16 transmits movement instructions to the motor 306 connected to the bag grippers 1302. While the bag grippers 1302 are still engaged with the leading bag 114, the motor 306 pulls the bag grippers 1302 horizontally in a direction away from the leading bag 114. The first bag gripper 1302 is pulled to a left side of the packaging apparatus 106 and the second bag gripper 1302 is pulled to a right side of the packaging apparatus 106. This causes the leading bag 114 to be stretched and for the front side 1008 and back side 1006 of the leading bag 114 to be brought close together for sealing.

The bag grippers 1302 are pulled away to a predefined distance depending on the size of the leading bag 114. This distance can be manually altered by a switch located within the packaging apparatus 106. For instance, in some embodiments, the inflation edge 1002 of the leading bag 114 may be twelve inches. In other embodiments, the inflation edge 1002 of the leading bag 114 may be fourteen inches.

Once the first and second bag grippers 1302 have been pulled away from one another, the back side 1006 of the leading bag 114 comprises a straight line that is parallel to the sealing mechanism 1306. The sealing mechanism 1306 fuses the front side 1008 and back side 1006 of the leading bag 114 so that the leading bag 114 is completely sealed from any outside elements. In the illustrated embodiments, the sealing mechanism 1306 is a heat seal bar. In other embodiments, the sealing mechanism 1306 may be a vacuum sealer, cold sealer, or other heat sealer. In yet other embodiments, an element may be added to the leading bag 114 by the sealing mechanism 1306 to seal the leading bag 114. This may include adding a tie, clasp, clip, or other mating device. For the purposes of this application, only the heat seal bar embodiment will be described.

The heat seal bar 1306 is a metal bar that is heated by a heating transformer. The heating transformer may be located at the bottom of the medication bagger system 100 or in another location so as not to impede on any of the packaging apparatus 106 operations, the infeed loop apparatus 104 operations, or medication documentation preparation apparatus 102 operations. The heat seal bar 1306 is raised to at least to a temperature at which the material of the leading bag 114 melts.

The heat seal bar 1306 is placed on the outer packaging frame 1307 controlled by pneumatic actuators 308. When the leading bag 114 has been pulled taut by the bag grippers 1302, the finger appendages 1316 return to an open position and disengage the leading bag 114. The outer packaging frame 1307 then moves the heat seal bar 1306 towards the leading bag 114 until the heat seal bar 1306 mates with a silicone seal pad 1318 located behind the leading bag 114 on the main frame 108. The silicone seal pad 1318 is able to withstand the high temperature, whereas the material on the leading bag 114, as described above, usually a plastic, melts on both the front side 1008 and back side 1006 of the leading bag 114. Once the front side 1008 and back side 1006 of the leading bag 114 melt, the plastics fuse under pressure from the heat seal bar 1306 and silicone seal pad 1318. The bag grippers 1302 disengage with the leading bag 114 as the heat sealing process begins. The heat sealing process takes approximately 250 milliseconds, though other types of sealing processes may vary in duration.

Depending on the type of bag 114 used in the packaging apparatus 106, it may be necessary to remove excess air from the leading bag 114 prior to sealing. If the leading bag has any holes, such as a pre-made hole punch, it is not necessary to remove excess air from the leading bag 114, as the leading bag 114 can release air through the holes. In instances where the leading bag 114 would not have any holes after sealing, foam pads may be attached beneath the heat seal bar 1306 on the outer packaging frame 1307, as well as beneath the silicone seal pad 1318 to push air out as the sealing process occurs. The slight pressure from the foam pads pushes excess air out so that the leading bag 114 when sealed is not too inflated so as to risk puncture.

During the sealing process, as the heat seal bar 1306 mates with the silicone seal pad 1318, the controller 18 is configured to provide movement instructions to the motor 306 operating the bag transport mechanism 1100. The motor 306 is configured to reverse index in the direction of pulling the leading bag 114 back towards the printing station 1102. As the leading bag 114 is held in place by the heat seal bar 1306 and silicone seal pad 1318, perforations 1004 on the inflation edge 1002 of the leading bag 114 break from the applied force of the reverse indexing. Depending on the material of the leading bag 114, the motor 306 may need to reverse index.

Nevertheless, once the perforations 1004 break, the outer packaging frame 1307 moves the heat seal bar 1306 away from the silicone seal pad 1318, the leading bag 114 falls. In some embodiments, the leading bag 114 falls onto a conveyor and be processed by an operator at the pharmacy fulfillment center. In other embodiments, the leading bag 114 remains in the dispense area 600 until an operator removes it.

The methods described above may be performed in any order and the methods described above may include more, fewer, or other steps.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A centrifugal organizer apparatus for a bagger system, the centrifugal organizer apparatus comprising:
    a centrifugal feeder including a conical diverter and an external wall adjacent to a circumference of the conical diverter, wherein the conical diverter is configured to rotate and create centrifugal force such that containers within the centrifugal feeder are directed to the external wall, at least a portion of the external wall including an aperture sized to enable containers to pass through;
    at least one tote dumper configured to receive and hold at least one tote and configured to release at least one container into the centrifugal feeder, the at least one tote dumper having a holding position and a dropping position; and
    an exit ramp tangential to the external wall configured to allow the at least one container under the centrifugal force to exit the centrifugal feeder via the aperture,
    wherein while in the holding position, the at least one tote dumper is configured to receive and hold at least one container in the at least one tote, and
    wherein while in the dropping position, the at least one tote dumper is configured to release the at least one container from the at least one tote.

2. The centrifugal organizer apparatus of claim 1, wherein the centrifugal feeder further includes a platform perpendicular to the external wall.

3. The centrifugal organizer apparatus of claim 1, wherein the conical diverter is tilted such that the conical diverter has a high end and a low end.

4. The centrifugal organizer apparatus of claim 3, wherein the exit ramp has a height equal to that of a height of the high end of the conical diverter.

5. The centrifugal organizer apparatus of claim 4, wherein the external wall further includes a base ledge that is perpendicular to the external wall, wherein the base ledge has a height equal to that of the height of the high end of the conical diverter.

6. The centrifugal organizer apparatus of claim 1, wherein the at least one tote dumper is located above the conical diverter.

7. The centrifugal organizer apparatus of claim 1, wherein the at least one tote receives the at least one container from a container routing mechanism.

8. The centrifugal organizer apparatus of claim 7, wherein the container routing mechanism is a mechanical arm.

9. The centrifugal organizer apparatus of claim 1, wherein the at least one tote is routed to the at least one tote dumper by a transport mechanism.

10. The centrifugal organizer apparatus of claim 9, wherein the at least one tote dumper comprises:
    a supporting member including at least one hole;
    a dowel coupled to a motor, the dowel threaded through the at least one hole of the supporting member;
    the motor configured to rotate the dowel; and
    at least one arm member configured to hold the at least one tote.

11. The centrifugal organizer apparatus of claim 10, wherein the at least one arm member supports the at least one tote such that the at least one container held within the at least one tote does not fall out of the at least one tote when the at least one tote dumper is in the holding position, and wherein the motor is configured to rotate the dowel about a horizontal axis such that the at least one container held within the at least one tote falls out of the at least one tote into the centrifugal feeder when the at least one tote dumper is moved to the dropping position.

12. The centrifugal organizer apparatus of claim 9, wherein the transport mechanism is a conveyor belt.

13. The centrifugal organizer apparatus of claim 9, wherein the transport mechanism includes at least one pneumatic cylinder configured to create a barrier that halts the at least one tote traveling along the transport mechanism.

14. The centrifugal organizer apparatus of claim 9, wherein the transport mechanism is a tote elevator.

15. The centrifugal organizer apparatus of claim 14, wherein the tote elevator comprises:
    a frame including at least one guide configured to receive the at least one tote; and
    at least one actuator coupled to the frame configured to release guide pins upon the at least one guide receiving the at least one tote.

16. The centrifugal organizer apparatus of claim 9, wherein the transport mechanism includes a conveyor belt and a tote elevator.

17. The centrifugal organizer apparatus of claim 16, wherein the transport mechanism includes at least one pneumatic cylinder configured to create a barrier that halts the at least one tote traveling along the transport mechanism.

18. The centrifugal organizer apparatus of claim 17, further comprising at least one sensor in communication with a controller configured to activate the at least one pneumatic cylinder to route the at least one tote from the transport mechanism to the tote elevator.

19. The centrifugal organizer apparatus of claim 1, wherein the exit ramp is configured to direct the at least one container entering the exit ramp from the centrifugal feeder to a transport tube or an infeed loop apparatus.

20. The centrifugal organizer apparatus of claim 1, wherein the exit ramp is configured to direct the at least one container entering the exit ramp from the centrifugal feeder to a tote elevator.

* * * * *